US011034709B2

(12) United States Patent
Tang et al.

(10) Patent No.: US 11,034,709 B2
(45) Date of Patent: Jun. 15, 2021

(54) ORGANIC LONG PERSISTENCE LUMINESCENCE COMPOSITIONS

(71) Applicant: The Hong Kong University of Science and Technology, Hong Kong (CN)

(72) Inventors: Benzhong Tang, Hong Kong (CN); Parvej Alam, Hong Kong (CN); Nelson Lik Ching Leung, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 15/929,797

(22) Filed: May 22, 2020

(65) Prior Publication Data

US 2020/0377534 A1 Dec. 3, 2020

Related U.S. Application Data

(60) Provisional application No. 62/921,030, filed on May 29, 2019.

(51) Int. Cl.
*C07F 9/50* (2006.01)
*B42D 25/23* (2014.01)
*B42D 25/24* (2014.01)
*B42D 25/36* (2014.01)
*B42D 25/29* (2014.01)
*C09K 11/06* (2006.01)

(52) U.S. Cl.
CPC ............ *C07F 9/5022* (2013.01); *B42D 25/23* (2014.10); *B42D 25/24* (2014.10); *B42D 25/29* (2014.10); *B42D 25/36* (2014.10); *C09K 11/06* (2013.01); *C09K 2211/10* (2013.01)

(58) Field of Classification Search
CPC ....... C07F 9/5022; B42D 25/23; B42D 25/24; B42D 25/29; B42D 25/36; C09K 11/06; C09K 2211/10
See application file for complete search history.

(56) References Cited

U.S. PATENT DOCUMENTS

| | | | | | |
|---|---|---|---|---|---|
| 4,000,169 | A | * | 12/1976 | Chan | C07C 29/095 554/35 |
| 4,404,910 | A | * | 9/1983 | Devienne | F42B 15/36 102/200 |
| 6,210,816 | B1 | * | 4/2001 | Malhotra | B41M 5/502 428/195.1 |
| 6,423,844 | B1 | * | 7/2002 | Koppes | C06C 15/00 544/198 |
| 6,602,366 | B2 | * | 8/2003 | Koppes | C06C 15/00 149/119 |
| 8,323,805 | B2 | * | 12/2012 | Zheng | H05B 33/14 428/690 |
| 9,905,767 | B2 | * | 2/2018 | Asada | C08G 61/122 |
| 2002/0041979 | A1 | * | 4/2002 | Taguchi | H01L 51/004 428/690 |
| 2013/0264562 | A1 | * | 10/2013 | Anryu | C09K 11/06 257/40 |
| 2016/0005994 | A1 | * | 1/2016 | Fukagawa | H01L 51/5221 257/40 |
| 2018/0346807 | A1 | | 12/2018 | Kabe et al. | |
| 2020/0354628 | A1 | * | 11/2020 | Tang | C07F 5/027 |

FOREIGN PATENT DOCUMENTS

| | | | |
|---|---|---|---|
| CN | 1583722 A | * | 2/2005 |
| CN | 106009573 A | * | 10/2016 |
| CN | 106221153 A | * | 12/2016 |
| CN | 108191915 A | * | 6/2018 |
| CN | 111116649 A | * | 5/2020 |
| WO | 2019069852 A1 | | 4/2019 |

OTHER PUBLICATIONS

A. Nery et al., 56 Tetrahedron, 5317-5327 (2000) (Year: 2000).*
G. Schiemenzetal., 57 Zeitschrift fuer Naturforschung, B: Chemical, 8-18 (2002) (Year: 2002).*
English-Language Machine Translation CN-111116649-A (2020) (Year: 2020).*
English-Language Machine Translation CN-108191915-A (2018) (Year: 2018).*
English-Language Machine Translation CN-106009573-A (2016) (Year: 2016).*
English-Language Machine Translation CN-1583722-A (2004) (Year: 2004).*
P. Alam et al., "Two are better than one: a design principle for ultralong persistent luminescence of pure organics", ChemRxiv (2019) (Year: 2019).*
P. Alam et al., "Two are better than one: a design principle for ultralong persistent luminescence of pure organics", Advanced Materials (Weinheim, Germany) (2020) (Year: 2020).*
English-Language Machine Translation CN-106221153-A (2016) (Year: 2016).*
Xie et al.; Long-acting antibacterial activity of quaternary phosphonium salts functionalized few-layered graphite; Materials Science and Engineering B; 2011; vol. 176, Issue 15; pp. 1222-1226; Elsevier.
Kabe et al.; Organic long persistent luminescence; Letters | Nature; 2017; vol. 550; pp. 384-387; Macmillan Publishers Limited.
Xiao et al.; Long Persistent Luminescence Enabled by Dissociation of Triplet Intermediate States in an Organic Guest/Host System; The Journal of Physical Chemistry Letters; 2020; vol. 11, Issue 9; pp. 3582-3588; ACS Publications.
Nishimura et al.; Many Exciplex Systems Exhibit Organic Long-Persistent Luminescence; Advanced Functional Materials; 2020; Article No. 2000795; Wiley-VCH.
Jinnai et al.; Wide-Range Tuning and Enhancement of Organic Long-Persistent Luminescence Using Emitter Dopants; Advanced Materials; 2020; Article No. 1800365; Wiley-VCH.
Lin et al.; Orange Organic Long-persistent Luminescence from an Electron Donor/Acceptor Binary System; Chemistry Letters; 2020; vol. 49, Issue 2; pp. 203-206; The Chemical Society of Japan.

(Continued)

*Primary Examiner* — Alexander R Pagano
(74) *Attorney, Agent, or Firm* — Spruson & Ferguson (Hong Kong) Limited

(57) ABSTRACT

Provided herein are organic long persistent luminescence compositions and methods of use and preparation thereof and articles comprising the same.

6 Claims, 37 Drawing Sheets

(56) References Cited

OTHER PUBLICATIONS

Lin et al.; Organic Long-Persistent Luminescence from a Flexible and Transparent Doped Polymer; Advanced Materials; 2018; Article No. 1803713; Wiley-VCH.

Lin et al.; Influence of energy gap between charge-transfer and locally excited states on organic long persistence luminescence; Nature Communications; 2020; vol. 11; Article No. 191; Nature Research.

\* cited by examiner

ORGANIC LONG PERSISTENCE LUMINESCENCE COMPOSITIONS

CROSS-REFERENCE TO RELATED APPLICATIONS

This application claims the benefit of priority of U.S. Provisional Application No. 62/921,030, filed on May 29, 2019, the contents of which being hereby incorporated by reference in their entirety for all purposes.

TECHNICAL FIELD

The present disclosure generally relates to room temperature organic long persistence luminescence (OLPL) compositions that can show afterglow emission of 7 hours or more after removing the excitation source and articles comprising the same. The compositions can also exhibit efficient white phosphorescent emission.

BACKGROUND

Long persistent luminescence (LPL) materials are highly sought after in areas such as life sciences, and the biomedical field. LPL materials demonstrate huge potential, but the most successful systems are inorganic systems. Inorganic LPL materials are able and luminesce for very long periods of time (up to 72 h), but often require harsh synthetic procedures, leading to costly processing. LPL materials are desirable for biomedical applications due, in part, to their ability to overcome autofluorescence. However, the use of metal-containing LPL material in biomedical applications can be limited due to their toxicity. Organic LPL materials offer the promise of a multitude of benefits: easy synthesis/modification for targeted functionality, easy processing, and can be biologically inert.

In order to reach long lifetimes in organic room temperature phosphorescent (ORTP) systems, researchers have often exploited the triplet excited state. The development of metal-free organic phosphorescence systems has drawn considerable attention because of their intriguing applications, such as low-cost anti-counterfeiting technologies, display, sensing, and bio-imaging. However, mechanistic understandings of ORTP systems are still under investigation and thus structural design strategies are still in development.

A major obstacle in the development of ORTP systems is weak spin orbital coupling (SOC), leading to long-lived triplet-states, which are easily quenched by atmospheric oxygen and rapid nonradiative vibrational relaxation. To achieve an efficient ORTP two things need to be considered: (i) efficient intersystem crossing (ISC), and (ii) blocking or minimizing nonradiative relaxation. Several strategies have been made in the development of pure organic RTP material, such as halogen bonding in co-crystals, crystallization induces phosphorescence, introduction of heavy atoms, the presence of heteroatoms (N, O, P, and S), host-guest systems, H-aggregate enhanced phosphorescence and others.

Accordingly, there exists a need to develop improved room temperature phosphorescence and long persistence luminescence compositions that address or overcome at least of the aforementioned challenges.

SUMMARY

The present disclosure provides a series of quaternary phosphonium bromide salts that exhibit have facile access to the triplet excited state by its radical pair or exciplex formation. Without wishing to be bound by theory, it is believed that based on experimental and theoretical investigations that the efficient spin-orbital charge transfer (SOCT) and hyperfine induced coupling (HFC) may play a crucial role to achieve an efficient organic RTP system. This system could be used as a strong electron acceptor to trap the excited state to prolong persistence luminescence of up to 5 hours in the presence of a donor molecule.

In a first aspect, provided herein is a composition comprising an electron-accepting compound of Formula 1:

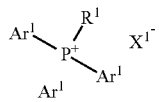

wherein $X^1$ is F, Cl, Br, I, $PF_6$, $BPh_4$, $BF_4$, $PhSO_3$ or $N(CN)_2$;

$Ar^1$ for each instance is independently aryl or heteroaryl, wherein $Ar^1$ is optionally substituted with $—(CR_2)_nA^1$, wherein n for each occurrence is independently a whole number selected from 0-20; $A^1$ is $—CO_2H$, $—C\equiv CH$, $—CNS$, $—N_3$, $—NH_2$, $—SH$, Cl, Br, I, or N-maleimide; and R for each occurrence is independently hydrogen, alkyl, alkenyl, cycloalkyl, aryl, or heteroaryl; or two instances of R taken together with the carbons to which they are attached form a 3-6 membered cycloalkyl; and $R^1$ is alkyl, alkenyl, alkynyl, cycloalkyl, or $—(CR_2)_nA^2$, wherein $A^2$ is F, Cl, Br, or I; or $A^2$ is a moiety of Formula 2:

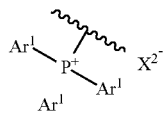

wherein $X^2$ is F, Cl, Br, I, $PF_6$, $BPh_4$, $BF_4$, $PhSO_3$, or $N(CN)_2$; and wherein the composition exhibits at least one type of emission selected from the group consisting of room temperature phosphorescence and long persistence luminescence.

In a first embodiment of the first aspect, provided herein is the composition of the first aspect, wherein the composition is substantially crystalline.

In a second embodiment of the first aspect, provided herein is the composition of the first aspect, wherein $X_1$ is bromide.

In a third embodiment of the first aspect, provided herein is the composition of the first aspect, wherein $R^1$ is alkyl or $—(CR_2)_nA^2$, wherein $A^2$ is bromide or the moiety of Formula 2; and R is hydrogen.

In a fourth embodiment of the first aspect, provided herein is the composition of the first aspect, wherein $Ar^1$ for each instance is independently aryl.

In a fifth embodiment of the first aspect, provided herein is the composition of the first aspect, wherein $Ar^1$ for each instance is independently aryl, wherein one instance of Ar is optionally substituted with $—(CH_2)_nA^1$, wherein n for each occurrence is independently a whole number selected from 2-6; $A^1$ is $—CO_2H$, $—C\equiv CH$, $—CNS$, $—N_3$, $—NH_2$, $—SH$, Cl, Br, I, or N-maleimide; and $R^1$ is alkyl or $—(CH_2)_nA^2$, wherein A² is hydrogen, bromide, or the moiety of Formula 2; and the composition is substantially crystalline.

In a sixth embodiment of the first aspect, provided herein is the composition of the first aspect, wherein Ar for each instance is independently optionally substituted phenyl.

In a seventh embodiment of the first aspect, provided herein is the composition of the first aspect, wherein the electron-accepting compound has the Formula 3:

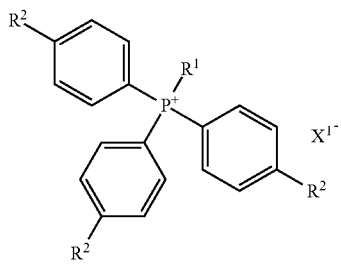

3 wherein R² for each occurrence is independently hydrogen, alkyl, aryl, aryloxy, or —(CR₂)ₙA¹.

In an eighth embodiment of the first aspect, provided herein is the composition of the first aspect, wherein the electron-accepting compound is selected from the group consisting of:

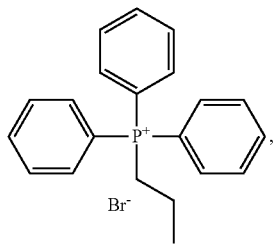

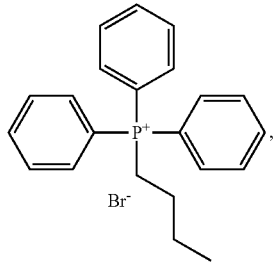

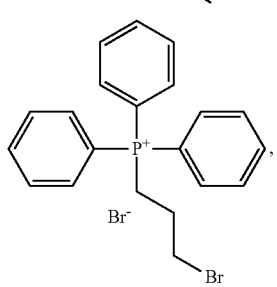

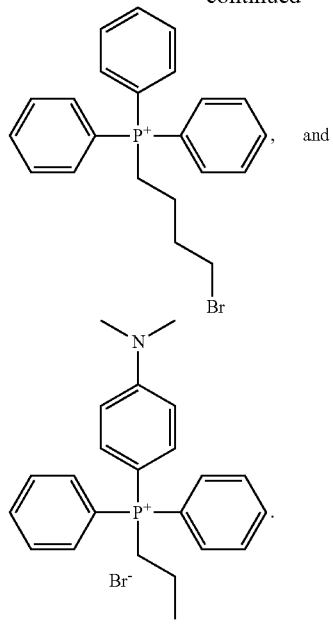

and

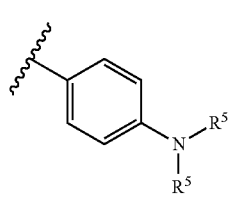

In a ninth embodiment of the first aspect, provided herein is the composition of the first aspect, further comprising at least one electron-donating compound having the Formula 4:

$$Ar^2(R^3)_n \qquad 4$$

wherein n is 1, 2, 3, or 4;

Ar² is aryl, heteroaryl, or tetrarylmethane; and

R³ is N(R⁴)₂, wherein R⁴ for each occurrence is independently selected from the group consisting of alkyl, alkenyl, alkynyl, cycloalkyl, aryl, heteroaryl, —(CR₂)ₙA¹, and a moiety of Formula 5:

5 wherein R⁵ for each occurrence is independently alkyl, optionally substituted phenyl; or R⁴.

In a tenth embodiment of the first aspect, provided herein is the composition of the ninth embodiment of the first aspect, wherein the at least one electron-donating compound is selected from the group consisting of:

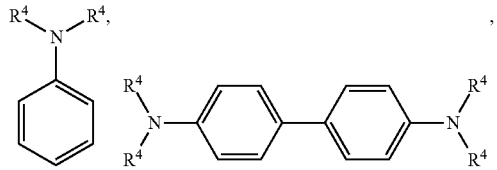

-continued
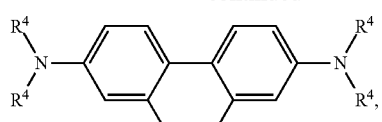
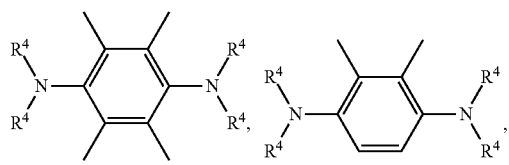
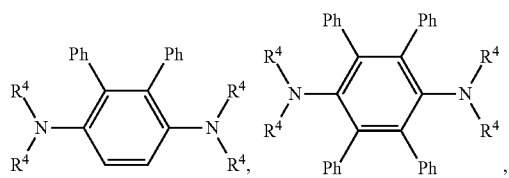
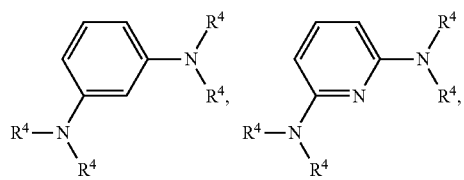
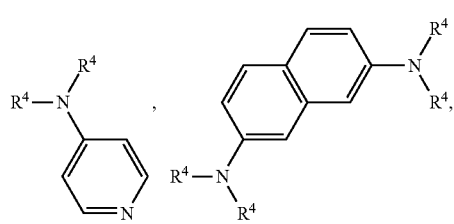
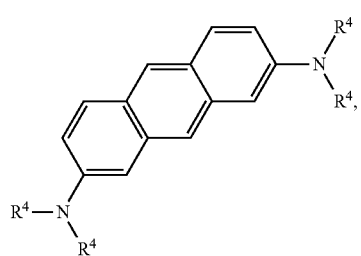
-continued
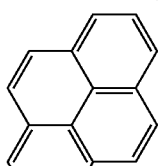
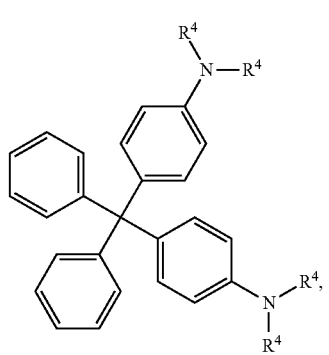
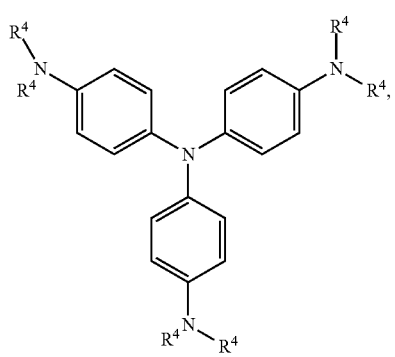
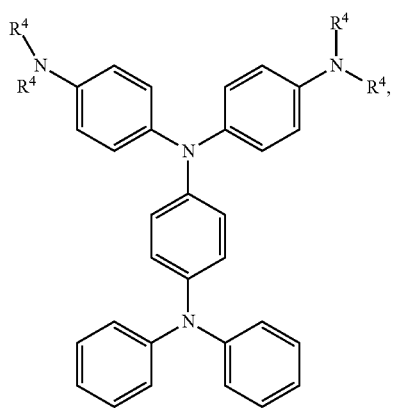

-continued

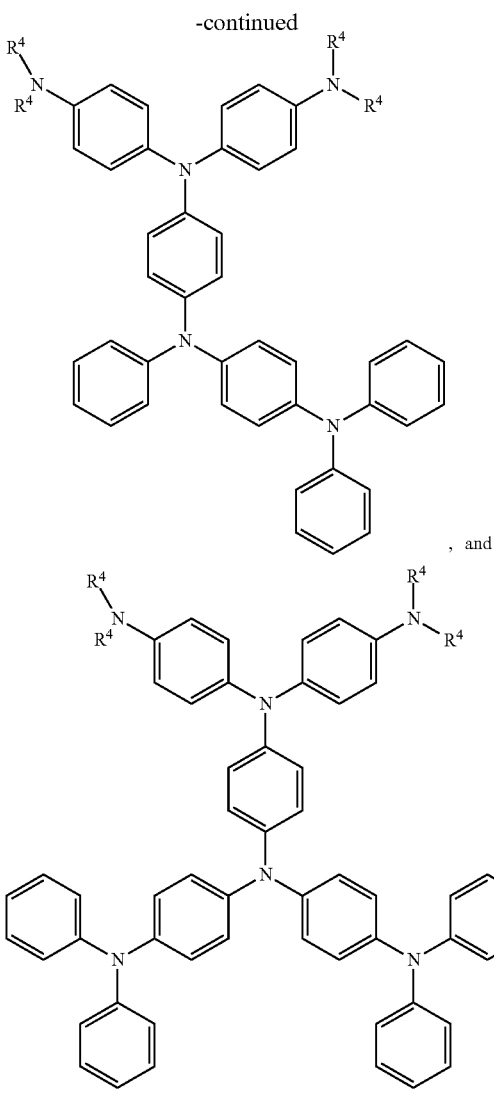

, and wherein R⁴ for each occurrence is independently alkyl or —(CR₂)ₙA¹.

In an eleventh embodiment of the first aspect, provided herein is the composition of the tenth embodiment of the first aspect, wherein R⁴ is methyl.

In a twelfth embodiment of the first aspect, provided herein is the composition of the tenth embodiment of the first aspect, wherein the at least one electron-donating compound is N,N-dimethylaniline.

In a thirteenth embodiment of the first aspect, provided herein is the composition of the eighth embodiment of the first aspect, further comprising an electron-donating compound, wherein the electron-donating compound is N,N-dimethylaniline; and the composition is substantially crystalline.

In a second aspect, provided herein is a composition comprising a compound of Formula 6:

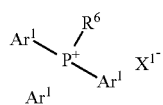

6 wherein X¹ is F, Cl, Br, I, PF₆, BPh₄, BF₄, PhSO₃ or N(CN)₂;

Ar¹ for each occurrence is independently aryl or heteroaryl; and

R⁶ is —(CR₂)ₙAr³, wherein n for each occurrence is independently a whole number selected from 1-20; R for each occurrence is independently hydrogen, alkyl, alkenyl, cycloalkyl, aryl, or heteroaryl; or two instances of R taken together with the carbons to which they are attached form a 3-6 membered cycloalkyl; and Ar³ is a nitrogen containing heteroaryl, wherein one instance of Ar¹ or Ar³ is optionally substituted with —(CR₂)ₙA¹, wherein A¹ is —CO₂H, —C≡CH, —CNS, —N₃, —NH₂, —SH, Cl, Br, I, or N-maleimide, and wherein the composition exhibits at least one type of emission selected from the group consisting of room temperature phosphorescence and long persistence luminescence.

In a first embodiment of the second aspect, provided herein is the composition of the second aspect, wherein the composition is substantially crystalline.

In a second embodiment of the second aspect, provided herein is the composition of the second aspect, wherein the nitrogen containing heteroaryl is selected from the group consisting of: optionally substituted carbazole, optionally substituted pyrrole, optionally substituted indole, and optionally substituted pyridinium.

In a third embodiment of the second aspect, provided herein is the composition of the second embodiment of the second aspect, wherein the compound has Formula 7:

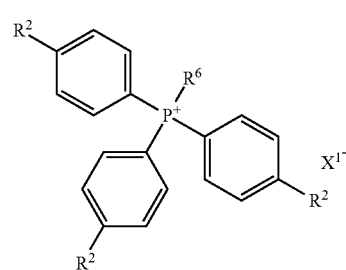

7 wherein R² for each occurrence is independently hydrogen, alkyl, aryl, aryloxy, or —(CR₂)ₙA¹; and
R⁶ is —(CR₂)ₙAr³, wherein Ar³ is

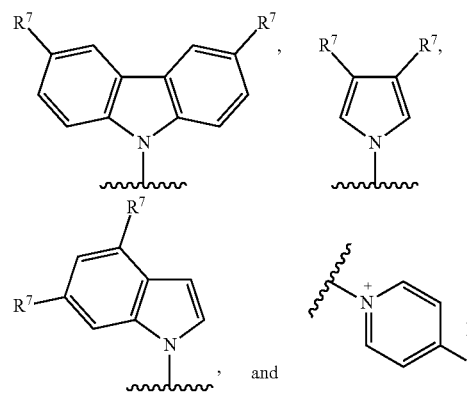

wherein X² is F, Cl, Br, I, PF₆, BPh₄, BF₄, PhSO₃, or N(CN)₂; and

R[7] for each occurrence is independently hydrogen, Cl, Br, I, cyano, nitro, alkyl, alkenyl, alkynyl, aryl, heteroaryl, aryloxy, heteroaryloxy, ether, amine, amide, ester, or —(CR$_2$)$_n$A[1].

In a fourth embodiment of the second aspect, provided herein is the composition of the third embodiment of the second aspect, wherein the compound is

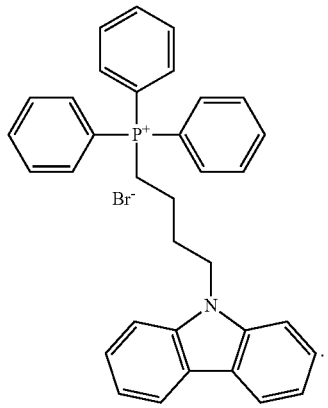 [SMILES: c1ccc([P+](CCCCn2c3ccccc3c3ccccc32)(c2ccccc2)c2ccccc2)cc1 ; [Br-]]

In a third aspect, provided herein is an article comprising a composition of the ninth embodiment of the first aspect, wherein the article is identification card, a driver's license, a passport, identity papers, a banknote, a check, a document, a paper, a stock certificate, a packaging component, a credit card, a bank card, a label, a seal, a postage stamp, a textile, a liquid, and a biological sample.

In a fourth aspect, provided herein is an article comprising a composition of the second aspect, wherein the article is identification card, a driver's license, a passport, identity papers, a banknote, a check, a document, a paper, a stock certificate, a packaging component, a credit card, a bank card, a label, a seal, a postage stamp, a textile, a liquid, and a biological sample.

DETAILED DESCRIPTION

Definitions

Figure 1:
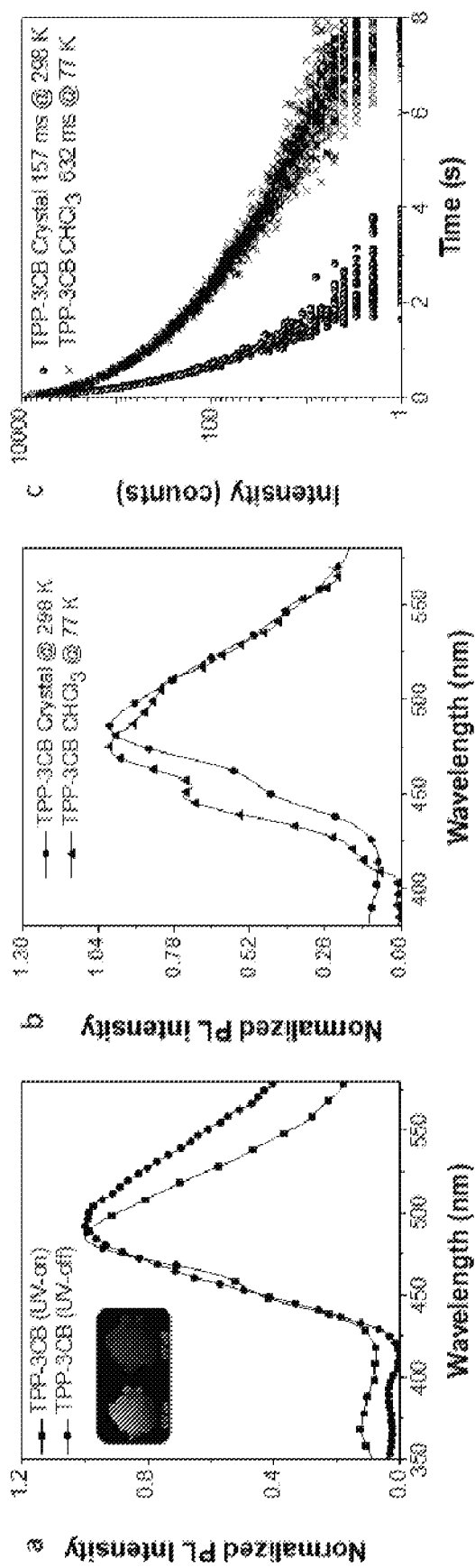
FIG. 1 depicts graphs presenting the photophysical properties of TPP-3CB. (a) Steady-state photoluminescence and phosphorescence spectra of the phosphor in the crystalline powder at 298 K; Inset: Photographs of the corresponding phosphor under 254 nm UV excitation and its subsequent afterglow; (b) Steady-state photoluminescence and (c) time-resolved PL decay at 298 K and 77 K, measured in crystalline powder and solution state. [C=10 μM].
Figure 2:
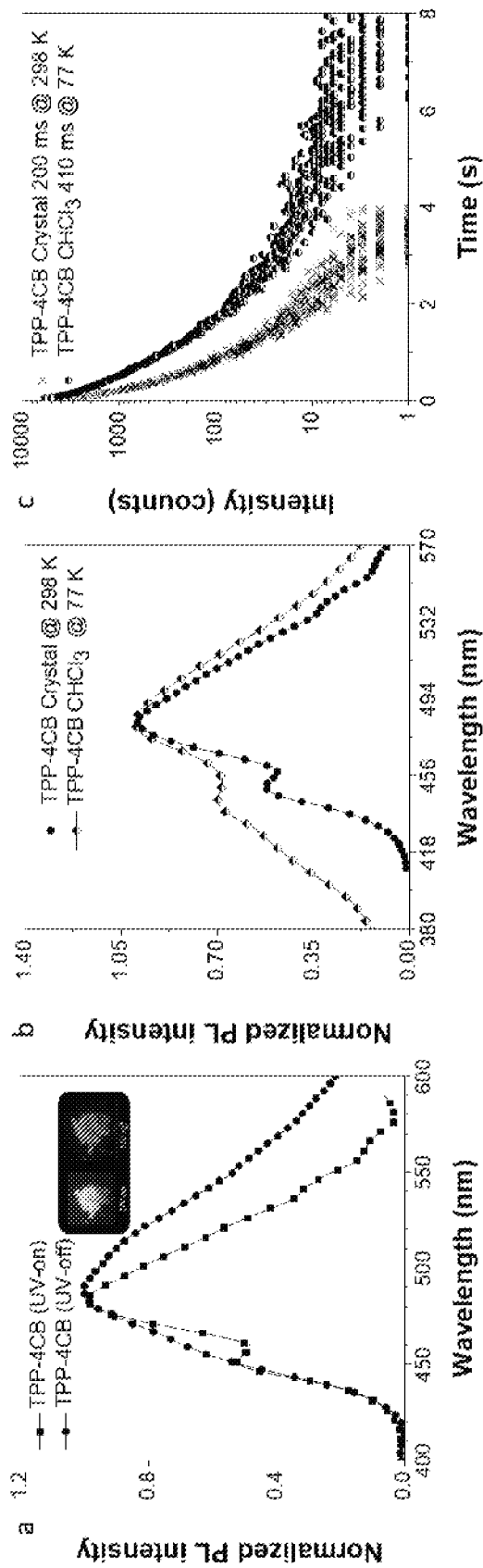
FIG. 2 depicts graphs presenting the photophysical properties of TPP-4CB. (a) Steady-state photoluminescence and phosphorescence spectra of the phosphor in the crystalline powder at 298 K; Inset: Photographs of the corresponding phosphor under 254 nm UV excitation and its subsequent afterglow; (b) Steady-state photoluminescence; and (c) time-resolved PL decay at 298 K and 77 K, measured in crystalline powder and solution state. [C=10 μM].
Figure 3:
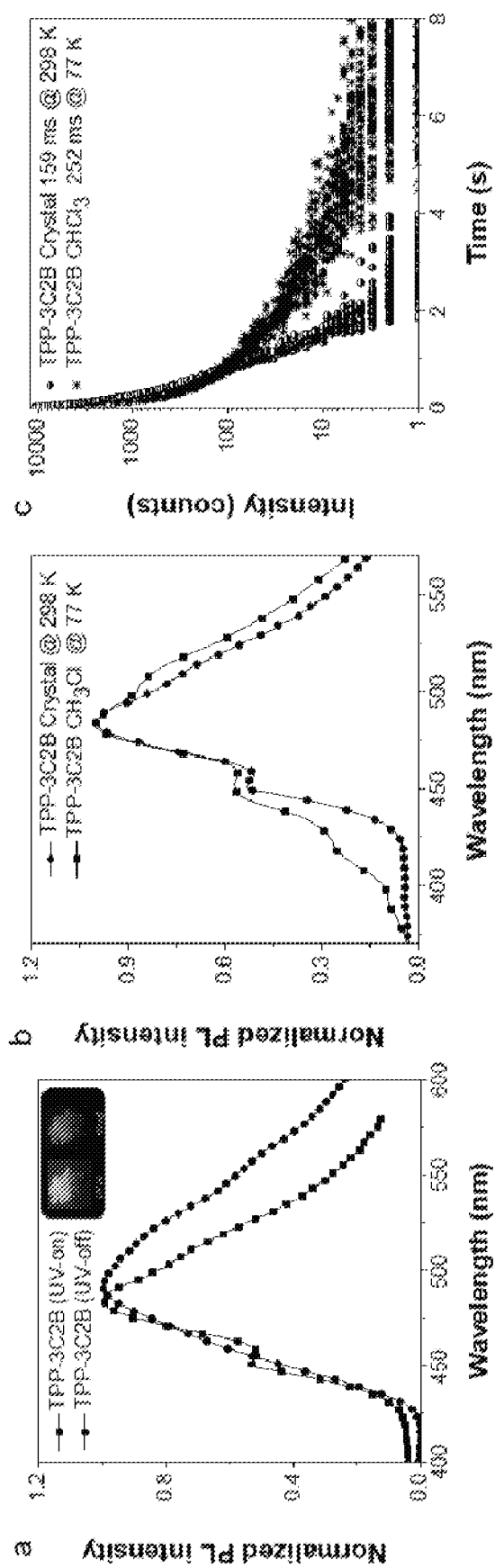
FIG. 3 depicts graphs presenting the photophysical properties of TPP-3C2B. (a) Steady-state photoluminescence and phosphorescence spectra of the phosphor in the crystalline powder at 298 K; Inset: Photographs of the corresponding phosphor under 254 nm UV excitation and its subsequent afterglow; (b) Steady-state photoluminescence; and (c) time-resolved PL decay at 298 K and 77 K, measured in crystalline powder and solution state. [C=10 μM].
Figure 4:
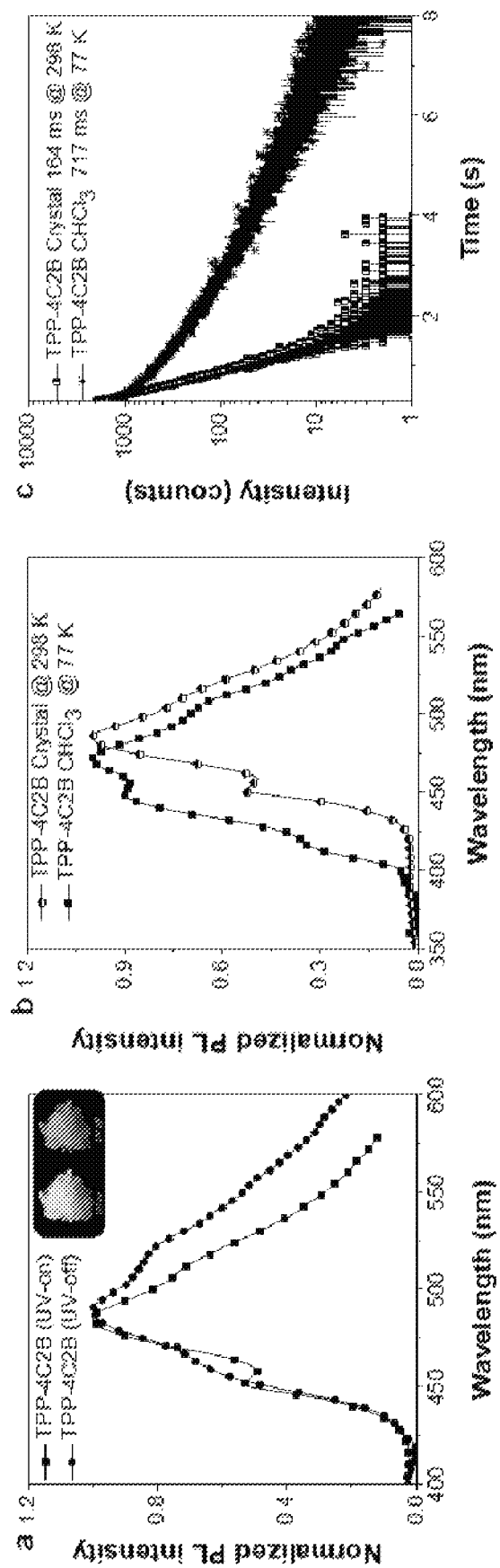
FIG. 4 depicts graphs presenting the photophysical properties of TPP-4C2B: (a) Steady-state photoluminescence (blue area under curve) and phosphorescence spectra of the phosphor (green area under curve) in the crystalline powder at 298; Inset: Photographs of the corresponding phosphor under 254 nm UV excitation and its subsequent afterglow; (b) Steady-state photoluminescence; and (c) time-resolved PL decay at 298 K and 77 K, measured in crystalline powder and solution state. [C=10 μM].
Figure 5:
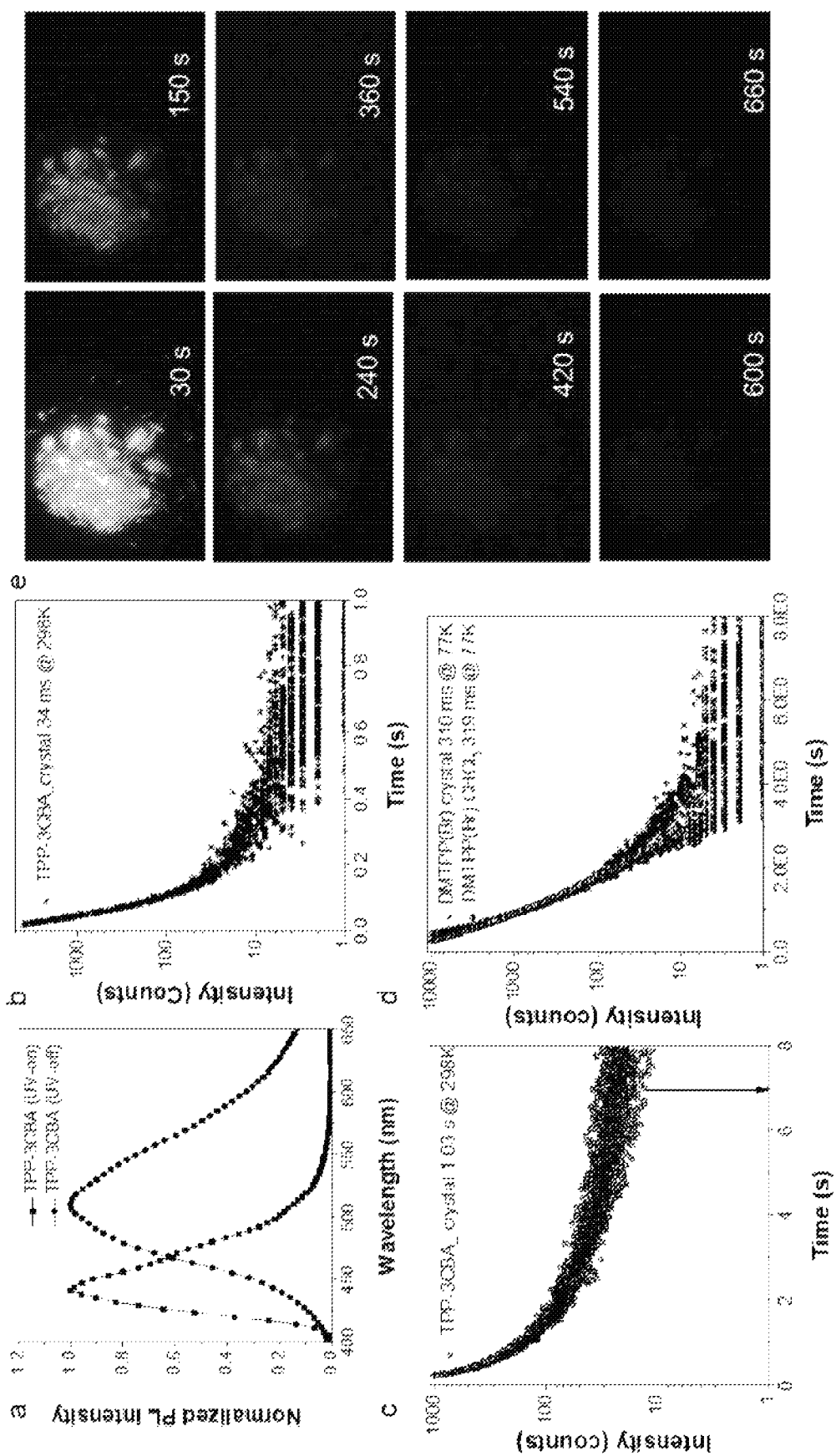
FIG. 5 depicts graphs presenting the photophysical properties and photographs showing luminesence of TPP-3CBA; (a) Steady-state photoluminescence and phosphorescence spectra of the phosphor in the crystalline powder at 298 K; (b) Time-resolved PL decay of TPP-3CBA crystals at 298 K; (c) Gated time-resolved PL decay TPP-3CBA crystal at 298 K; (d) time-resolved PL decay of TPP-3CBA crystalline powder and solution in CHCl$_3$ at 77 K; and (e), Photographs of TPP-3CBA 365 nm UV excitation source and its subsequent afterglow.
Figure 6:
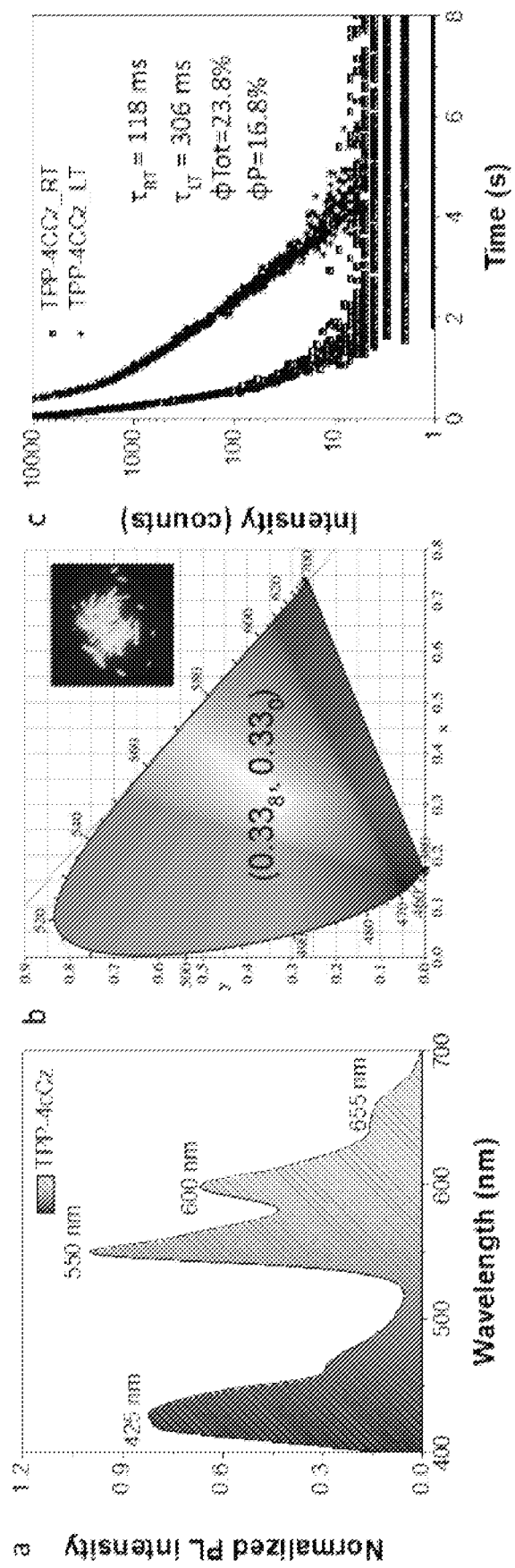
FIG. 6 depicts graphs presenting the photophysical properties of TPP-4CCz: (a) PL spectra of TPP-4CCz crystals at 298 K; (b) Commission Internationale de l'Eclairage (CIE) 1931 coordinates of the prompt emission of TPP-4CCz. Inset: photograph of TPP-4CCz crystals under 365 nm UV excitation; and (c) Temperature-dependent lifetime and phosphorescence quantum yields of TPP-4CCz.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

It should be understood that the order of steps or order for performing certain actions is immaterial so long as the present teachings remain operable. Moreover, two or more steps or actions may be conducted simultaneously.

As used herein, "halo", "halide", or "halogen" refers to fluoro, chloro, bromo, and iodo.

As used herein, "alkyl" refers to a straight-chain or branched saturated hydrocarbon group. Examples of alkyl groups include methyl (Me), ethyl (Et), propyl (e.g., n-propyl and isopropyl), butyl (e.g., n-butyl, isobutyl, sec-butyl, tert-butyl), pentyl groups (e.g., 1-methylbutyl, 2-methylbutyl, iso-pentyl, tert-pentyl, 1,2-dimethylpropyl, neopentyl, and 1-ethylpropyl), hexyl groups, and the like. In various embodiments, an alkyl group can have 1 to 40 carbon atoms (i.e., $C_1$-$C_{40}$ alkyl group), for example, 1-30 carbon atoms (i.e., $C_1$-$C_{30}$ alkyl group). In some embodiments, an alkyl group can have 1 to 6 carbon atoms, and can be referred to as a "lower alkyl group." Examples of lower alkyl groups include methyl, ethyl, propyl (e.g., n-propyl and z'-propyl), and butyl groups (e.g., n-butyl, z'-butyl, sec-butyl, tert-butyl). In some embodiments, alkyl groups can be substituted as described herein. An alkyl group is generally not substituted with another alkyl group, an alkenyl group, or an alkynyl group.

The term "aralkyl" is art-recognized and refers to an alkyl group substituted with an aryl group (e.g., an aromatic or heteroaromatic group).

As used herein, "cycloalkyl" by itself or as part of another substituent means, unless otherwise stated, a monocyclic hydrocarbon having between 3-12 carbon atoms in the ring system and includes hydrogen, straight chain, branched chain, and/or cyclic substituents. Exemplary cycloalkyls include cyclopropyl, cyclobutyl, cyclopentyl, cyclohexyl, cycloheptyl, and the like.

As used herein, "alkenyl" refers to a straight-chain or branched alkyl group having one or more carbon-carbon double bonds. Examples of alkenyl groups include ethenyl, propenyl, butenyl, pentenyl, hexenyl, butadienyl, pentadienyl, hexadienyl groups, and the like. The one or more carbon-carbon double bonds can be internal (such as in 2-butene) or terminal (such as in 1-butene). In various embodiments, an alkenyl group can have 2 to 40 carbon atoms (i.e., $C_2$-$C_{40}$ alkenyl group), for example, 2 to 20 carbon atoms (i.e., $C_2$-$C_{20}$ alkenyl group). In some embodiments, alkenyl groups can be substituted as described herein. An alkenyl group is generally not substituted with another alkenyl group, an alkyl group, or an alkynyl group.

As used herein, a "fused ring" or a "fused ring moiety" refers to a polycyclic ring system having at least two rings where at least one of the rings is aromatic and such aromatic ring (carbocyclic or heterocyclic) has a bond in common with at least one other ring that can be aromatic or non-aromatic, and carbocyclic or heterocyclic. These polycyclic ring systems can be highly p-conjugated and optionally substituted as described herein.

As used herein, "heteroatom" refers to an atom of any element other than carbon or hydrogen and includes, for example, nitrogen, oxygen, silicon, sulfur, phosphorus, and selenium.

As used herein, "aryl" refers to an aromatic monocyclic hydrocarbon ring system or a polycyclic ring system in which two or more aromatic hydrocarbon rings are fused (i.e., having a bond in common with) together or at least one aromatic monocyclic hydrocarbon ring is fused to one or more cycloalkyl and/or cycloheteroalkyl rings. An aryl group can have 6 to 24 carbon atoms in its ring system (e.g., $C_6$-$C_{24}$ aryl group), which can include multiple fused rings. In some embodiments, a polycyclic aryl group can have 8 to 24 carbon atoms. Any suitable ring position of the aryl group can be covalently linked to the defined chemical structure. Examples of aryl groups having only aromatic carbocyclic ring(s) include phenyl, 1-naphthyl (bicyclic), 2-naphthyl (bicyclic), anthracenyl (tricyclic), phenanthrenyl (tricyclic), pentacenyl (pentacyclic), and like groups. Examples of polycyclic ring systems in which at least one aromatic carbocyclic ring is fused to one or more cycloalkyl and/or cycloheteroalkyl rings include, among others, benzo derivatives of cyclopentane (i.e., an indanyl group, which is a 5,6-bicyclic cycloalkyl/aromatic ring system), cyclohexane (i.e., a tetrahydronaphthyl group, which is a 6,6-bicyclic cycloalkyl/aromatic ring system), imidazoline (i.e., a benzimidazolinyl group, which is a 5,6-bicyclic cycloheteroalkyl/aromatic ring system), and pyran (i.e., a chromenyl group, which is a 6,6-bicyclic cycloheteroalkyl/aromatic ring system). Other examples of aryl groups include benzodioxanyl, benzodioxolyl, chromanyl, indolinyl groups, and the like. In some embodiments, aryl groups can be optionally substituted as described herein. The aryl ring may be substituted at one or more positions with such substituents as described herein, as for example, halogen, alkyl, aralkyl, alkenyl, alkynyl, cycloalkyl, hydroxyl, aryloxy, heteroaryloxy, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like. In some embodiments, an aryl group can have one or more halogen substituents, and can be referred to as a "haloaryl" group. Perhaloaryl groups, i.e., aryl groups where all of the hydrogen atoms are replaced with halogen atoms (e.g., —$C_6F_5$), are included within the definition of "haloaryl." In certain embodiments, an aryl group is substituted with another aryl group and can be referred to as a biaryl group. Each of the aryl groups in the biaryl group can be optionally substituted as disclosed herein.

The term "aryloxy" refers to a monovalent group of formula —O-aryl.

The term "heteroaryloxy" refers to a monovalent group of formula —O-heteroaryl.

As used herein, "heteroaryl" refers to an aromatic monocyclic ring system containing at least one ring heteroatom selected from oxygen (O), nitrogen (N), sulfur (S), silicon (Si), and selenium (Se) or a polycyclic ring system where at least one of the rings present in the ring system is aromatic and contains at least one ring heteroatom. Polycyclic heteroaryl groups include those having two or more heteroaryl rings fused together, as well as those having at least one monocyclic heteroaryl ring fused to one or more aromatic carbocyclic rings, non-aromatic carbocyclic rings, and/or non-aromatic cycloheteroalkyl rings. A heteroaryl group, as a whole, can have, for example, 5 to 24 ring atoms and contain 1-5 ring heteroatoms (i.e., 5-20 membered heteroaryl group). The heteroaryl group can be attached to the defined chemical structure at any heteroatom or carbon atom that results in a stable structure. Generally, heteroaryl rings do not contain O—O, S—S, or S—O bonds. However, one or more N or S atoms in a heteroaryl group can be oxidized (e.g., pyridine N-oxide thiophene S-oxide, thiophene S,S-dioxide). Examples of heteroaryl groups include, for example, the 5- or 6-membered monocyclic and 5-6 bicyclic ring systems shown below: where T is O, S, NH, N-alkyl, N-aryl, N-(arylalkyl) (e.g., N-benzyl), $SiH_2$, SiH(alkyl), Si(alkyl)$_2$, SiH(arylalkyl), Si(arylalkyl)$_2$, or Si(alkyl)(arylalkyl). Examples of such heteroaryl rings include pyrrolyl, furyl, thienyl, pyridyl, pyrimidyl, pyridazinyl, pyrazinyl, triazolyl, tetrazolyl, pyrazolyl, imidazolyl, isothiazolyl, thiazolyl, thiadiazolyl, isoxazolyl, oxazolyl, oxadiazolyl, indolyl, isoindolyl, benzofuryl, benzothienyl, quinolyl, 2-methylquinolyl, isoquinolyl, quinoxalyl, quinazolyl, benzotriazolyl, benzimidazolyl, benzothiazolyl, benzisothiazolyl, benzisoxazolyl, benzoxadiazolyl, benzoxazolyl, cinnolinyl, 1H-indazolyl, 2H-indazolyl, indolizinyl, isobenzofuryl, naphthyridinyl, phthalazinyl, pteridinyl, purinyl, oxazolopyridinyl, thiazolopyridinyl, imidazopyridinyl, furopyridinyl, thienopyridinyl, pyridopyrimidinyl, pyridopyrazinyl, pyridopyrdazinyl, thienothiazolyl, thienooxazolyl, thienoimidazolyl groups, and the like. Further examples of heteroaryl groups include 4,5,6,7-tetrahydroindolyl, tetrahydroquinolinyl, benzothienopyridinyl, benzofuropyridinyl groups, and the like. In some embodiments, heteroaryl groups can be optionally substituted as described herein. The heterocyclic ring may be substituted at one or more positions with such substituents as described herein, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like. A "nitrogen containing heteroaryl" is a heteroaryl as defined herein with an aromatic ring system having at least one ring nitrogen (N).

The term "optionally substituted" refers to a chemical group, such as alkyl, cycloalkyl, aryl, heteroaryl, and the like, wherein one or more hydrogen may be replaced with a substituent as described herein, for example, halogen, azide, alkyl, aralkyl, alkenyl, alkynyl, cycloalkyl, hydroxyl, aryloxy, heteroaryloxy, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, or the like The term "substantially crystalline" refers to compositions or compounds with at least 70% by weight, at least 75% by weight, at least 80% by weight, at least 85% by weight, at least 90 by weight, at least 95% by weight, at least 96% by weight, at least 97% by weight, at least 98% by weight, at least 99% by weight, at least 99.5% by weight, or more of the composition or compound is present in crystalline form. The compositions or compounds can exist in a single crystalline form or more than one crystalline form. In certain embodiments, the composition or compound has at least 70% by weight, at least 75% by weight, at least 80% by weight, at least 85% by weight, at least 90 by weight, at least 95% by weight, at least 96% by weight, at least 97% by weight, at least 98% by weight, at least 99% by weight, at least 99.5% by weight, or more of the composition or compound present in a single crystalline form. The degree (%) of crystallinity may be determined by the skilled person using X-ray powder diffraction (XRPD). Other techniques, such as solid state NMR, FT-IR, Raman spectroscopy, differential scanning calorimetry (DSC) and microcalorimetry, may also be used.

The term "substantially pure" when used in connection with a sample of a compound or composition described herein means that the sample contains at least 60% by weight of the compound or composition. In certain embodiments, the sample contains at least 70% by weight of the compound or composition; at least 75% by weight of the compound or composition; at least 80% by weight of the compound or composition; at least 85% by weight of the compound or composition; at least 90% by weight of the compound or composition; at least 95% by weight of the compound or composition; at least 98% by weight of the compound or composition; at least 99% by weight of the compound or composition; at least 99.5% by weight of the compound or composition; at least 99.9% by weight of the compound or composition or greater.

The representation "1" as used herein in connection to chemical a group or moiety is intended to represent the covalent bond that the aforementioned chemical group or moiety is covalently bonded to another chemical group or moiety.

The term "$\lambda_{ex}$" as used herein refers to the excitation wavelength.

The term "$\lambda_{em}$" as used herein refers to the emission wavelength.

The term "room temperature" means a temperature in the range of 20° C. to 25° C.

The present disclosure provides organic compositions exhibiting room temperature phosphorescence and/or long persistence luminescence. In certain embodiments, the composition comprises an electron-accepting compound of Formula 1:

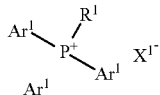

wherein $X^1$ is F, Cl, Br, I, $PF_6$, $BPh_4$, $BF_4$, $PhSO_3$, or $N(CN)_2$;

$Ar^1$ for each instance is independently aryl or heteroaryl, wherein $Ar^1$ is optionally substituted with $-(CR_2)_nA^1$, wherein n for each occurrence is independently a whole number selected from 0-20; $A^1$ is $-CO_2H$, $-C\equiv CH$, $-C\equiv CH$, $-CNS$, $-N_3$, $-NH_2$, $-SH$, Cl, Br, I, or N-maleimide; and R for each occurrence is independently hydrogen, alkyl, alkenyl, cycloalkyl, aryl, or heteroaryl; or two instances of R taken together with the carbons to which they are attached form a 3-6 membered cycloalkyl; and $R^1$ is alkyl, alkenyl, alkynyl, cycloalkyl, or $-(CR_2)_nA^2$, wherein $A^2$ is hydrogen, F, Cl, Br, or I; or $A^2$ is a moiety of Formula 2:

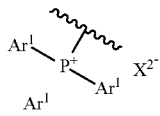

wherein $X^2$ is F, Cl, Br, I, $PF_6$, $BPh_4$, $BF_4$, $PhSO_3$, or $N(CN)_2$.

In certain embodiments, the electron-accepting compound of Formula 1 contains no more than one instance of $-(CR_2)_nA^1$.

In certain embodiments, the compositions or compounds provided herein are substantially pure and/or substantially crystalline. In certain embodiments, the compositions or compounds provided herein are substantially pure and substantially crystalline.

In certain embodiments, $X^1$ is F, Cl, Br, or I; or $X^1$ is Br.

In certain embodiments, each instance of $Ar^1$ is independently optionally substituted aryl. Exemplary aryl groups include, but are not limited to, optionally substituted phenyl, optionally substituted biphenyl, optionally substituted terphenyl, optionally substituted napthyl, optionally substituted phenanthryl, optionally substituted anthracenyl, optionally substituted acenaphthyl, optionally substituted pyrenyl, and optionally substituted fluorenyl, and the like. In certain embodiments, each instance of $Ar^1$ is optionally substituted phenyl.

In certain embodiments, $R^1$ is an alkyl selected from $C_1$-$C_{20}$ alkyl, $C_1$-$C_{18}$ alkyl, $C_1$-$C_{16}$ alkyl, $C_1$-$C_{14}$ alkyl, $C_1$-$C_{12}$ alkyl, $C_1$-$C_{10}$ alkyl, $C_1$-$C_8$ alkyl, $C_1$-$C_6$ alkyl, or $C_2$-$C_6$ alkyl. In instances in which $R^1$ is alkenyl or alkynyl, $R^1$ can be selected from $C_2$-$C_{20}$, $C_2$-$C_{15}$, $C_2$-$C_{16}$, $C_2$-$C_{14}$, $C_2$-$C_{12}$, $C_2$-$C_{10}$, $C_2$-$C_8$, or $C_2$-$C_6$ alkenyl or alkynyl. In instances in which $R^1$ is cycloalkyl, $R^1$ can be selected from $C_3$-$C_{20}$, $C_3$-$C_{18}$, $C_3$-$C_{16}$, $C_3$-$C_{14}$, $C_3$-$C_{12}$, $C_3$-$C_{10}$, $C_3$-$C_8$, or $C_3$-$C_6$ cycloalkyl.

In instances in which $R^1$ is $-(CR_2)_nA^2$, n can be a whole number selected from the group consisting of 0-20, 1-20, 1-18, 1-16, 1-14, 1-12, 1-10, 1-8, 1-6, 2-6, 2-4, 0-6, 0-4, or 0-2. R for each occurrence can be selected from hydrogen or $C_1$-$C_3$ alkyl. In certain embodiments, R for each occurrence is independently hydrogen or methyl. In certain embodiments, R is hydrogen. In certain embodiments, $A^2$ is Br, $-CO_2H$, $-C\equiv CH$, $-CNS$, $-N_3$, $-NH_2$, $-SH$, Cl, Br, I, N-maleimide, or a moiety of Formula 2. In certain embodiments, $A^2$ is Br or a moiety of Formula 2.

In certain embodiments, the moiety of Formula 2 has the Formula 2a;

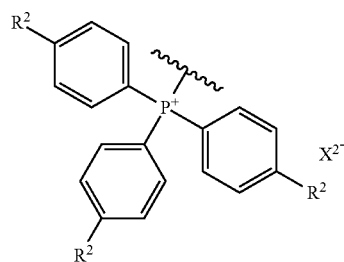

wherein $R^2$ for each occurrence is independently hydrogen, alkyl, aryl, aryloxy, heteroaryloxy, or $-(CH_2)_nA^1$, wherein n for each occurrence is a whole number selected from 1-10; and $A^1$ is $-CO_2H$, $-C\equiv CH$, $-CNS$, $-N_3$, $-NH_2$, $-SH$, Cl, Br, I, or N-maleimide. In certain embodiments, $R^2$ is selected from the group consisting of optionally substituted phenyl, optionally substituted biphenyl, optionally substituted terphenyl, optionally substituted napthyl, optionally substituted phenanthryl, optionally substituted anthracenyl, optionally substituted acenaphthyl, optionally substituted pyrenyl, and optionally substituted fluorenyl, $-O$-(optionally substituted phenyl), $-O$-(optionally substituted biphenyl), $-O$-(optionally substituted terphenyl), $-O$-(optionally substituted napthyl), $-O$-(optionally substituted phenanthryl), $-O$-(optionally substituted anthracenyl), $-O$-(optionally substituted acenaphthyl), $-O$-(optionally substituted pyrenyl), and $-O$-(optionally substituted fluorenyl). In certain embodiments, each $R^2$ is hydrogen. In certain embodiments, once instance of $R^2$ is —$(CR_2)_nA^1$, wherein n for each occurrence is independently a whole number selected from the group consisting of 1-6; 2-6; and 2-4; $A^1$ is —$CO_2H$, —C≡CH, —CNS, —$N_3$, —$NH_2$, —SH, Cl, Br, I, or N-maleimide; and R is hydrogen.

In certain embodiments, the electron-accepting compound of Formula 1 can be represented by the Formula 1a:

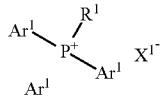

1a wherein $Ar^1$ for each instance is independently optionally substituted phenyl; $R^1$ is alkyl, alkenyl, alkynyl, cycloalkyl, or —$(CH_2)_nA^2$; and $A^2$ is Cl, Br, I or a moiety of Formula 2:

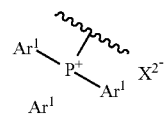

2 wherein $X^2$ is F, Cl, Br, I, $PF_6$, $BPh_4$, $BF_4$, $PhSO_3$, or $N(CN)_2$, and wherein one instance of $Ar^1$ is optionally substituted with —$(CH_2)_nA^1$, wherein $A^1$ is —$CO_2H$, —C≡CH, —CNS, —$N_3$, —$NH_2$, —SH, Cl, Br, I, or N-maleimide.

In certain embodiments, the compound of Formula 1 can be represented by the Formula 1b:

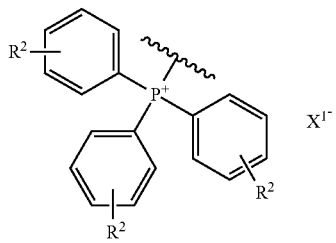

1b wherein $X^1$, $R^1$, and $R^2$ are as defined herein.

In certain embodiments, the electron-accepting compound has the Formula 3:

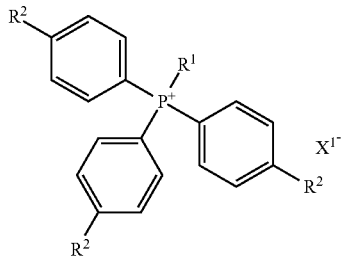

3 wherein $X^1$ is F, Cl, Br, I, $PF_6$, $BPh_4$, $BF_4$, $PhSO_3$, or $N(CN)_2$; $R^1$ is alkyl or —$(CH_2)_nA^2$, wherein n for each occurrence is independently a whole number selected from 1-10; $A^2$ is Cl, Br, I or a moiety of Formula 2a:

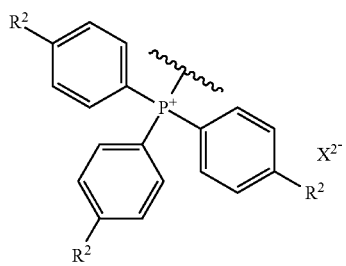

2a wherein $X^2$ is F, Cl, Br, I, $PF_6$, $BPh_4$, $BF_4$, $PhSO_3$, or $N(CN)_2$; and $R^2$ for each occurrence is independently hydrogen, alkyl, aryl, or aryloxy, heteroaryloxy, wherein one instance of $R^2$ is optionally —$(CH_2)_nA^1$, wherein $A^1$ is —$CO_2H$, —C≡CH, —CNS, —$N_3$, —$NH_2$, —SH, Cl, Br, I, or N-maleimide.

In certain embodiments, the electron-accepting compound is selected from the group consisting of:

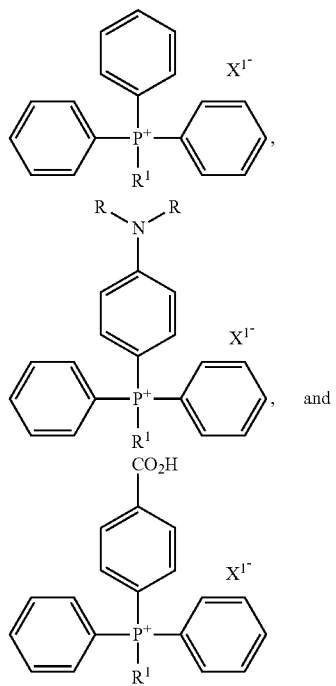

or a conjugate salt thereof, wherein $X^1$ is F, Cl, Br, I, $PF_6$, $BPh_4$, $BF_4$, $PhSO_3$, or $N(CN)_2$; R for each occurrence is independently alkyl, aryl, or heteroaryl; or two instances of R taken together with the carbons to which they are attached form a 3-6 membered cycloalkyl; and $R^1$ is alkyl or —$(CR_2)_nA^2$, wherein n is whole number selected from 1-10; and $A^2$ is Br.

In certain embodiments, the electron-accepting compound is selected from the group consisting of:
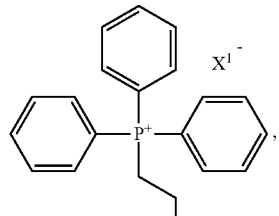
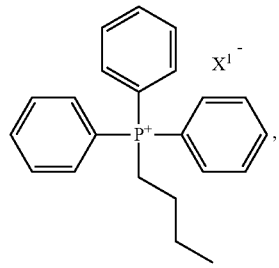
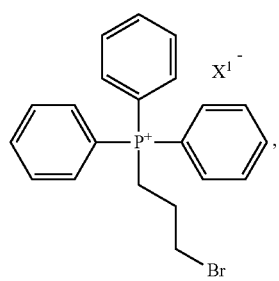
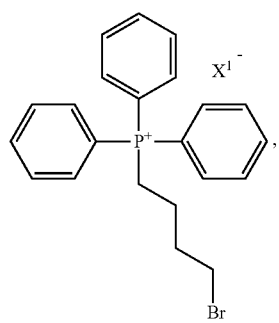
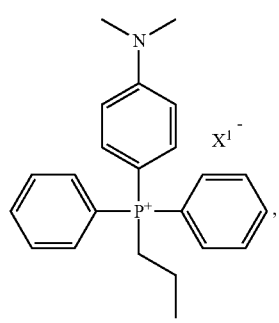
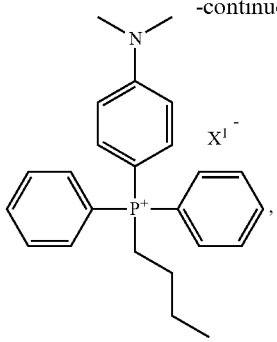
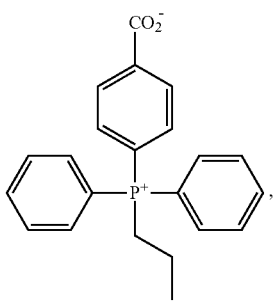
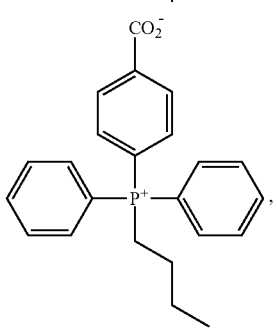
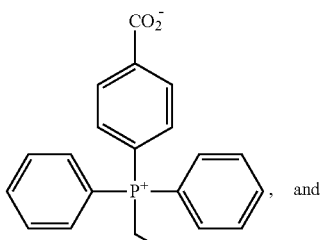
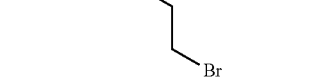
, and
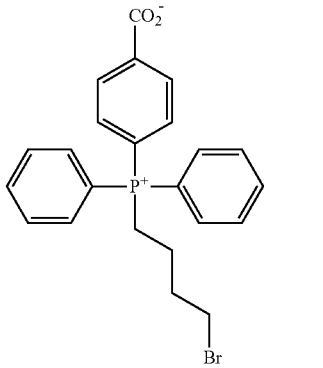
Or a conjugate acid thereof, wherein $X^1$ is Cl, Br, I, $PF_6$, $BPh_4$, $BF_4$, $PhSO_3$, or $N(CN)_2$.

In alternative embodiments, the electron-accepting compound is selected from the group consisting of:

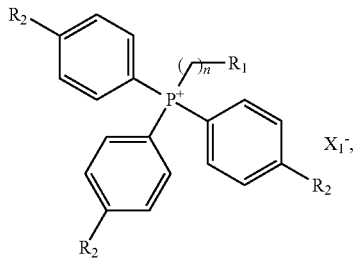

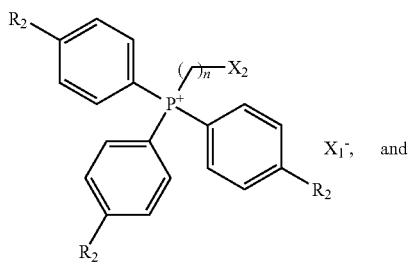

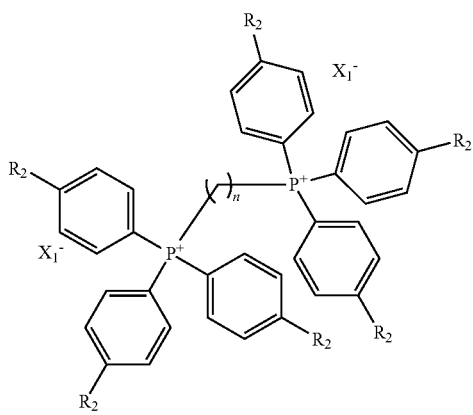

wherein the $R_1$ and $R_2$ are selected from $C_nH_{2n+1}$, $C_{10}H_7$, $C_6H_5$, $C_{12}H_9$, $OC_6H_5$, $OC_{10}H_7$ and $OC_{12}H_9$, N-carbazole, N-indole, N-imidazole, $C_nH_{2n}COOH$, $C_nH_{2n}NCS$, $C_nH_{2n}N_3$, $C_nH_{2n}NH_2$, $C_nH_{2n}Cl$, $C_nH_{2n}Br$, $C_nH_{2n}I$ with n=0 to 20 and $X_1$, $X_2$, and $X_3$ are selected from F, Cl, Br, I, and $X_1/X_3$ can be $PF_6$, $BPh_4$, $BF_4$, $PhSO_3$, and $N(CN)_2$.

In certain embodiments, the compositions comprising an electron-acceptor compound of Formula 1 further comprise at least one electron-donating compound, wherein the at least one electron-donating compound is a heteroarylamine or arylamine. In certain embodiments, the at least one electron-donating compound has the Formula 4:

$$Ar^2(R^3)_n \qquad 4$$

wherein n is 1, 2, 3, or 4;
$Ar^2$ is aryl, heteroaryl, or tetrarylmethane; and
$R^3$ is $N(R_4)_2$, wherein $R_4$ for each occurrence is independently selected from the group consisting of alkyl, alkenyl, alkynyl, cycloalkyl, aryl, heteroaryl, —$(CR_2)_nA^1$, and a moiety of Formula 5:

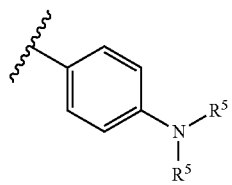

wherein $R^5$ for each occurrence is independently alkyl, optionally substituted phenyl, or $R^4$, and wherein n, R, and $A^1$ are as defined herein.

In instances in which $Ar^2$ is aryl, it can be selected from the group consisting of substituted phenyl, optionally substituted biphenyl, optionally substituted terphenyl, optionally substituted napthyl, optionally substituted phenanthryl, optionally substituted anthracenyl, optionally substituted acenaphthyl, optionally substituted pyrenyl, and optionally substituted fluorenyl, and the like. In certain embodiments, $Ar^2$ is optionally substituted phenyl.

In instances in which $Ar^2$ is tetrarylmethane, the tetrarylmethane can comprise four aryls independently selected from the group consisting of optionally substituted phenyl, optionally substituted biphenyl, optionally substituted terphenyl, optionally substituted napthyl, optionally substituted phenanthryl, optionally substituted anthracenyl, optionally substituted acenaphthyl, optionally substituted pyrenyl, and optionally substituted fluorenyl, and the like. In certain embodiments, the tetrarylmethane comprises four independently selected optionally substituted phenyls.

In instances in which $Ar^2$ is tetrarylmethane, each instance of $R^3$ can be covalently bonded to the same aryl group or different aryl groups of the tetrarylmethane.

In instances in which $R^4$ is an aryl, the aryl can be optionally substituted phenyl, optionally substituted biphenyl, optionally substituted terphenyl, optionally substituted napthyl, optionally substituted phenanthryl, optionally substituted anthracenyl, optionally substituted acenaphthyl, optionally substituted pyrenyl, and optionally substituted fluorenyl, and the like.

In certain embodiments, the moiety of Formula 5 for each occurrence is independently selected from the group consisting of:

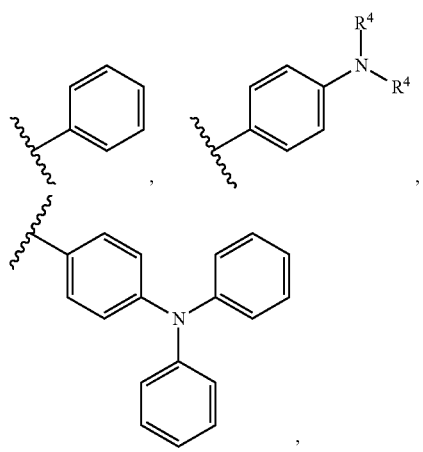

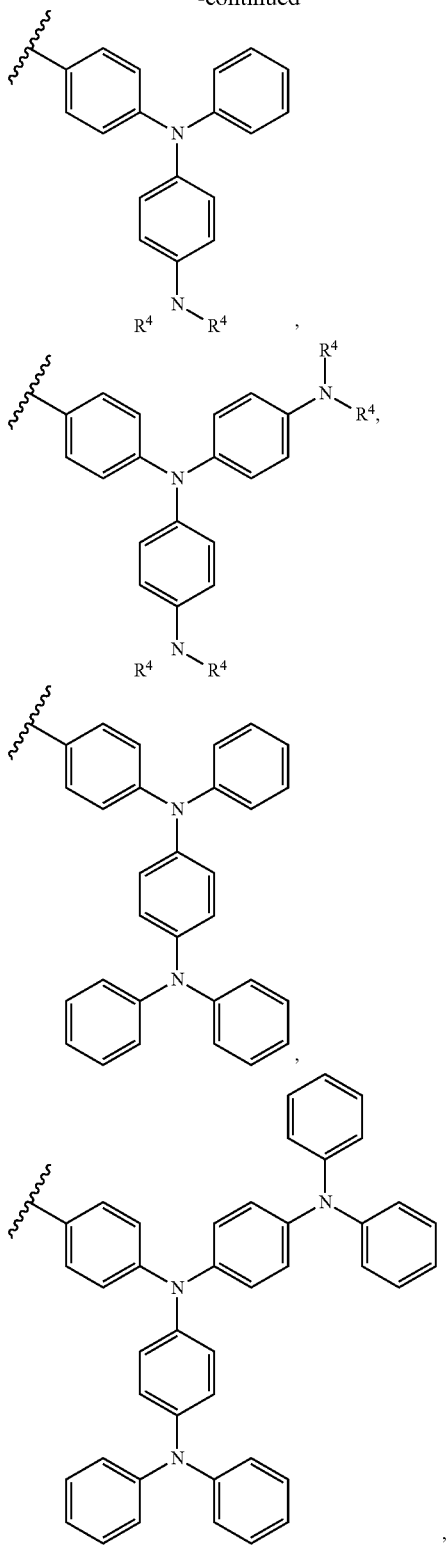
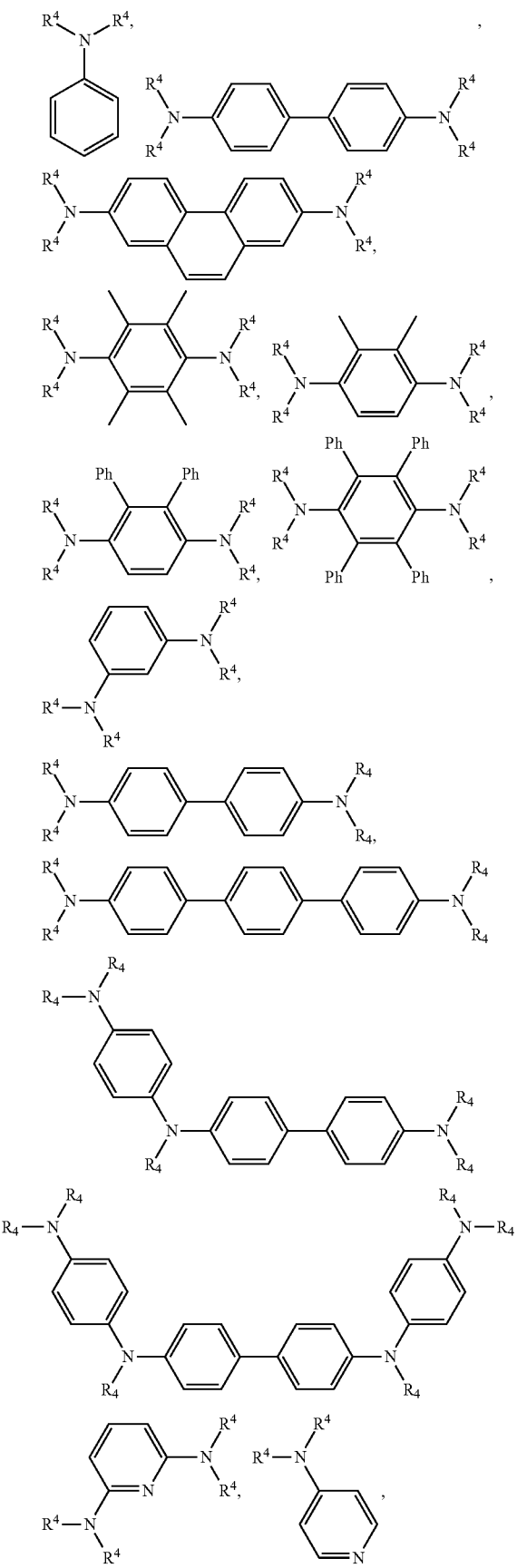
wherein $R_4$ for each occurrence is independently selected from the group consisting of alkyl, alkenyl, alkynyl, cycloalkyl, aryl, heteroaryl, —$(CR_2)_nA^1$; or $R_4$ for each occurrence is independently alkyl or —$(CR_2)_nA^1$; or $R_4$ is methyl.
In certain embodiments, the at least one electron-donating compound is selected from the group consisting of:

-continued

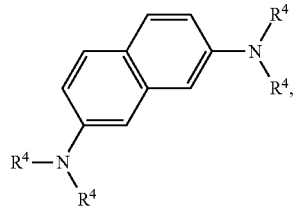

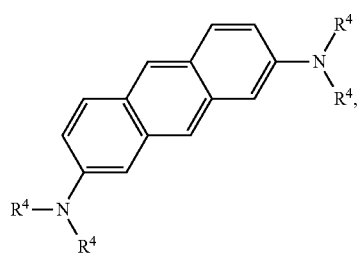

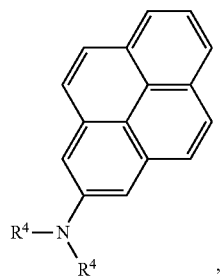

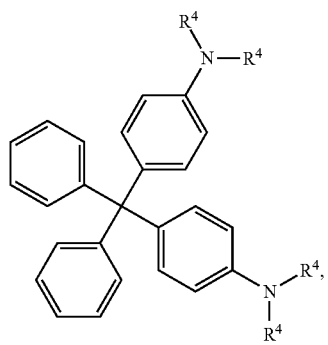

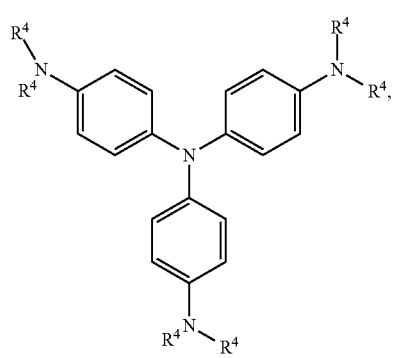

-continued

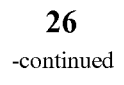
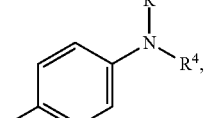
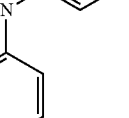
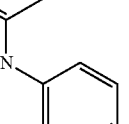
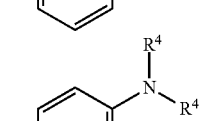
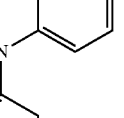
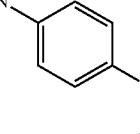

, and

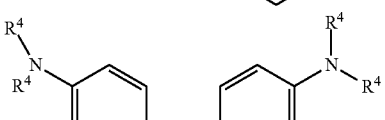
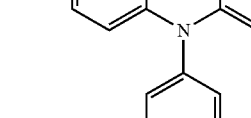
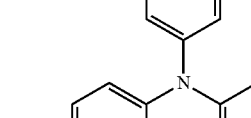
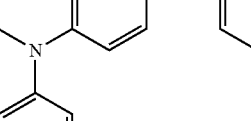

, wherein $R_4$ for each occurrence is independently selected from the group consisting of alkyl, alkenyl, alkynyl, cycloalkyl, aryl, heteroaryl, —$(CR_2)_nA^1$; or $R_4$ for each occurrence is independently alkyl or —$(CR_2)_nA^1$; or $R_4$ is methyl. Alternatively, $R_4$ for each occurrence is independently selected from $C_nH_{2n+1}$, $C_6H_5$, $C_{10}H_7$, $C_{12}H_9$, $OC_6H_5$, $OC_{10}H_7$ and $OC_{12}H_9$, $C_nH_{2n}COOH$, $C_nH_{2n}NCS$, $C_nH_{2n}N_3$, $C_nH_{2n}NH_2$, $C_nH_{2n}Cl$, $C_nH_{2n}Br$, and $C_nH_{2n}I$, wherein n is 0 to 20 and $X^1$ and $X^2$ are selected from F, Cl, Br, I, $PF_6$, $BPh_4$, $BF_4$, $PhSO_3$, and $N(CN)_2$.

The compositions described herein may contain any ratio of electron-acceptor compound to the at least one electron-donating compound. In certain embodiments, the compositions described herein comprise the electron-acceptor compound and the at least one electron-donating compound in a molar ratio of from 1:1 to 1:100; 1:1 to 1:80; 1:1 to 1:60; 1:1 to 1:50; 1:1 to 1:40; 1:8 to 1:36; 1:16 to 1:36; or 1:18 to 1:36, respectively.

In alternative embodiments, the electron-accepting compound and the electron-donating compound can be covalently attached. In such embodiments, provided is a composition comprising a compound of Formula 6:

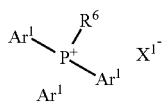

6

$X^1$ and $Ar^1$ are as defined herein; and $R^6$ is —$(CR_2)_nAr^3$, wherein each of occurrence n and each of occurrence R are independently as defined herein; and $Ar^3$ is a nitrogen containing heteroaryl, wherein one instance of $Ar^1$ or $Ar^3$ is optionally substituted with —$(CR_2)_nA^1$, wherein $A^1$ is as defined herein.

The nitrogen containing heteroaryl can be selected from optionally substituted carbazole, optionally substituted pyrrole, optionally substituted indole, optionally substituted isoindole, optionally substituted indolizine, and optionally substituted pyridinium.

In certain embodiments, the nitrogen containing heteroaryl is selected from the group consisting of:

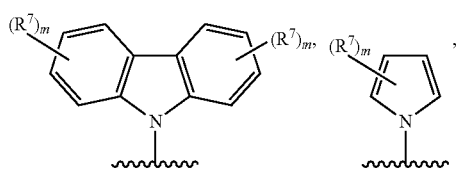

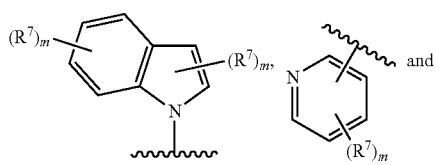

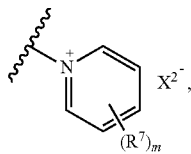

wherein m for each occurrence is independently 1, 2, or 3; $X^2$ is F, Cl, Br, I, $PF_6$, $BPh_4$, $BF_4$, $PhSO_3$, or $N(CN)_2$; and $R^7$ for each occurrence is independently selected from hydrogen, halide, alkyl, aryl, aryloxy, or —$(CR_2)_nA^1$.

In alternative embodiments, the compound of Formula 6 is represented by a compound selected from the group consisting of:

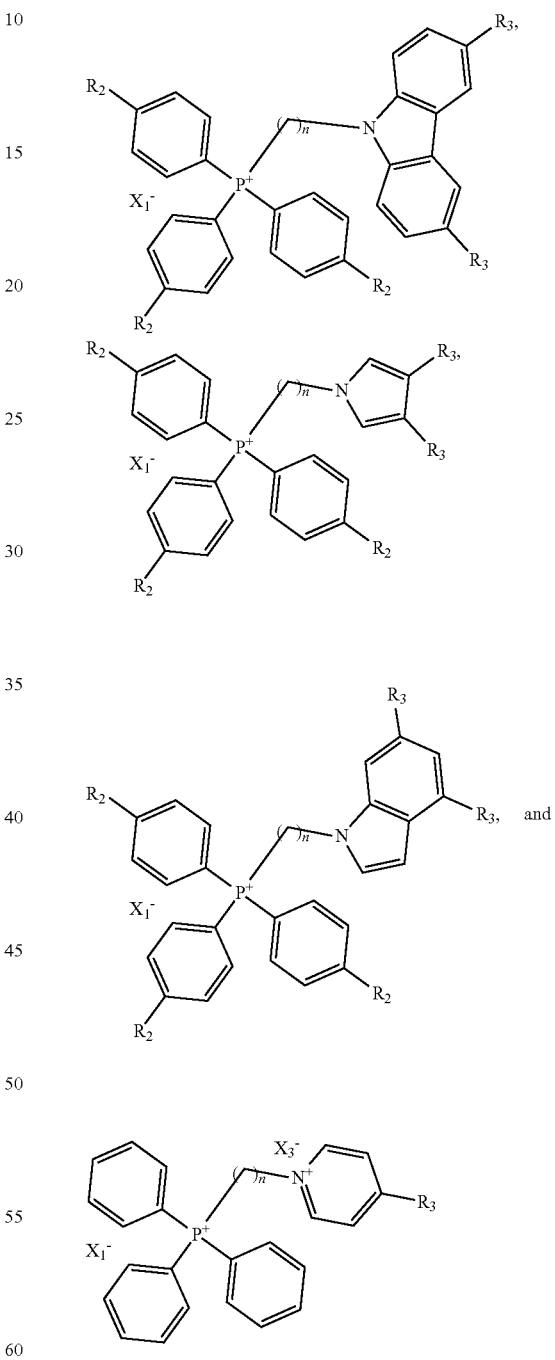

wherein $R_2$ and $R_3$ for each occurrence are independently selected from $C_nH_{2n+1}$, $C_6H_5$, $C_{10}H_7$, $C_{12}H_9$, $OC_6H_5$, $OC_{10}H_7$, $OC_{12}H_9$, $C_nH_{2n}COOH$, $C_nH_{2n}NCS$, $C_nH_{2n}N_3$, $C_nH_{2n}NH_2$, $C_nH_{2n}Cl$, $C_nH_{2n}Br$, $C_nH_{2n}I$, wherein n is 0 to 20; $X_1$ and $X_3$ are selected from F, Cl, Br, I, $PF_6$, $BPh_4$, $BF_4$, $PhSO_3$, and $N(CN)_2$.

In certain embodiments, the compound of Formula 6 is:

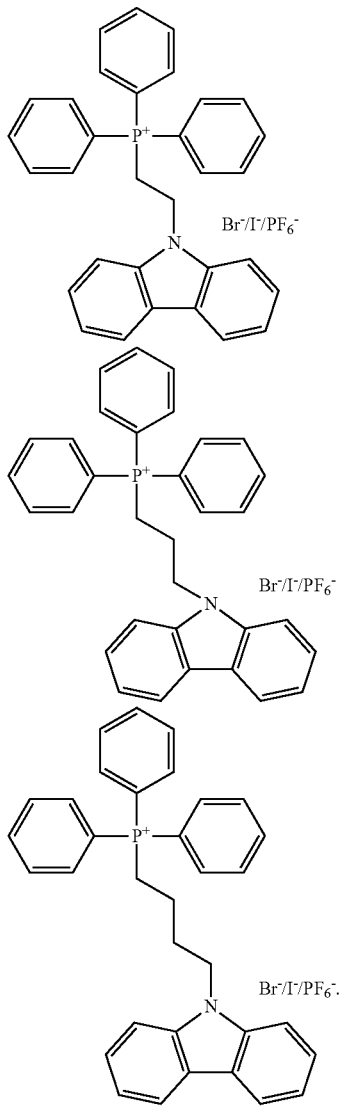

The compounds described herein can optionally comprise functionality that allows for conjugation of the compound to other molecules. In such instances, $Ar^1$ can be substituted with —$(CR_2)_nA^1$ or $R^1$ is —$(CR_2)_nA^1$. In such instances, it is preferable that only one moiety of formula —$(CR_2)_nA^1$ is present in the compounds described herein. However, in some instances more than one moiety of —$(CR_2)_nA^1$ may be present in the compounds described herein, e.g., 2, 3, 4, or 4. In certain embodiments, n for each occurrence is independently a whole number selected from 1-6; 2-6; or 2-4; $A^1$ is —$CO_2H$, —C≡CH, —CNS, —$N_3$, —$NH_2$, —SH, Cl, Br, I, or N-maleimide; and R is hydrogen.

The unique photophysical properties of the compositions described herein enable numerous applications, such as use in luminescent identification cards, a driver's licenses, passports, identity papers, banknotes, checks, documents, paper, stock certificates, packaging components, credit cards, bank cards, labels, seals, postage stamps, textiles, liquids, and biological samples.

The compositions described herein can be used as imaging agents in biological systems by covalent conjugation to a targeting agent that selectively binds to a specific organ, tissue, cell, cellular receptor, polynucleotide, lipid, polypeptide, carbohydrate, small molecule, etc. In certain embodiments, the compounds described herein are covalently conjugated to a targeting agent. The targeting agent can be an antibody, an antibody fragment (such as Fab, Fab', F(ab')$_2$, and Fv), single chain (ScFv)) a peptide, an aptamer, or a small molecule that is capable of selectively binding to a target of interest, such as a carbohydrate, polynucleotide, lipid, polypeptide, protein, small molecule, cellular receptor, etc. Covalent conjugation of the compounds described herein and the targeting agent can be accomplished using well known methods known by the skilled person.

Remarkably, the compositions described herein upon excitation with UV light can exhibit emissions that last from 3 to 7 h; 4 to 7 h; 5 to 7 h; 3 to 6 h; or 3 to 5 h at room temperature.

The compounds described herein can be readily prepared from commercially available starting materials using well known methods known to the skilled person. The electron-accepting compounds described herein can be readily prepared by alkylation of the corresponding triarylphosphine alkylating agents, such as alkyl Br, I, mesylate, tosylate, nosylate, triflate, and the like.

Figure 7:
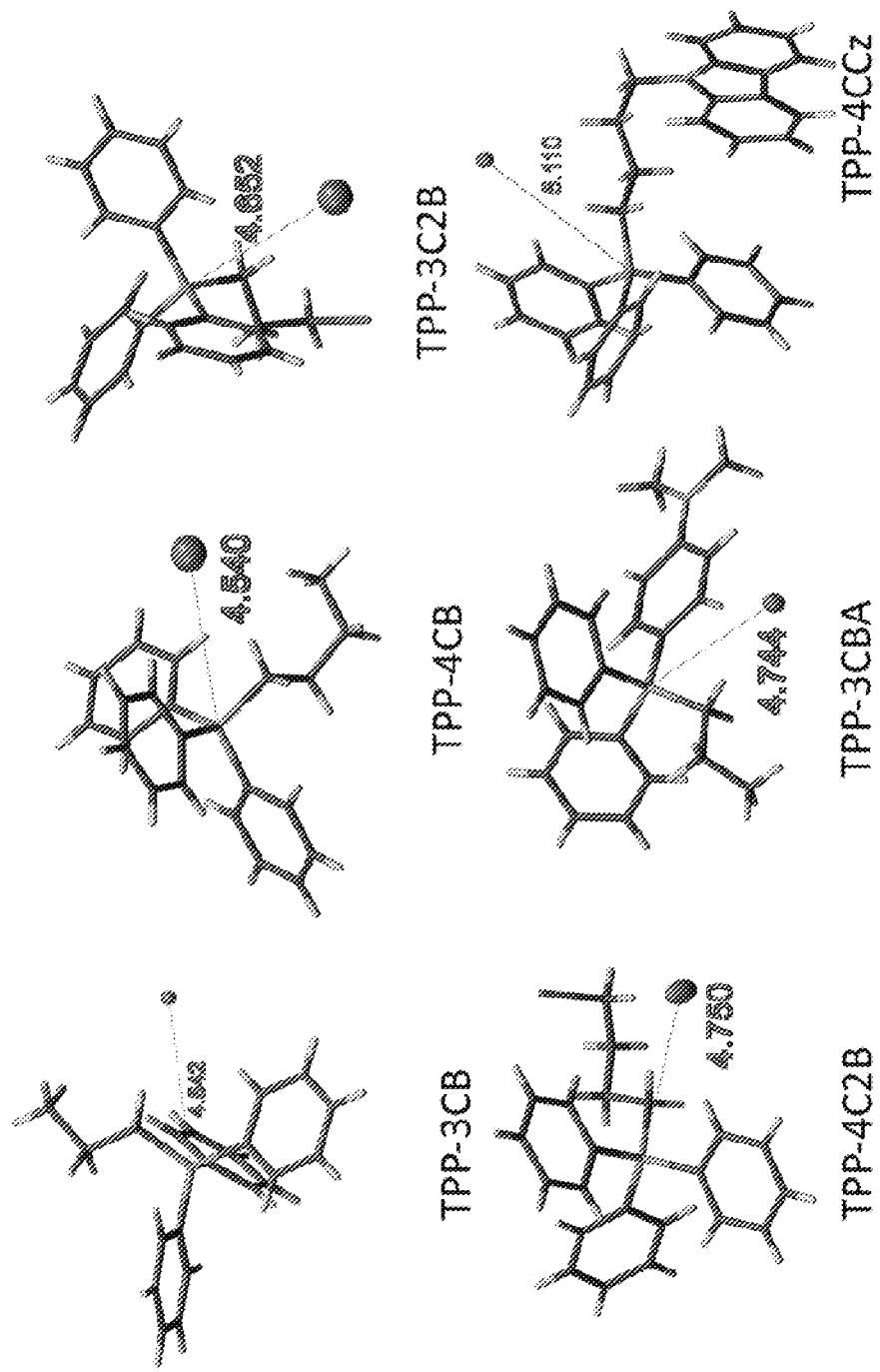
FIG. 7 depicts crystal structures of TPP-3CB, TPP-4CB, TPP-3C2B, TPP-4C2B, TPP-3CBA and TPP-4CCz.
Figure 8:
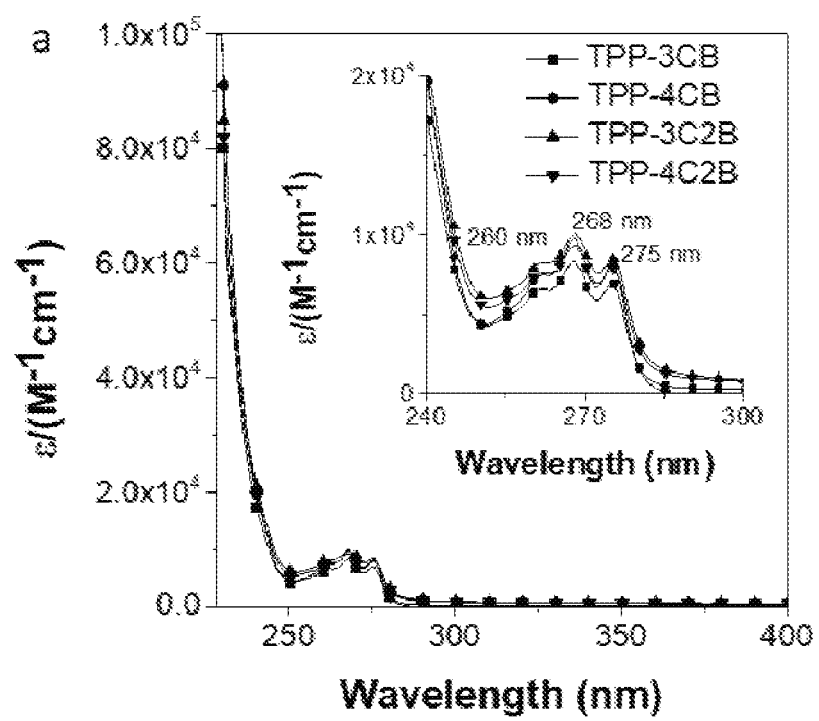
FIG. 8 depicts a graph of the absorption and emission spectra of TPP-3CB, TPP-4CB, TPP-3C2B and TPP-4C2B in acetonitrile [C=10 μM].
Figure 9:
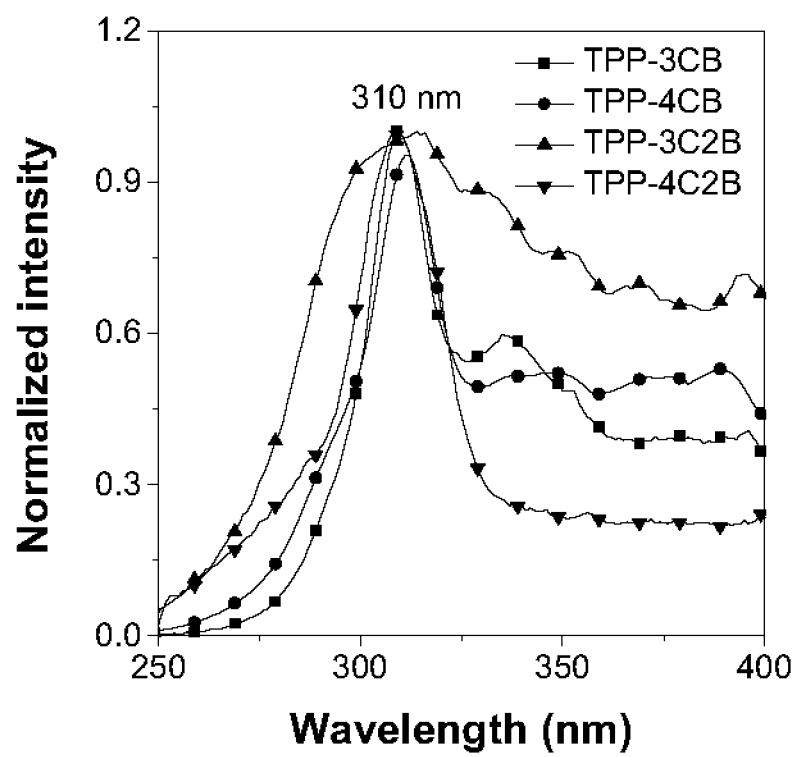
FIG. 9 depicts a graphs of the excitation spectra of TPP-3CB, TPP-4CB, TPP-3C2B and TPP-4C2B crystals measured at the maximum emission band of 470 nm.
Figure 20:
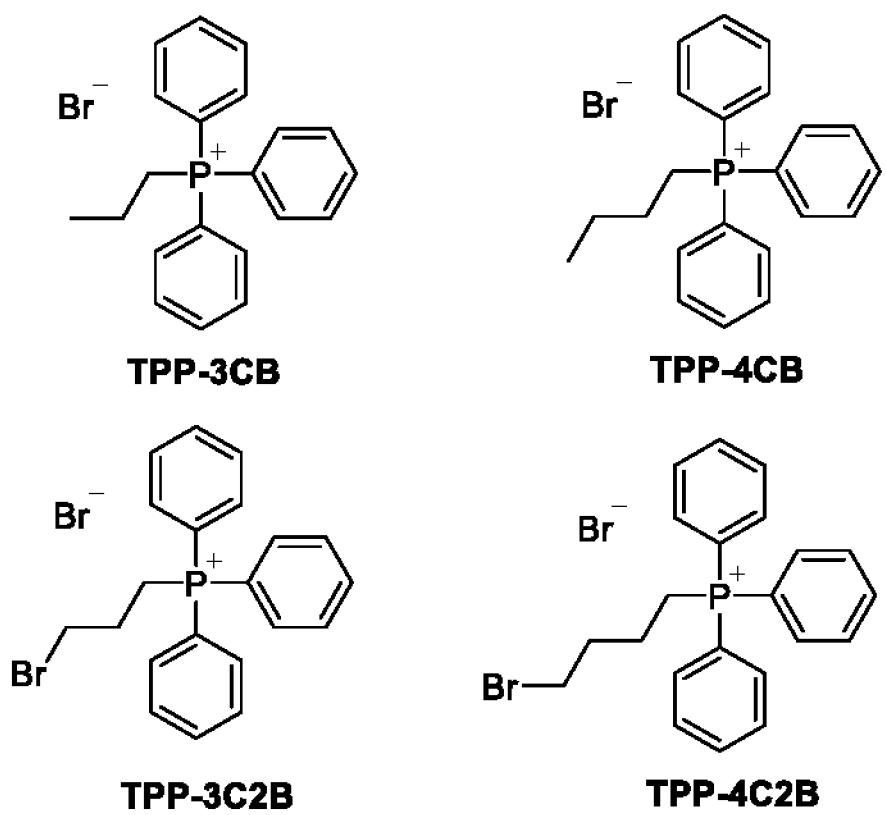
FIG. 20 depicts the chemical structures of TPP-3CB, TPP-4CB, TPP-3C2B, TPP-4C2B.
Figure 21:
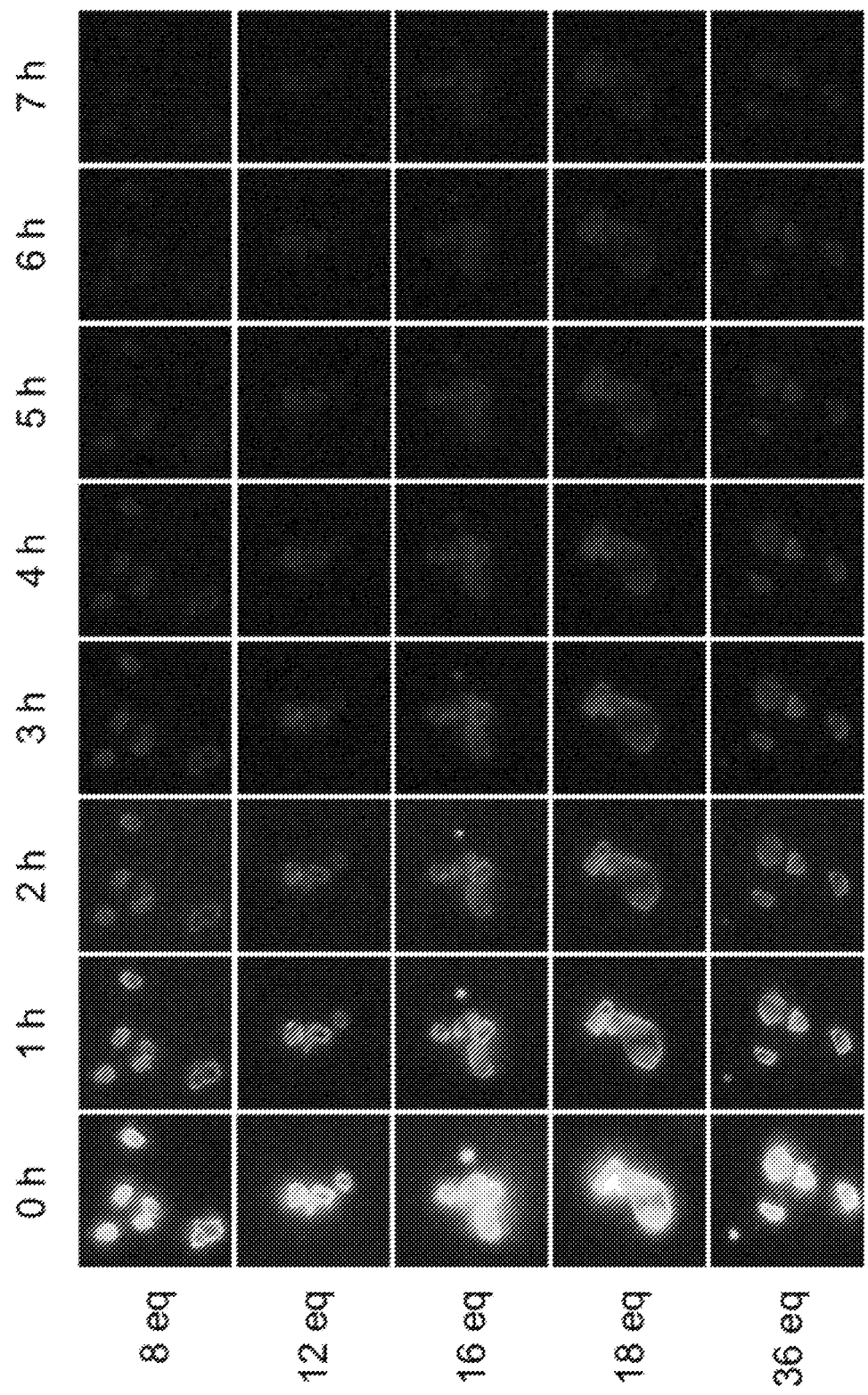
FIG. 21 depicts the results of an experiment in which the amount DMA to TPP-3C2B is varied to investigate its effect on the persistent luminescence of TPP-3C2B:DMA, 8 to 36 molar equivalents of DMA were added to DCM solutions of TPP-3C2B, which were then layered with EA for crystallization. The crystals collected all showed similar OLPL durations after 365 nm handheld UV lamp excitation.

Herein, we report a series of pure organic quaternary phosphonium bromide salts; TPP-3CB, TPP-4CB, TPP-3C$_2$B, TPP-4C$_2$B, and TPP-3CBA (FIG. 20) that exhibit observable afterglow (FIGS. 1-5). The phosphonium core serves as a good acceptor and the bromide, as a donor. All of these compounds were purified and recrystallized several times before characterization. Under 254 nm excitation, intense greenish blue emission was observed, and the emission remarkably lasted for 2-4 seconds after ceasing the excitation source making them organic ultralong room-temperature phosphorescent materials. The crystal structures of TPP-3CB, TPP-4CB, TPP-3C2B, TPP-4C2B, and TPP-3CBA were found to have distorted tetrahedral geometry (106.8°-110.5°) and the distance between the phosphonium and bromide ions were calculated to be in the range of 4.5-4.8 Å. According to the crystal packing (FIG. 7), close interactions such as P • • • Br or Br • • • π could be expected to enhance the ISC rate. These interactions, as well as CH • • • π interactions, work together to suppress molecular motion in the crystal enhancing phosphorescence efficiency. In dilute dichloromethane (DCM) solution (1×10$^{-5}$ M), the absorption spectra of TPP-3CB, TPP-4CB, TPP-3C2B, and TPP-4C2B were recorded, and they showed similar absorption bands at 265 nm, 268 nm, and 275 nm which are attributed to π-π* transitions from the phenyl moieties of phosphonium core (FIG. 8). The crystals of the five phosphonium bromide salts showed an emission maximum of 470 nm (FIGS. 1-5). Surprisingly, the excitation spectra of the crystals of TPP-3CB, TPP-4CB, TPP-3C2B. and TPP-4C2B (FIG. 9) at the 470 nm emission of these phosphonium crystals revealed a maximum excitation band at 310 nm band which was attributed to a photoinduced charge transfer between the phosphonium and bromide ions. Thus, subsequent PL/lifetime measurements of TPP-3CB. TPP-4CB. TPP-3C2B. TPP-4C2B, and TPP-3CBA crystals were recorded by 310 nm excitation. Exceptionally, the phosphorescence quantum yield (p) of TPP-4C2B was found to be 17.2%. From the time-resolved PL decay curves, the lifetimes of TPP-3CB. TPP-4CB. TPP-3C2B, TPP-4C2B, and TPP-3CBA crystals at 470 nm measured at room temperature were 157 ms, 200 ms, 159 ms, 164 ms, and 34 ms, respectively, indicating the ultralong afterglow nature of these materials (FIGS. 1-5). The lifetime of TPP-3CB.

TPP-4CB, TPP-3C2B, and TPP-4C2B measured at 77 K in dilute solution was found to be 632 ms, 410 ms, 252 ms, and 717 ms, respectively. It was determined that the reduced molecular mobility at 77 K results in longer lifetimes via limiting non-radiative decay channels from the excited state. Thus, the lifetime at 77 K was found to be longer compared to 298K (FIGS. 1-6).

Figure 10:
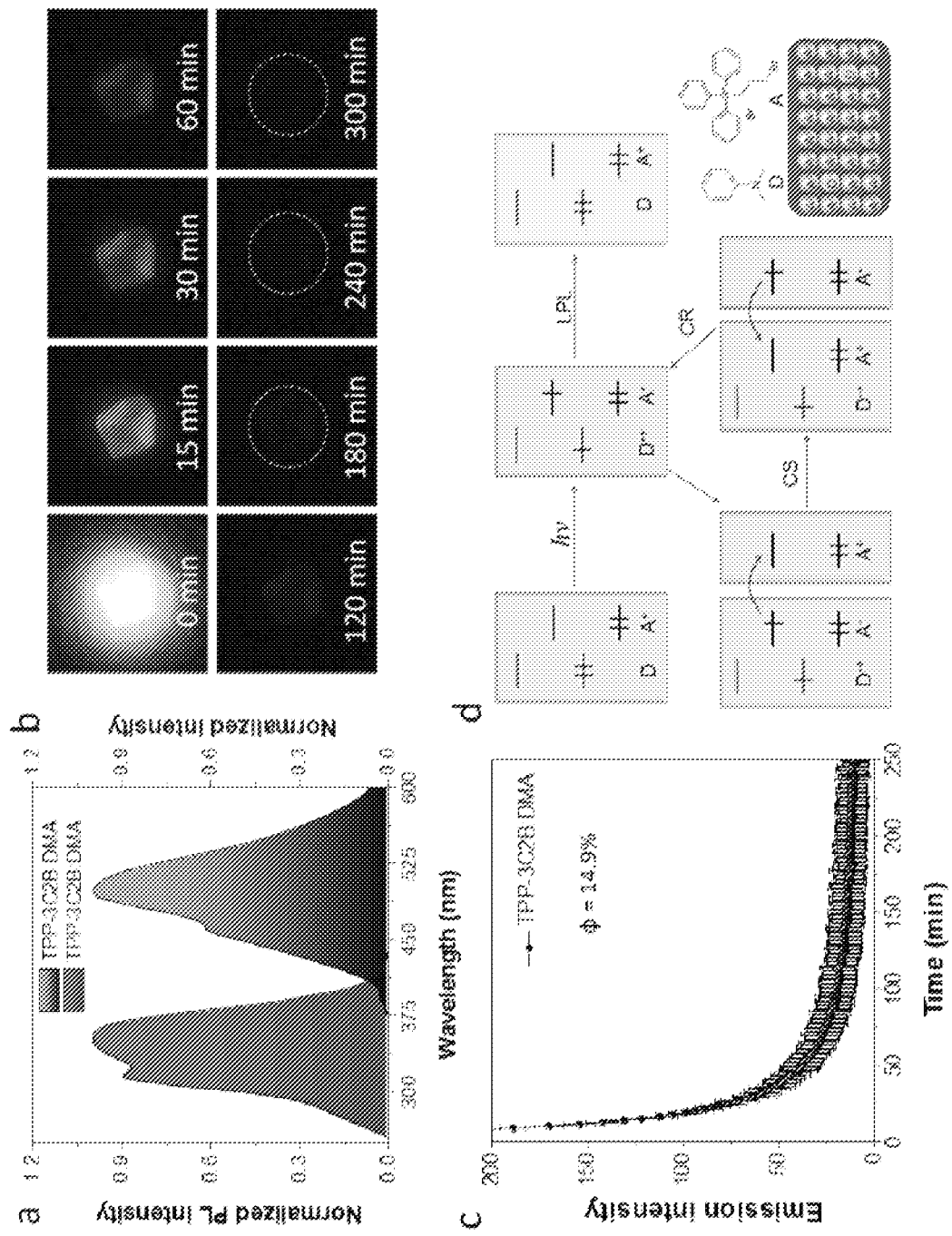
FIG. 10 depicts the chemical structure and photophysical properties of TPP-3C2B:DMA: (a) Excitation and emission spectrum of TPP-3C2B:DMA crystals; (b) Photographs of TPP-3C2B:DMA crystals taken under 365 nm UV excitation and its subsequent afterglow. The photograph at 180 min was taken under a longer exposure time to better capture the afterglow of the crystal; (c) Intensity values measured from the photographs of the afterglow plotted over time; and (d) Modified Jablonski diagram representing HFC enhanced intersystem crossing for long persistent luminescence.

In this study, an organic system that could act as a strong electron trap was first investigated. Alkyl- and bromo-alkyl-triphenylphosphonium bromides exhibiting RTP with afterglows of around 3 seconds were observed. Doping an electron donor, dimethylaniline (DMA), into the crystals of (3-bromopropyl) triphenylphosphonium bromide (TPP-3C2B), which serves as strong electron-accepting molecule, mimicked a two entity system composed entirely of organic units showing OLPL that can last up to 5 h at room temperature under atmospheric conditions. This currently is the longest OLPL ever reported and was achieved based on the photo-induced charge separation and charge recombination mechanism. It was found that an exciplex formation between the two entities, DMA and TPP-3C2B, can prolong the emission and last from 3-5 h at room temperature (FIG. 10).

Figure 11:
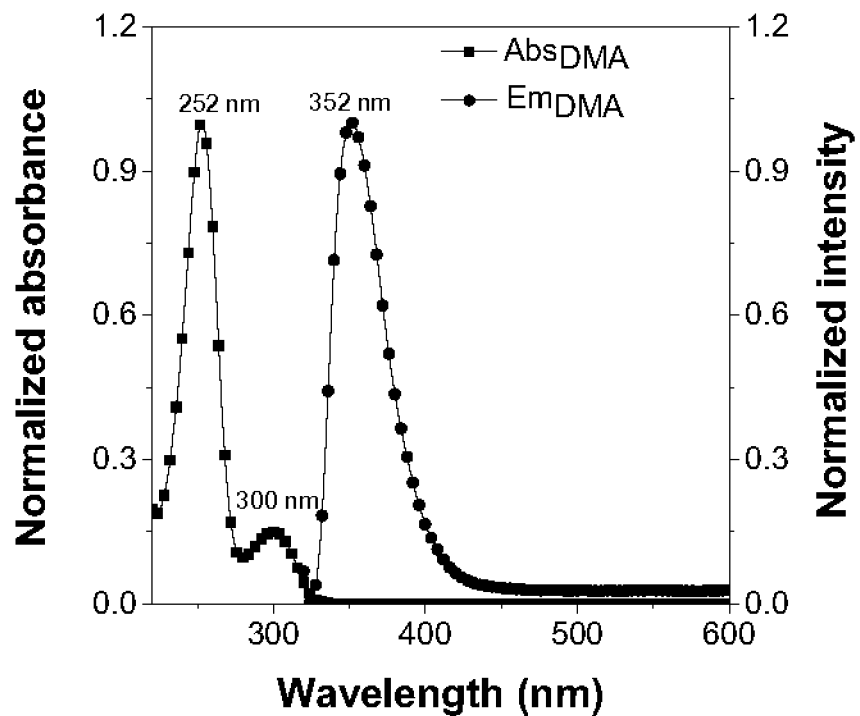
FIG. 11 depicts graphs showing the absorption and emission spectra of N,N-dimethylaniline (DMA) in acetonitrile. [C=1 μM].
Figure 12:
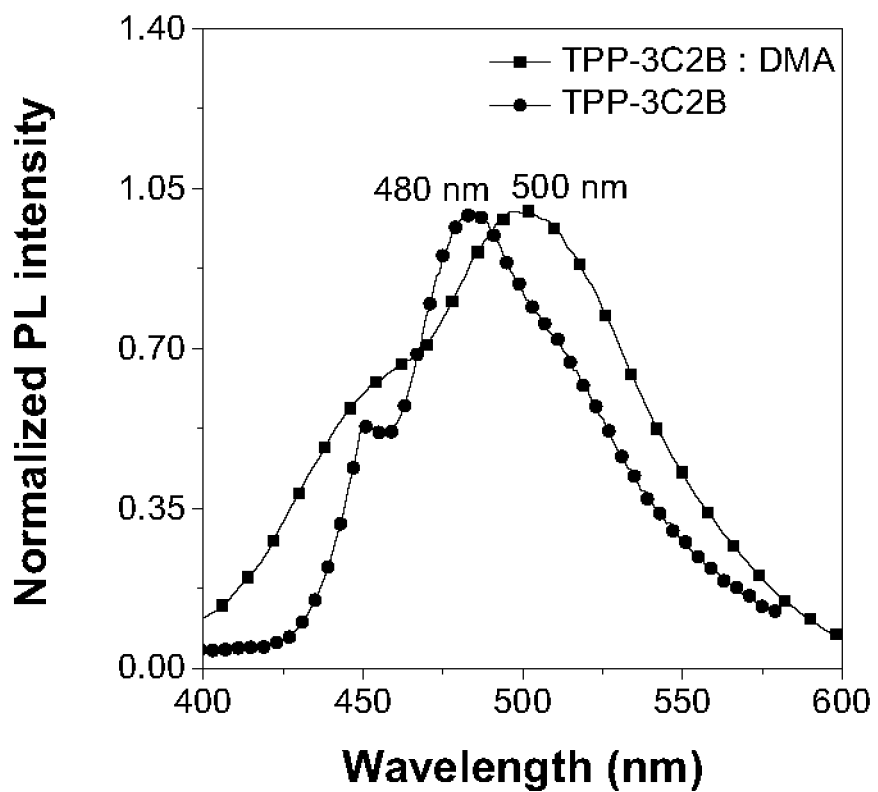
FIG. 12 depicts graphs of the emission spectra of TPP-3C2B and TPP-3C2B:DMA crystals ($\lambda_{ex}$=310 nm).
Figure 13A:
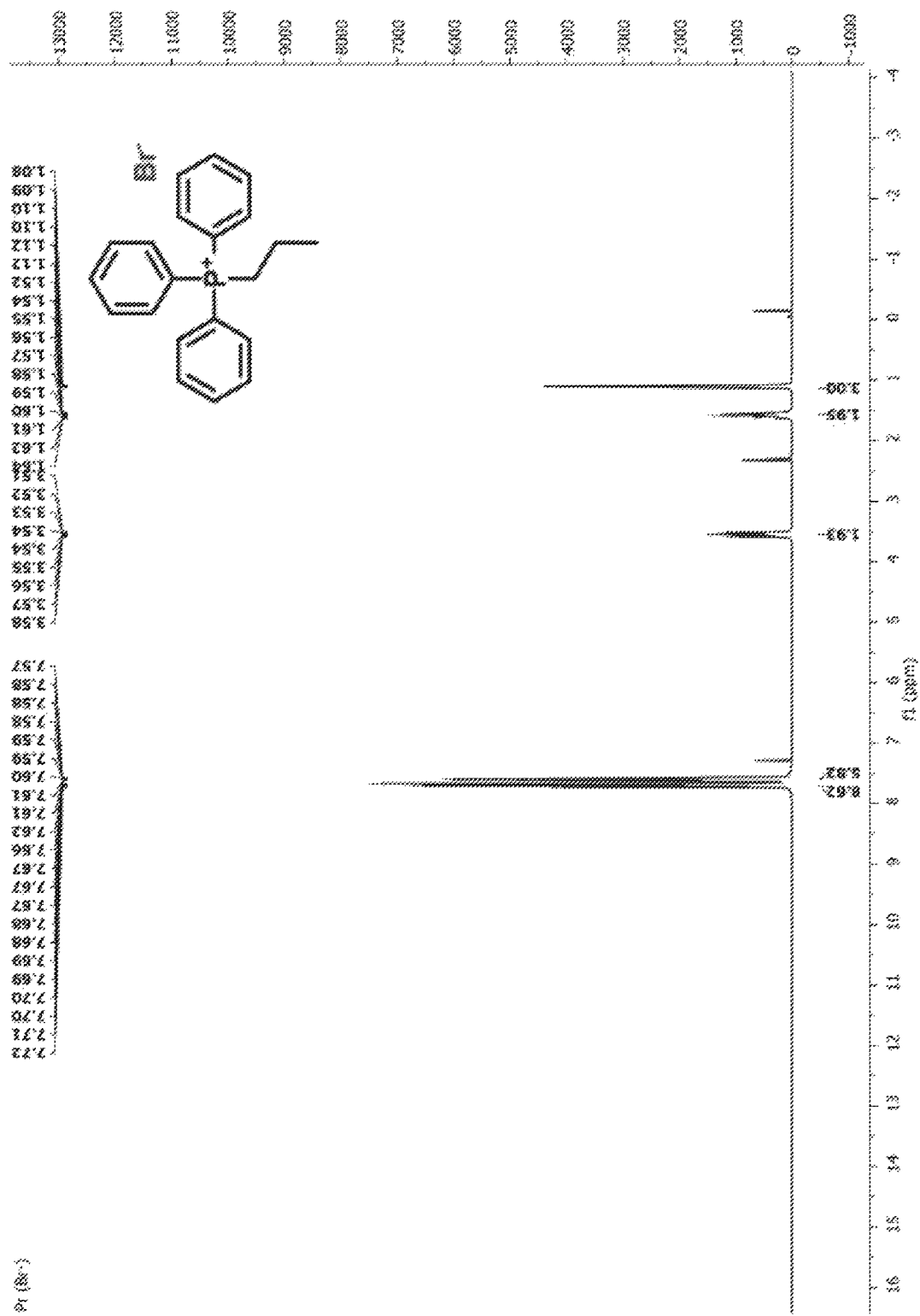
FIG. 13A depicts a $^1$H nuclear magnetic resonance (NMR) spectrum of TPP-3CB in CDCl$_3$.
Figure 13B:
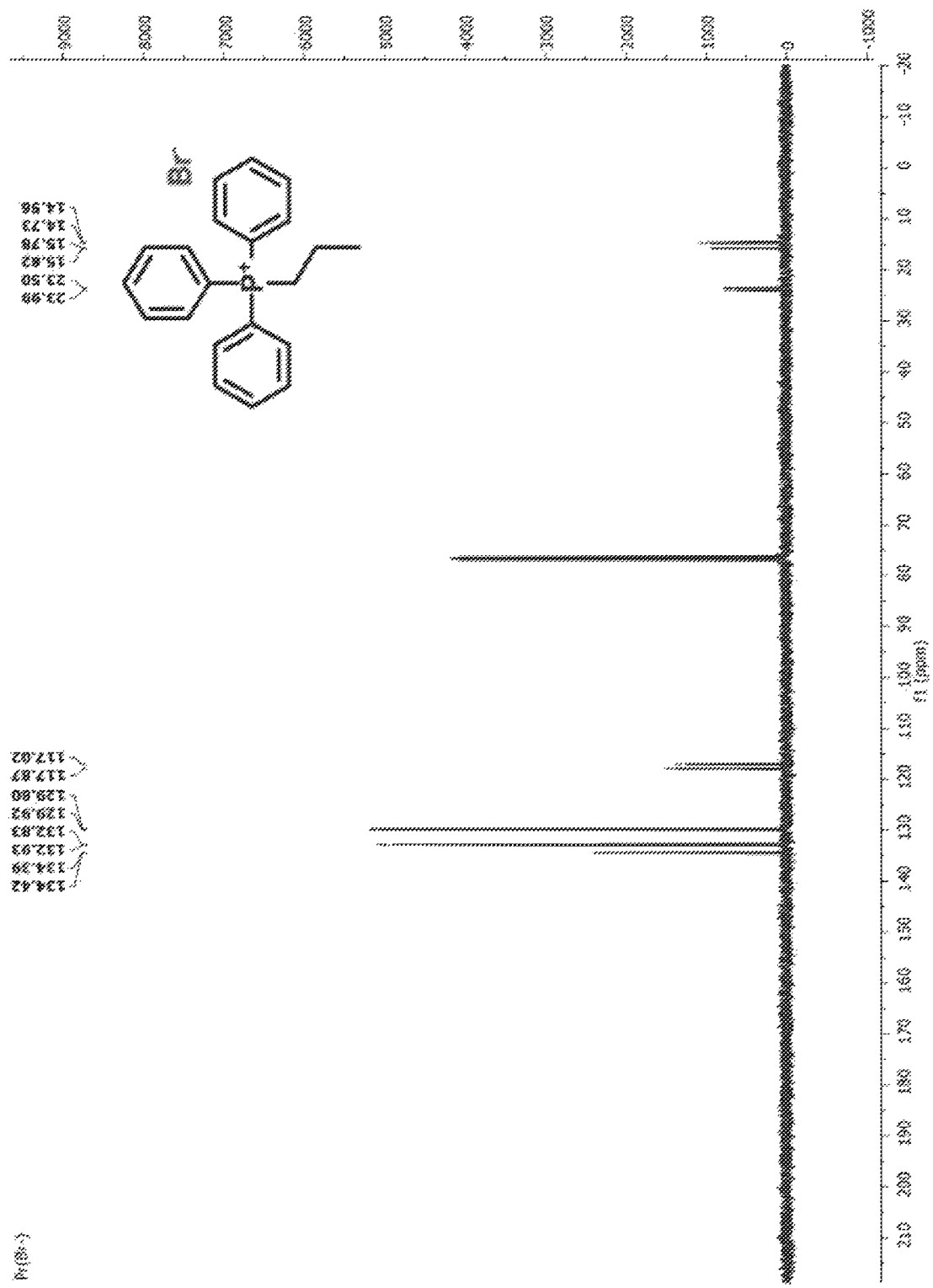
FIG. 13B depicts a $^{13}$C NMR spectrum of TPP-3CB in CDCl$_3$.
Figure 13C:
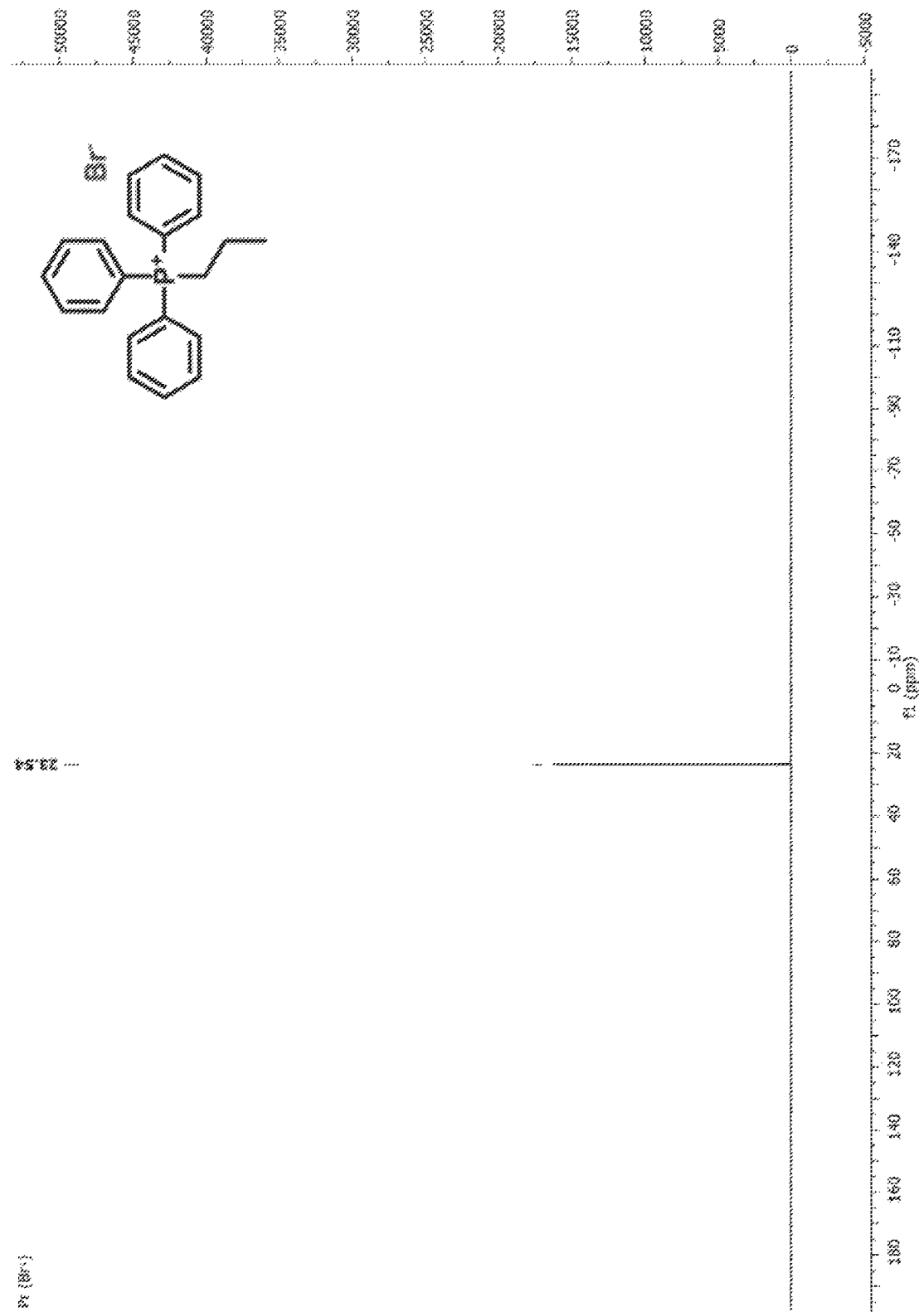
FIG. 13C depicts a $^{31}$P NMR spectrum of TPP-3CB in CDCl$_3$.
Figure 13D:
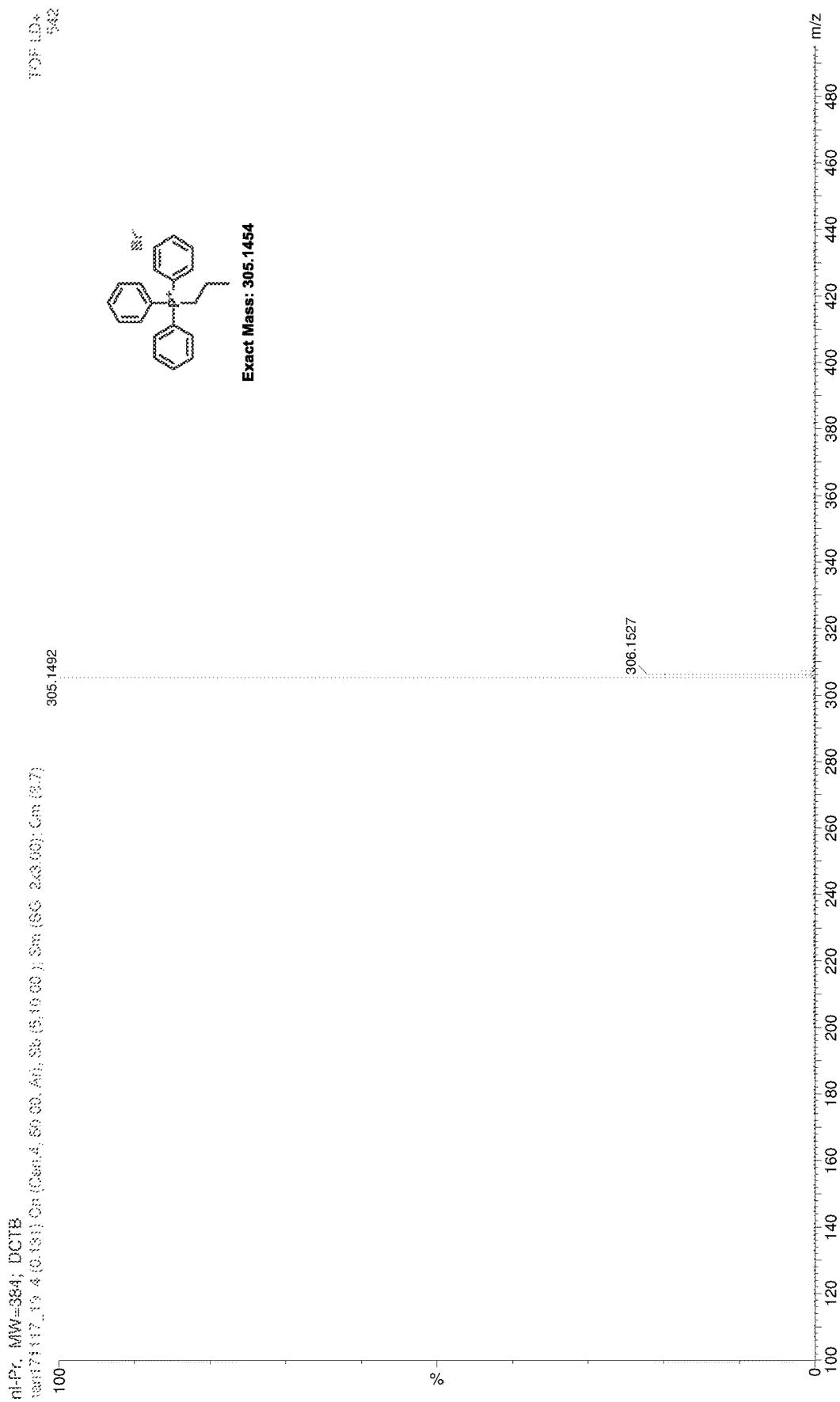
FIG. 13D depicts a high resolution mass spectrometry (HRMS) spectrum of TPP-3CB.
Figure 14A:
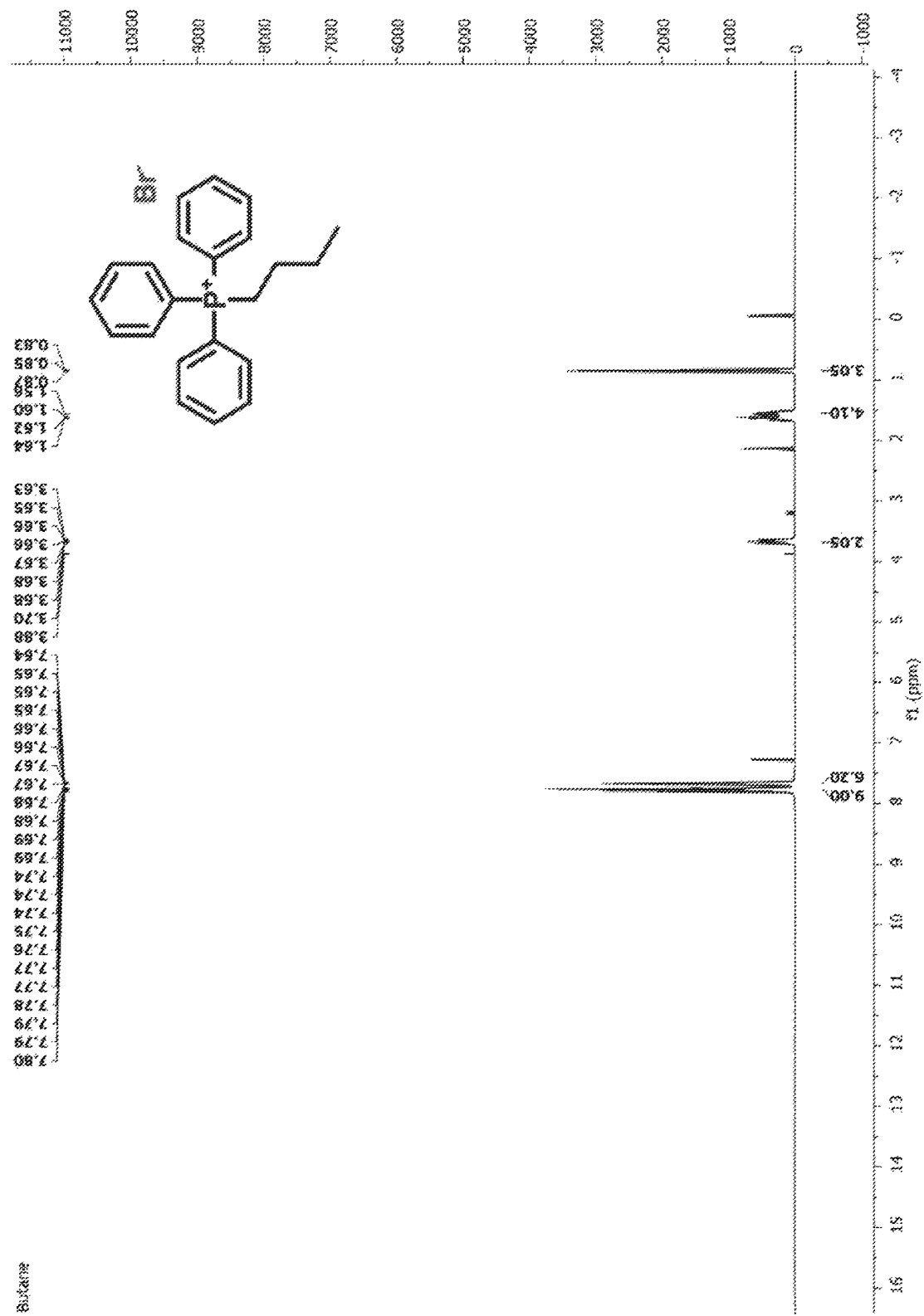
FIG. 14A depicts a $^1$H NMR spectrum of TPP-4CB in CDCl$_3$.
Figure 14B:
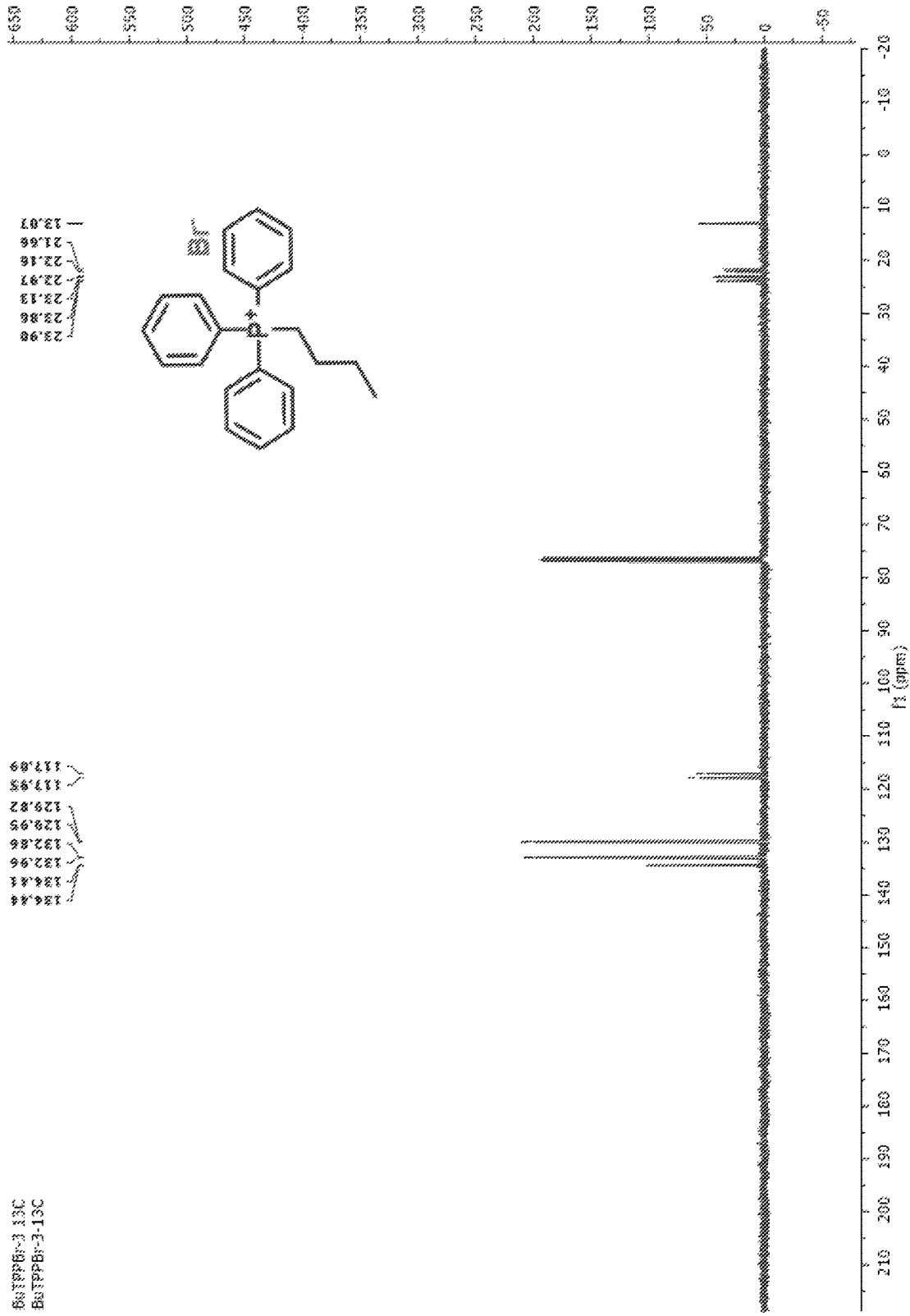
FIG. 14B depicts a $^{13}$C NMR spectrum of TPP-4CB in CDCl$_3$.
Figure 14C:
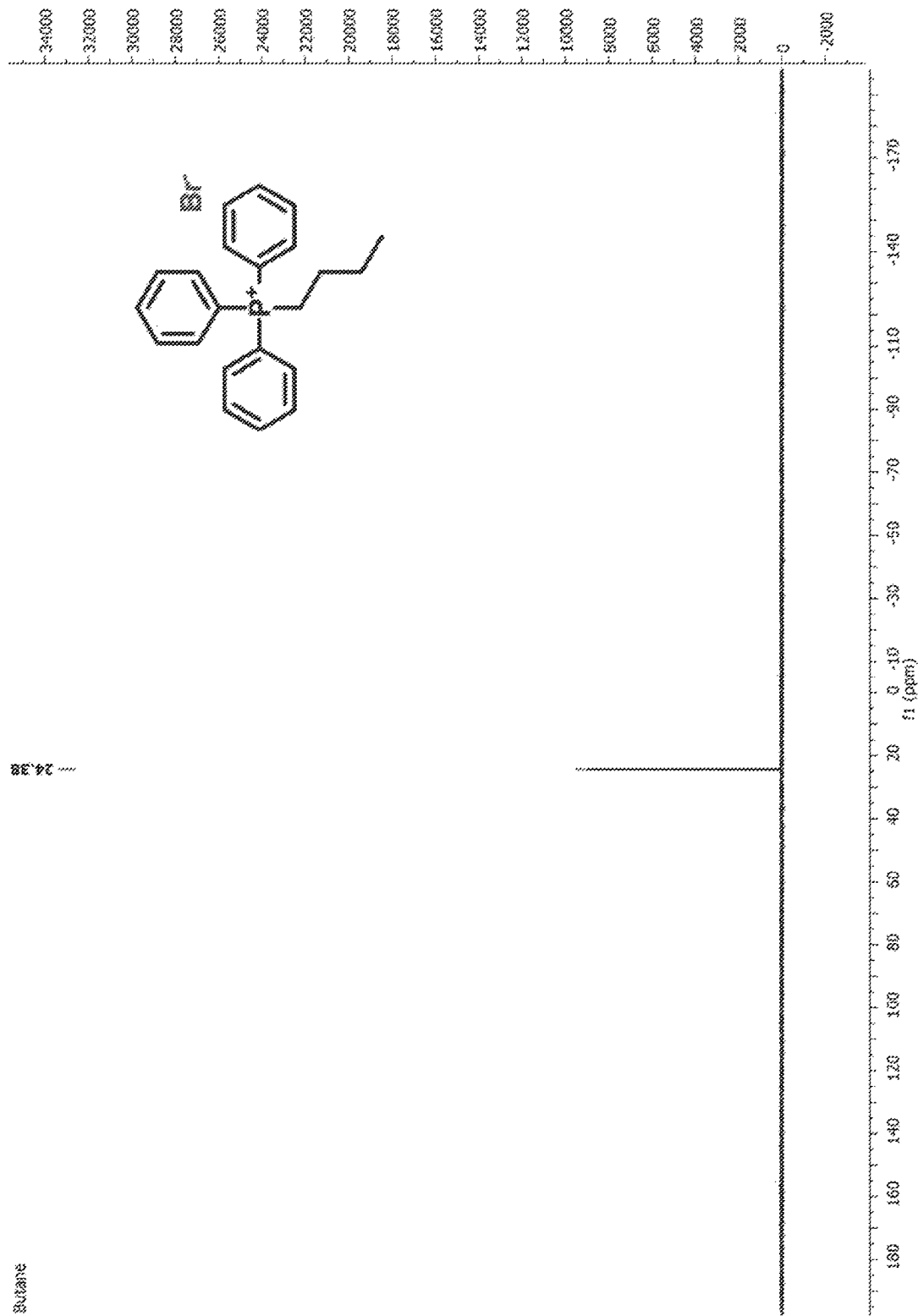
FIG. 14C depicts a $^{31}$P NMR spectrum of TPP-4CB in CDCl$_3$.
Figure 14D:
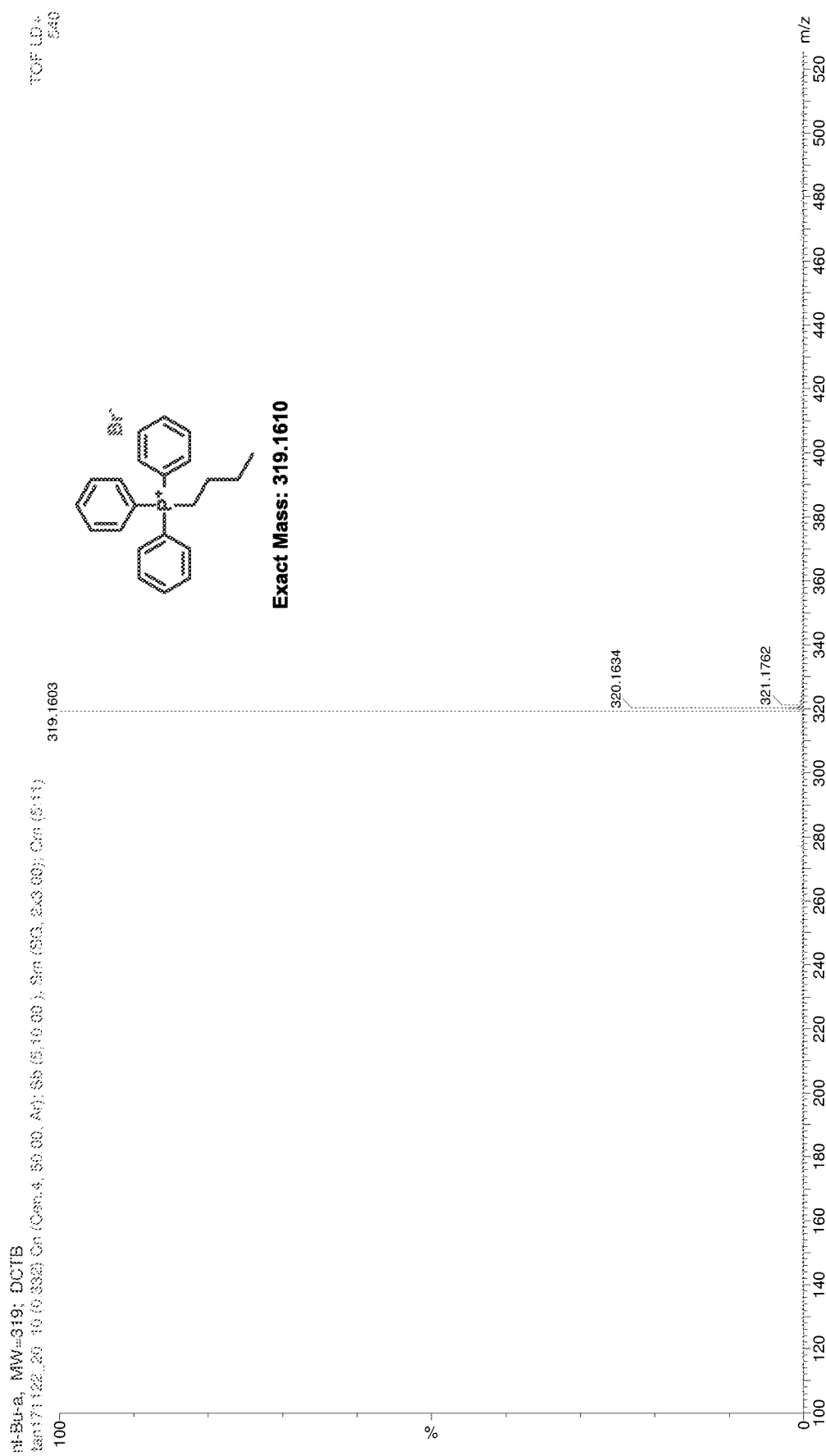
FIG. 14D depicts an HRMS spectrum of TPP-4CB.
Figure 15A:
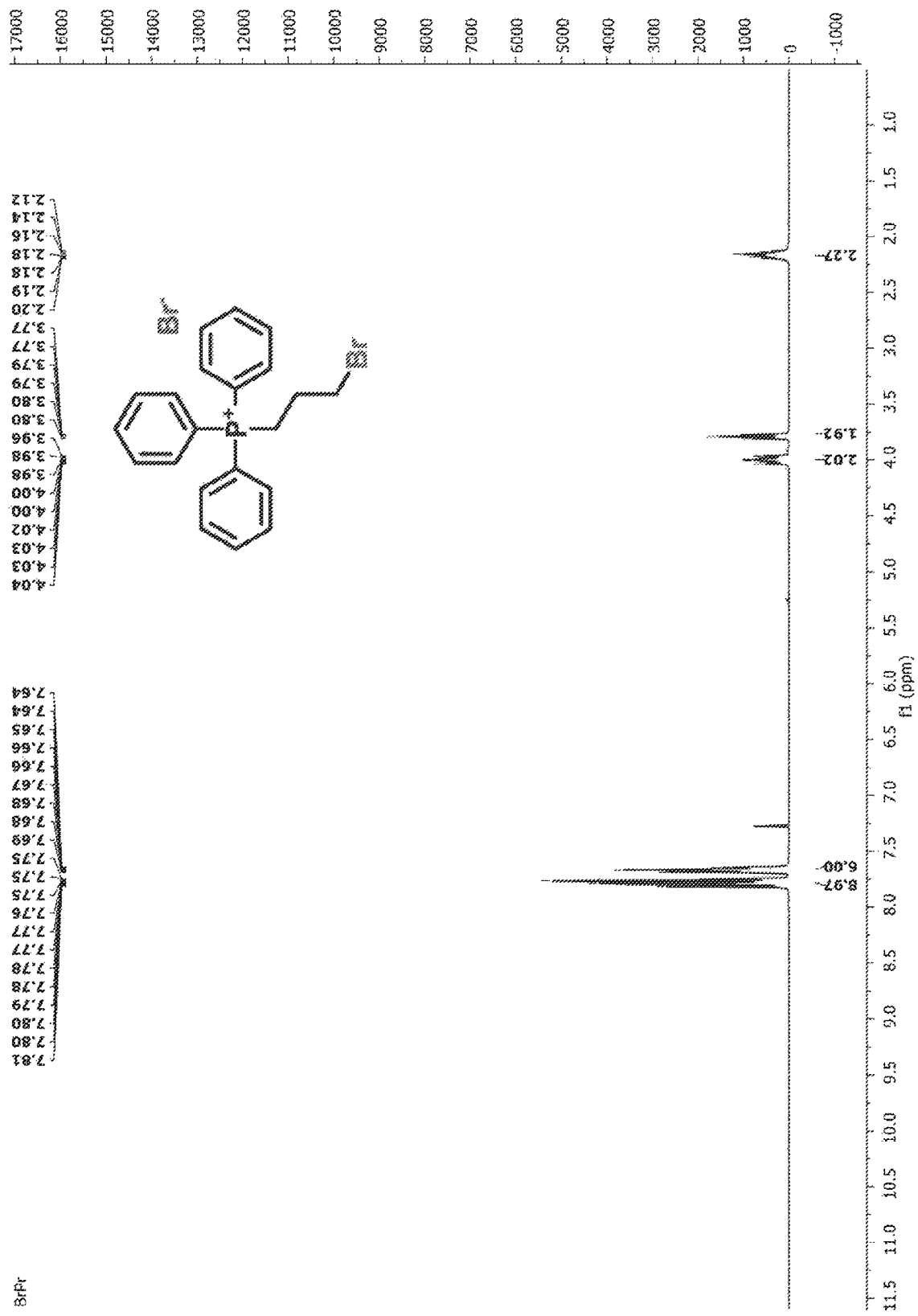
FIG. 15A depicts a $^1$H NMR spectrum of TPP-3C2B in CDCl$_3$.
Figure 15B:
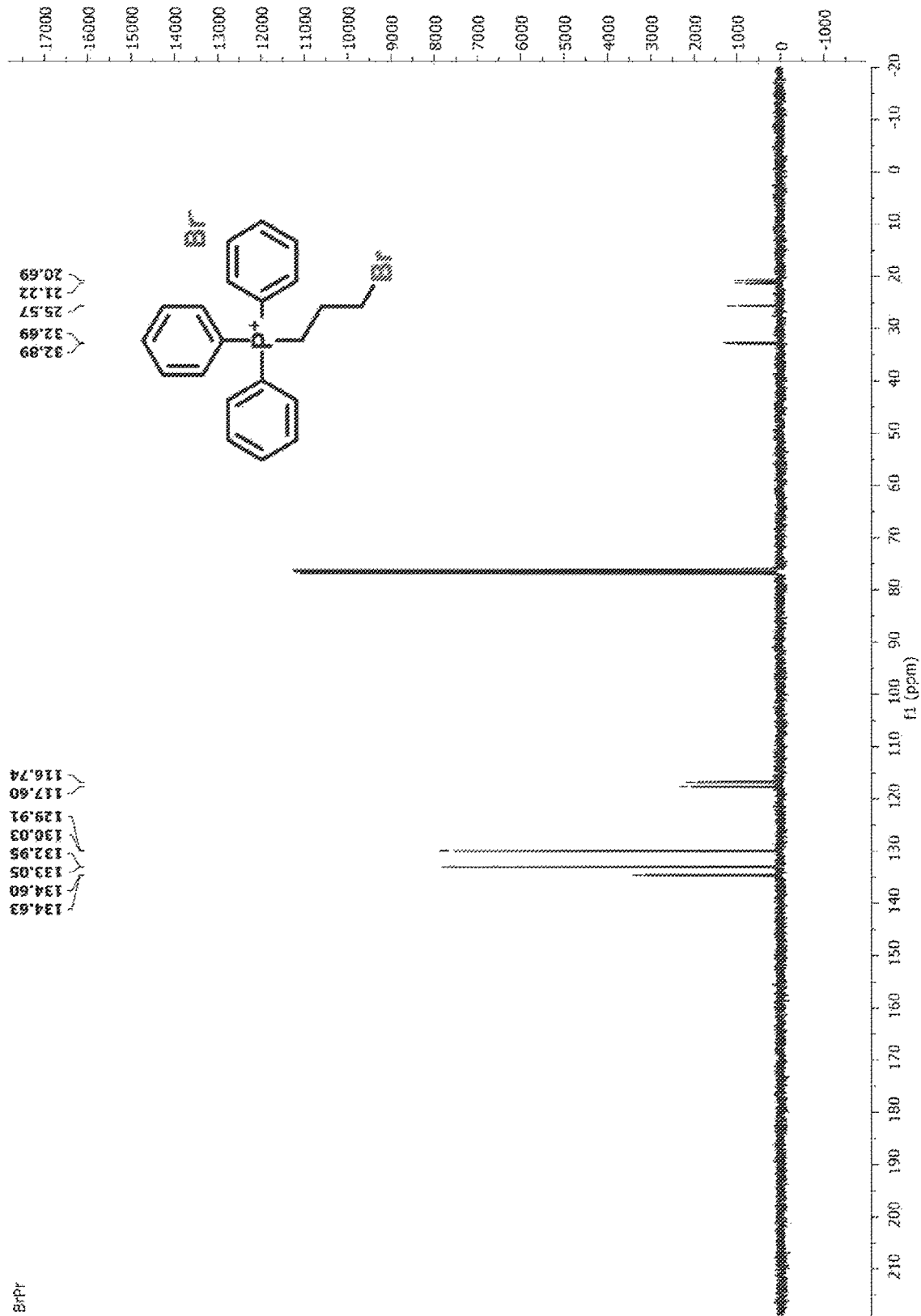
FIG. 15B depicts a $^{13}$C NMR spectrum of TPP-3C2B in CDCl$_3$.
Figure 15C:
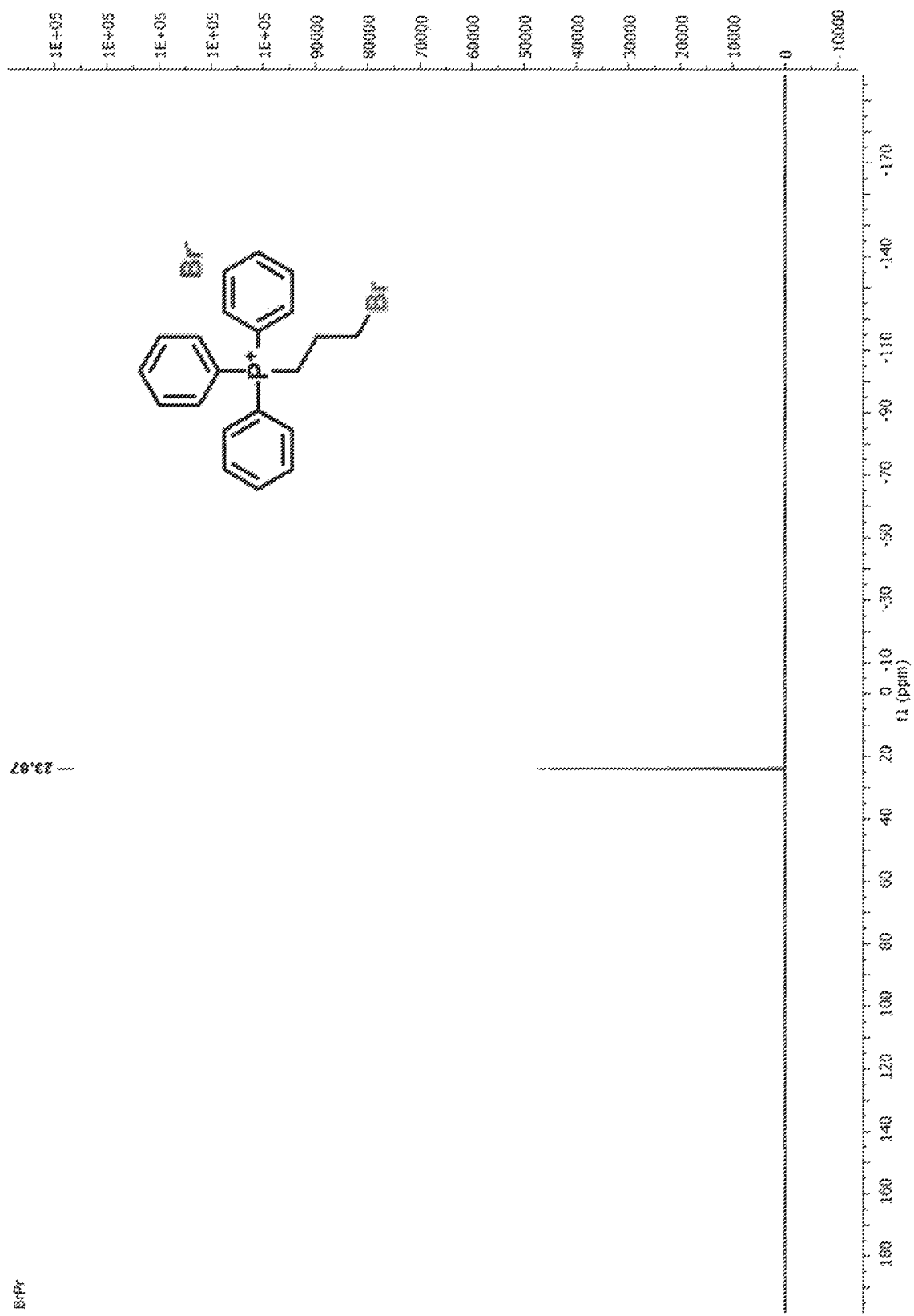
FIG. 15C depicts a $^{31}$P NMR spectrum of TPP-3C2B in CDCl$_3$.
Figure 15D:
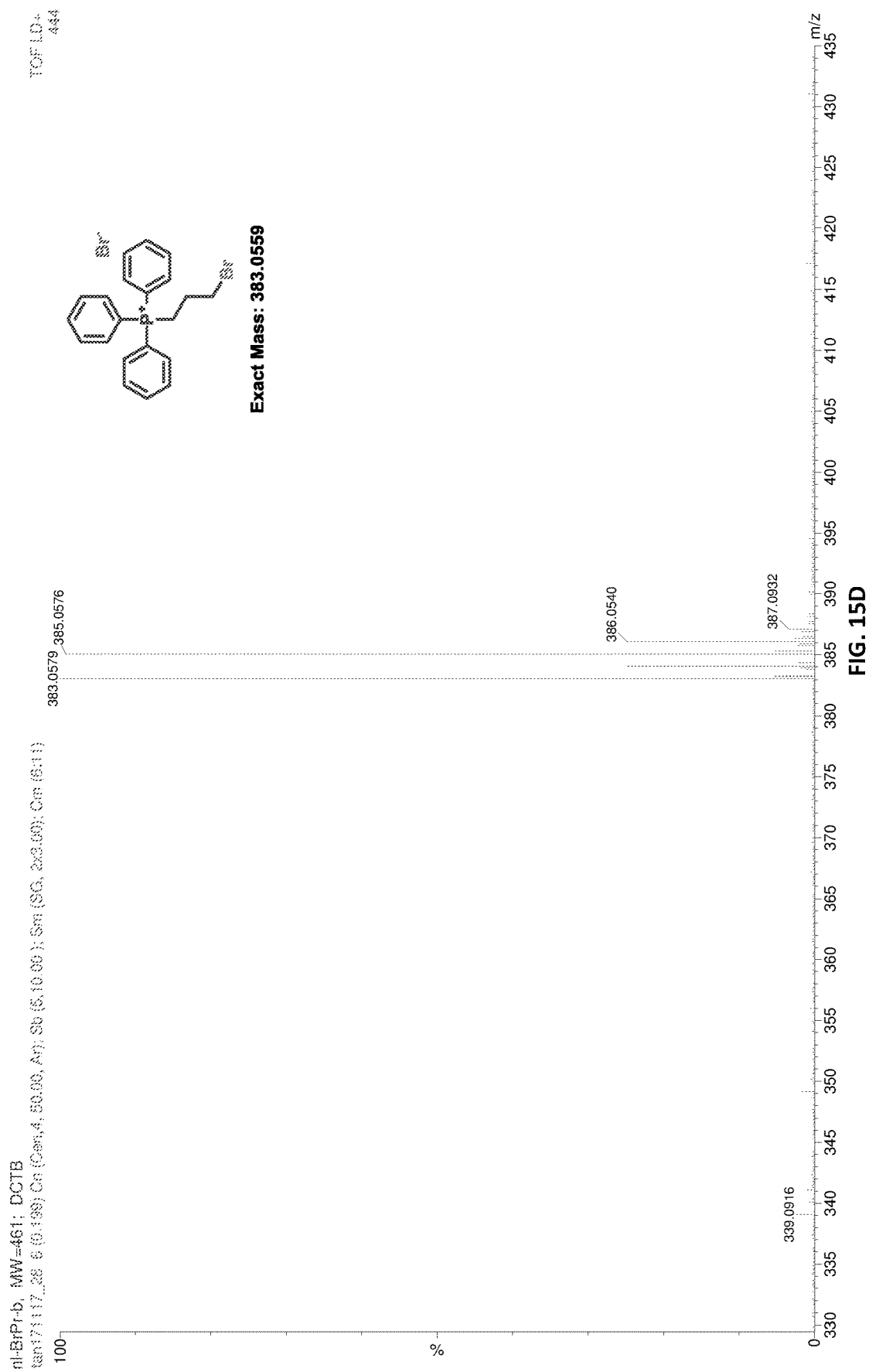
FIG. 15D depicts an HRMS spectrum of TPP-3C2B.
Figure 16A:
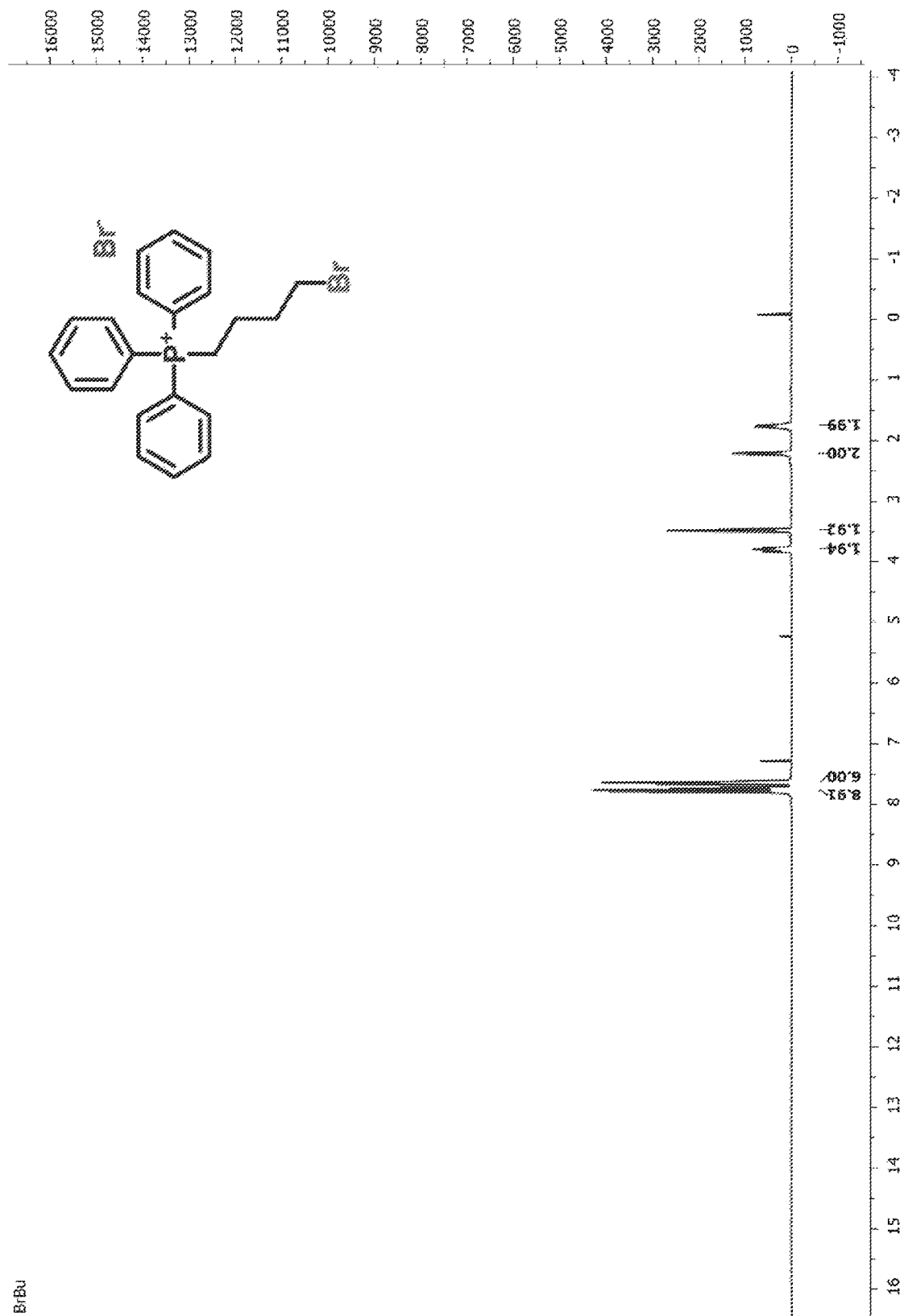
FIG. 16A depicts a $^1$H NMR spectrum of TPP-4C2B in CDCl$_3$.
Figure 16B:
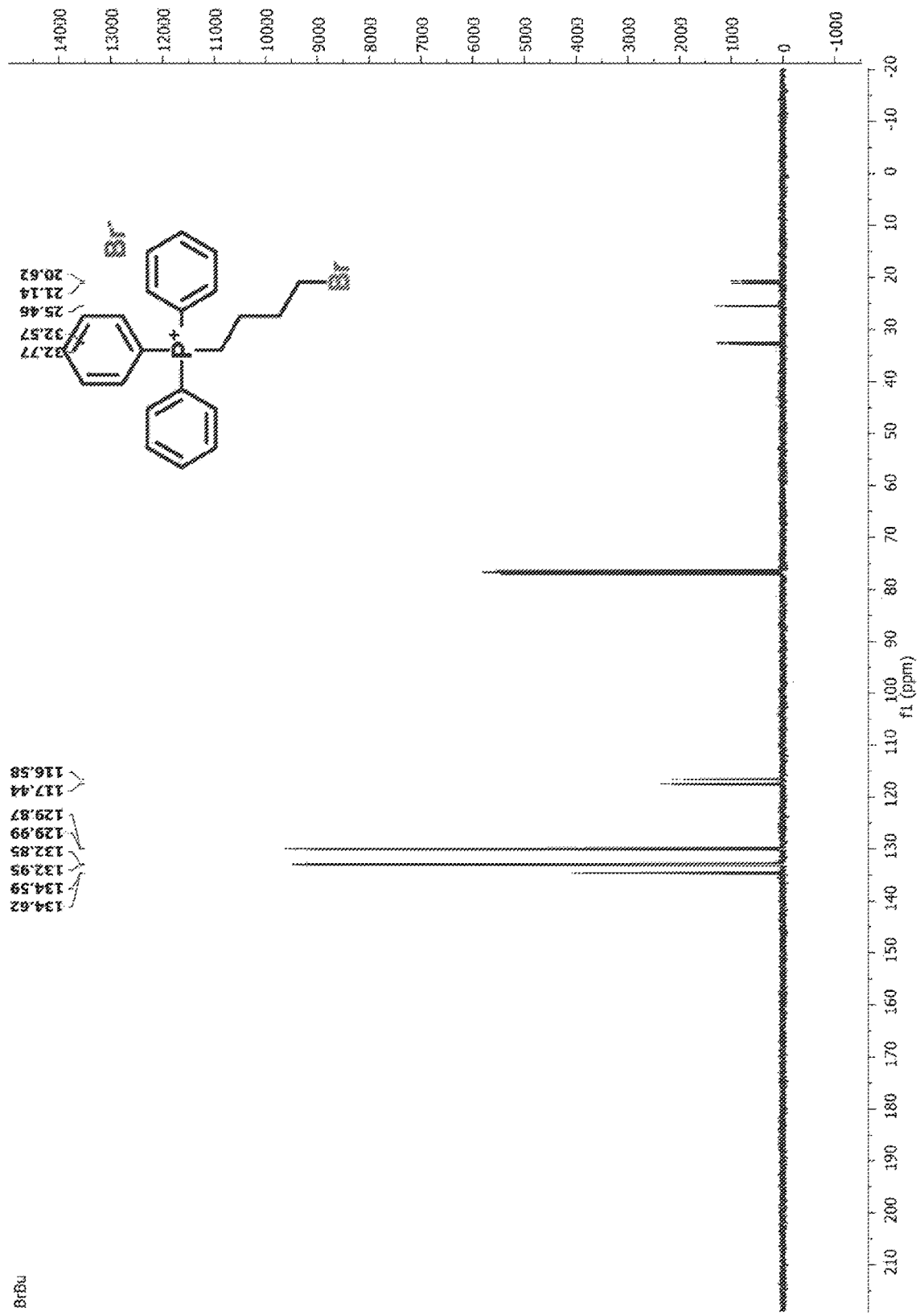
FIG. 16B depicts a $^{13}$C NMR spectrum of TPP-4C2B in CDCl$_3$.
Figure 16C:
FIG. 16C depicts a $^{31}$P NMR spectrum of TPP-4C2B in CDCl$_3$.
Figure 16D:
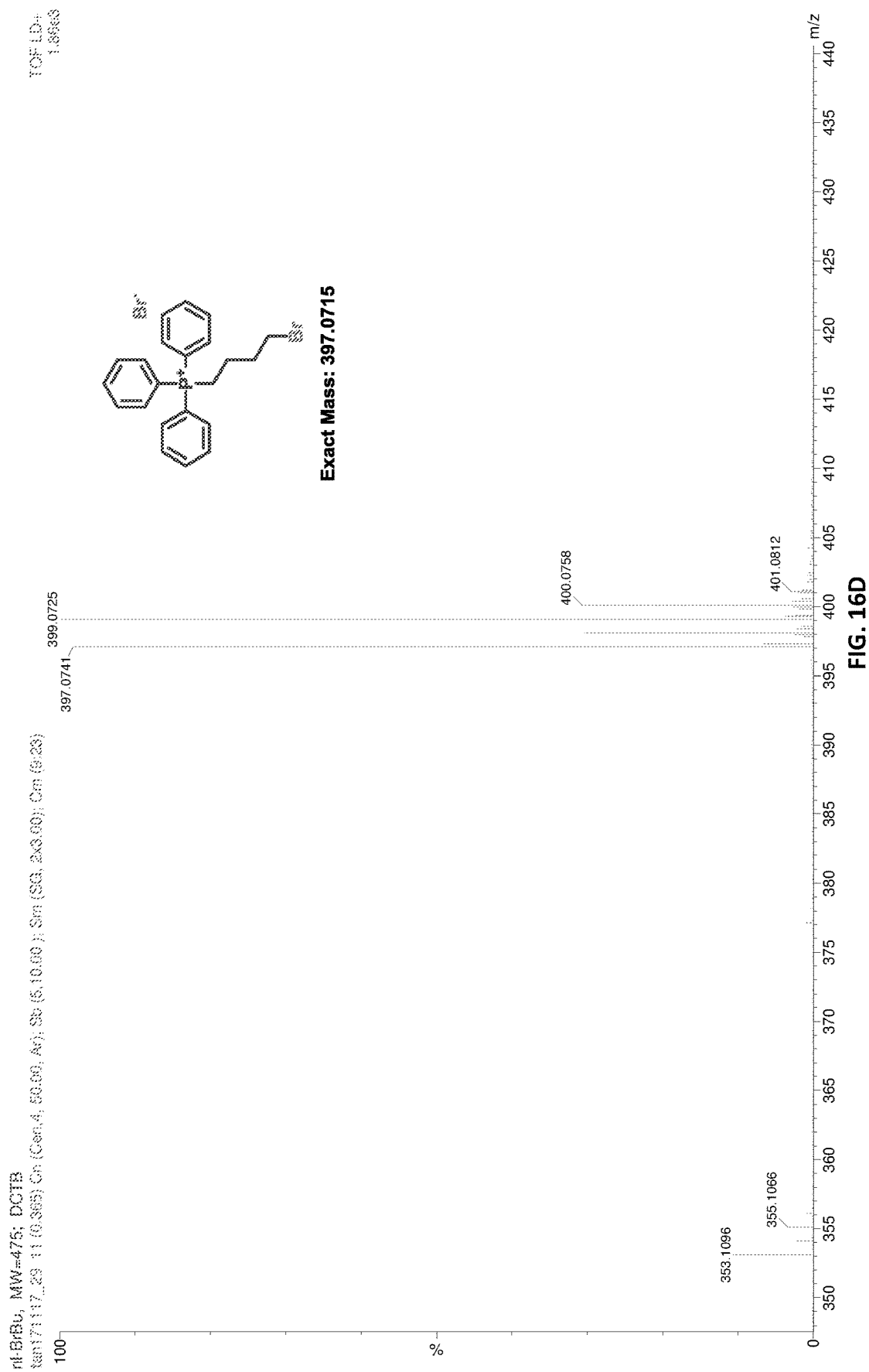
FIG. 16D depicts an HRMS spectrum of TPP-4C2B.
Figure 17A:
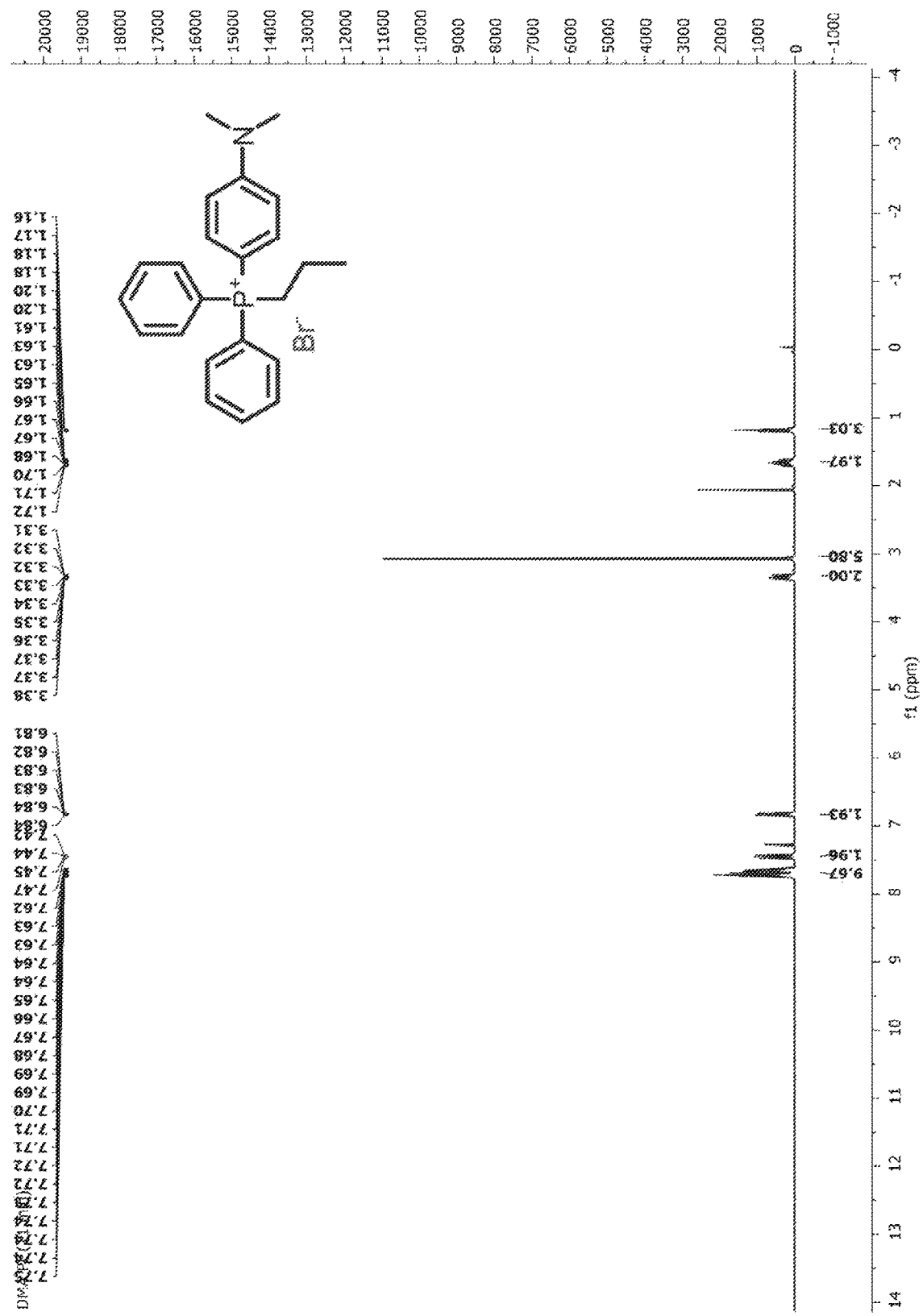
FIG. 17A depicts a H NMR spectrum of TPP-3CBA in CDCl$_3$.
Figure 17B:
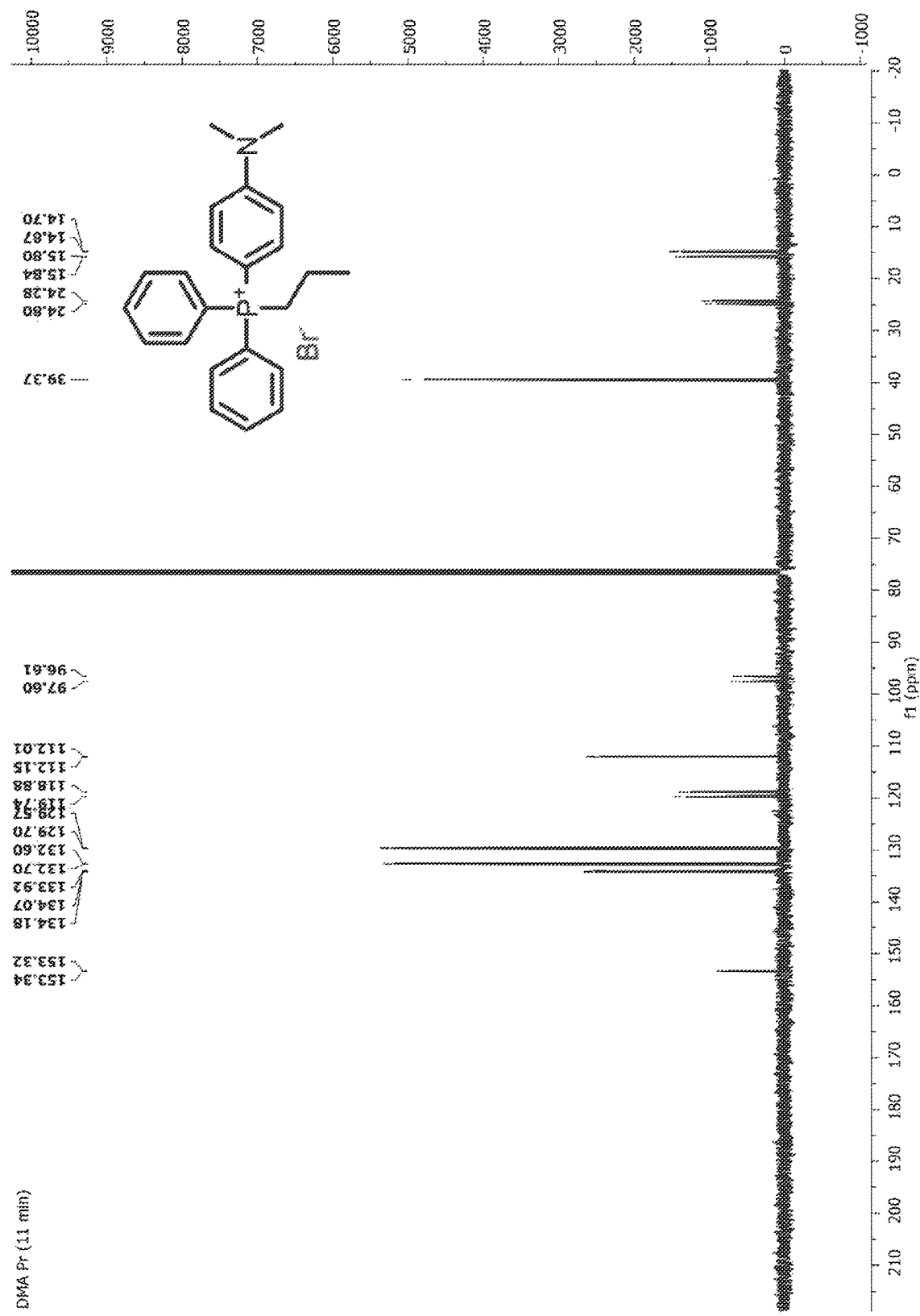
FIG. 17B depicts a $^{13}$C NMR spectrum of TPP-3CBA in CDCl$_3$.
Figure 17C:
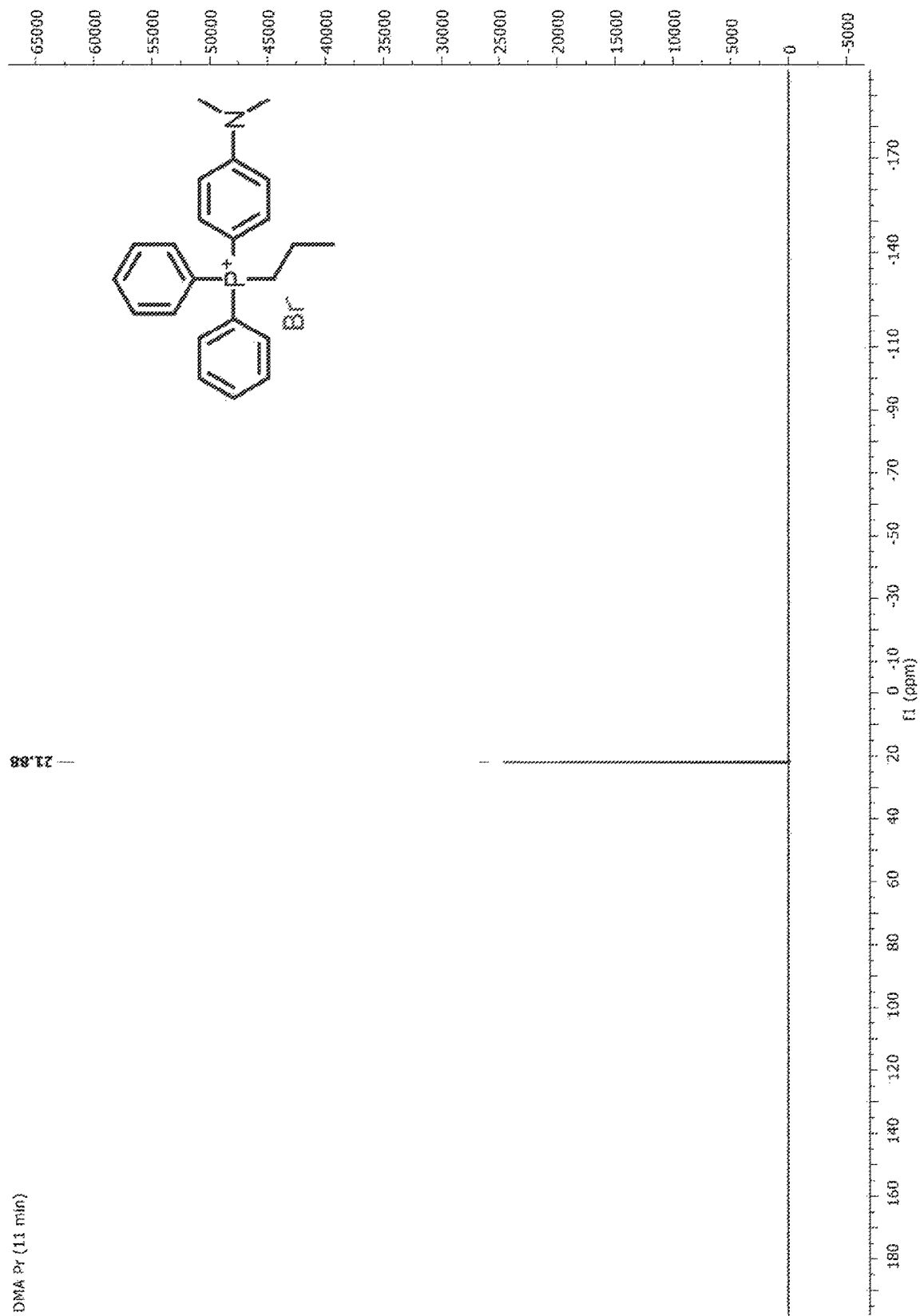
FIG. 17C depicts a $^{31}$P NMR spectrum of TPP-3CBA in CDCl$_3$.
Figure 17D:
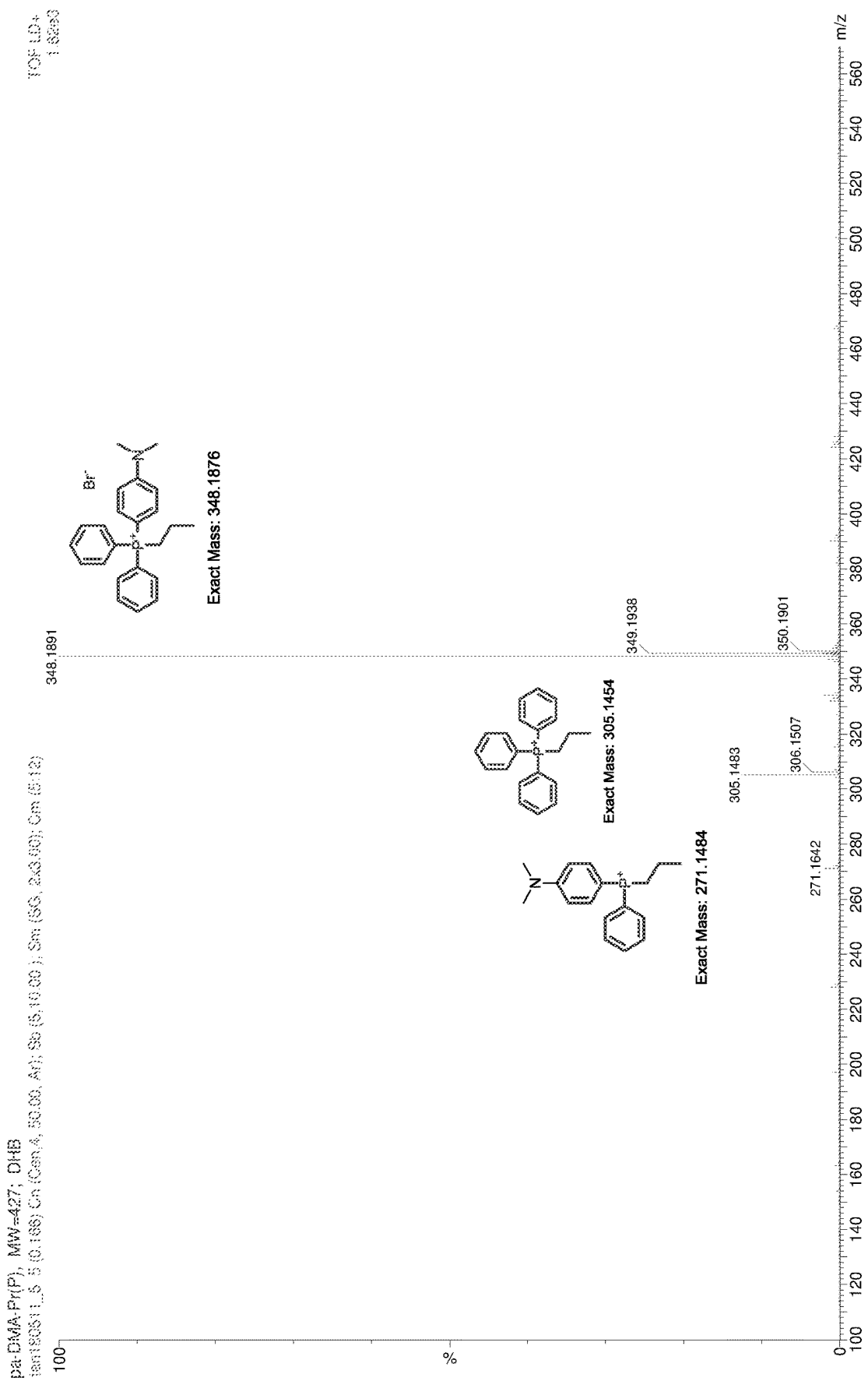
FIG. 17D depicts an HRMS spectrum of TPP-3CBA.
Figure 18A:
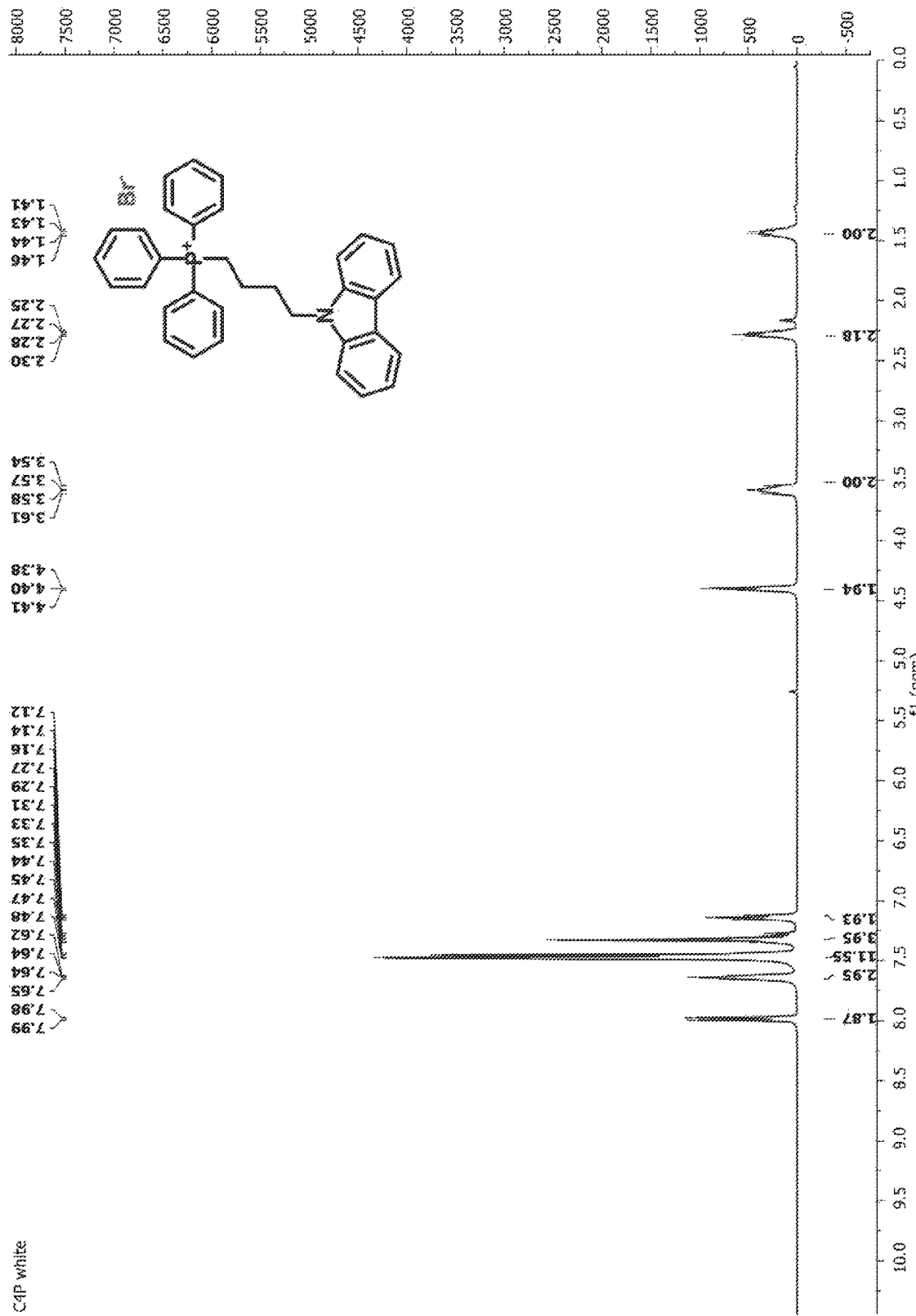
FIG. 18A depicts a H NMR spectrum of TPP-4CCz in CDCl$_3$.
Figure 18B:
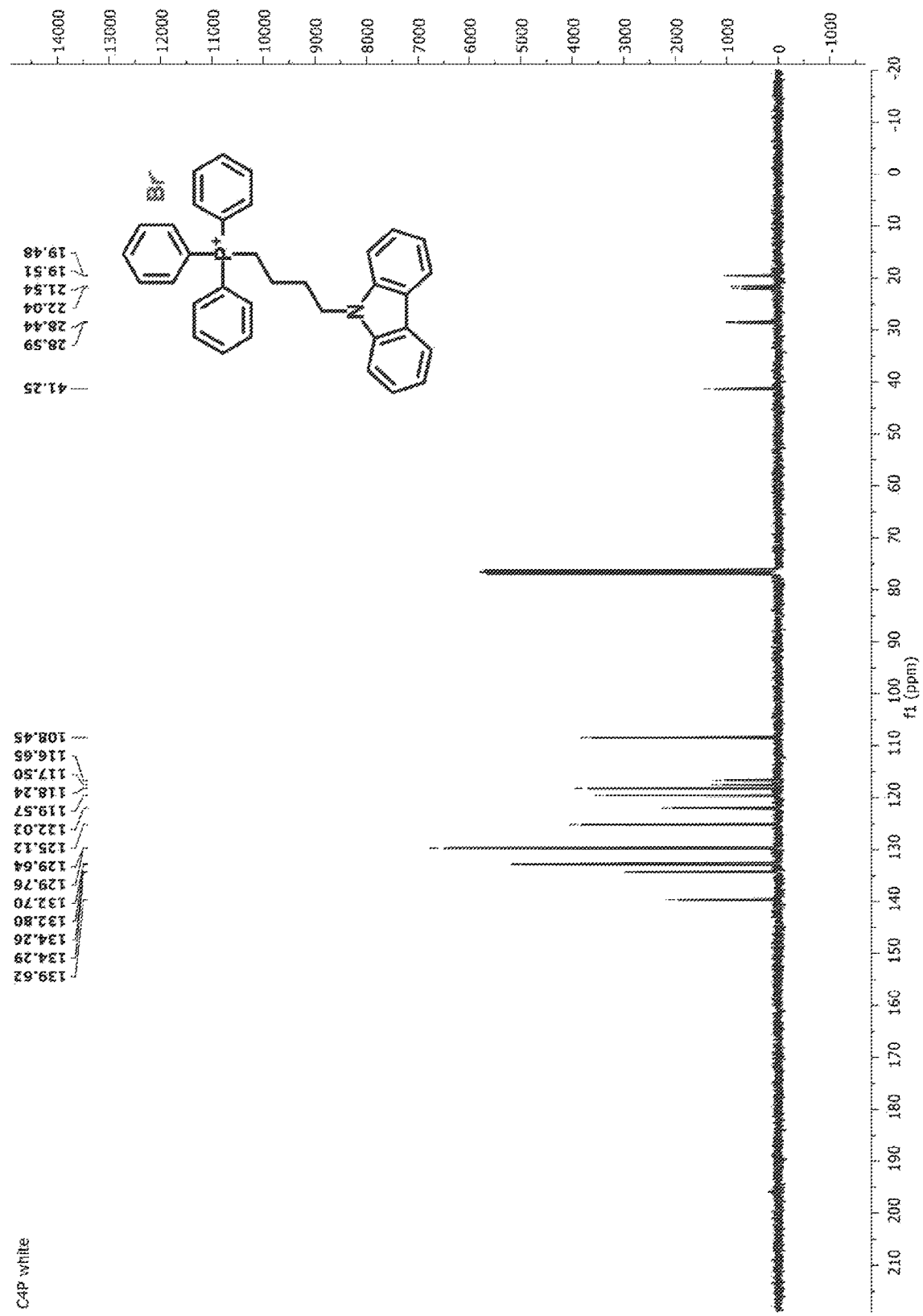
FIG. 18B depicts a $^{13}$C NMR spectrum of TPP-4CCz in CDCl$_3$.
Figure 18C:
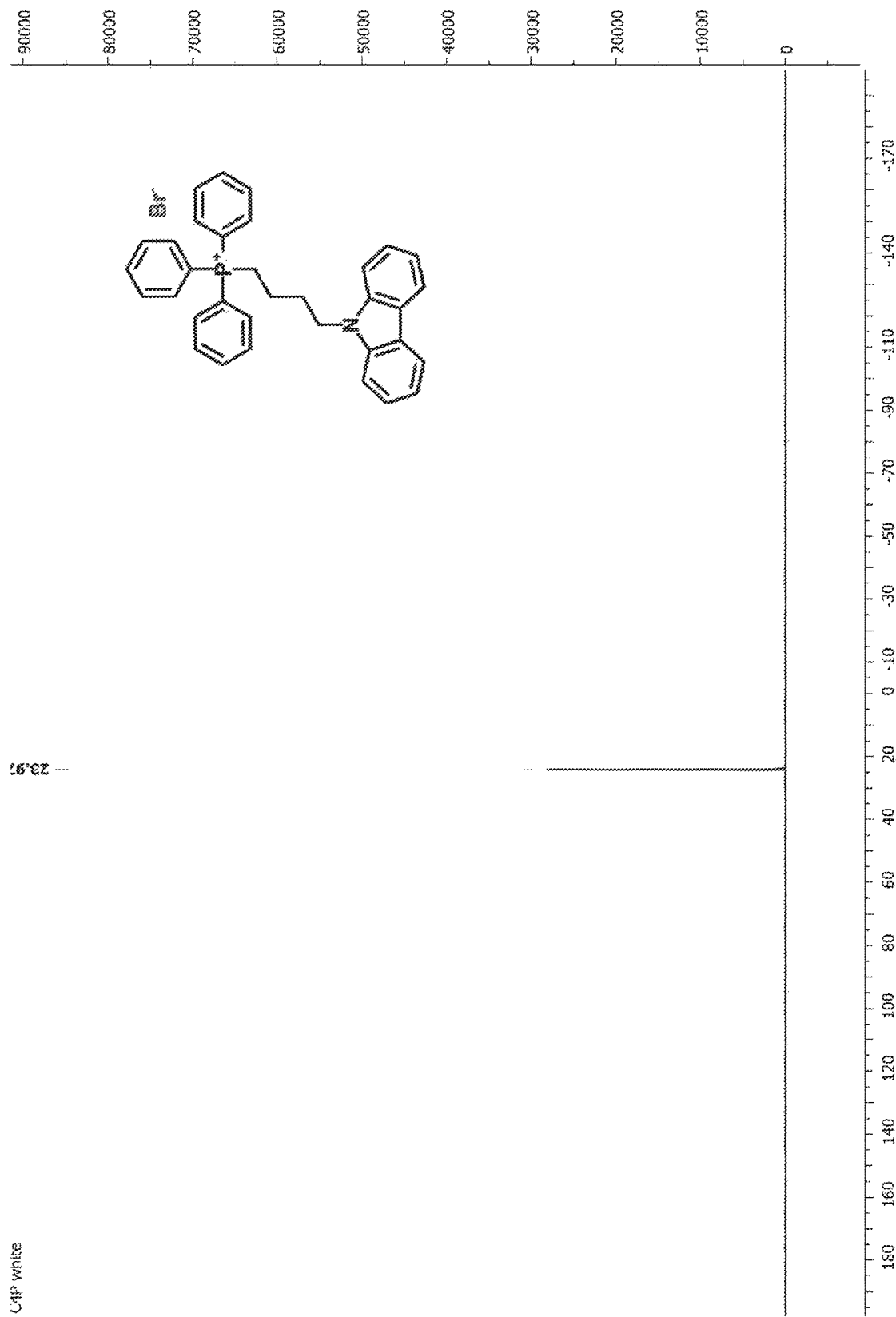
FIG. 18C depicts a $^{31}$P NMR spectrum of TPP-4CCz in CDCl$_3$.
Figure 18D:
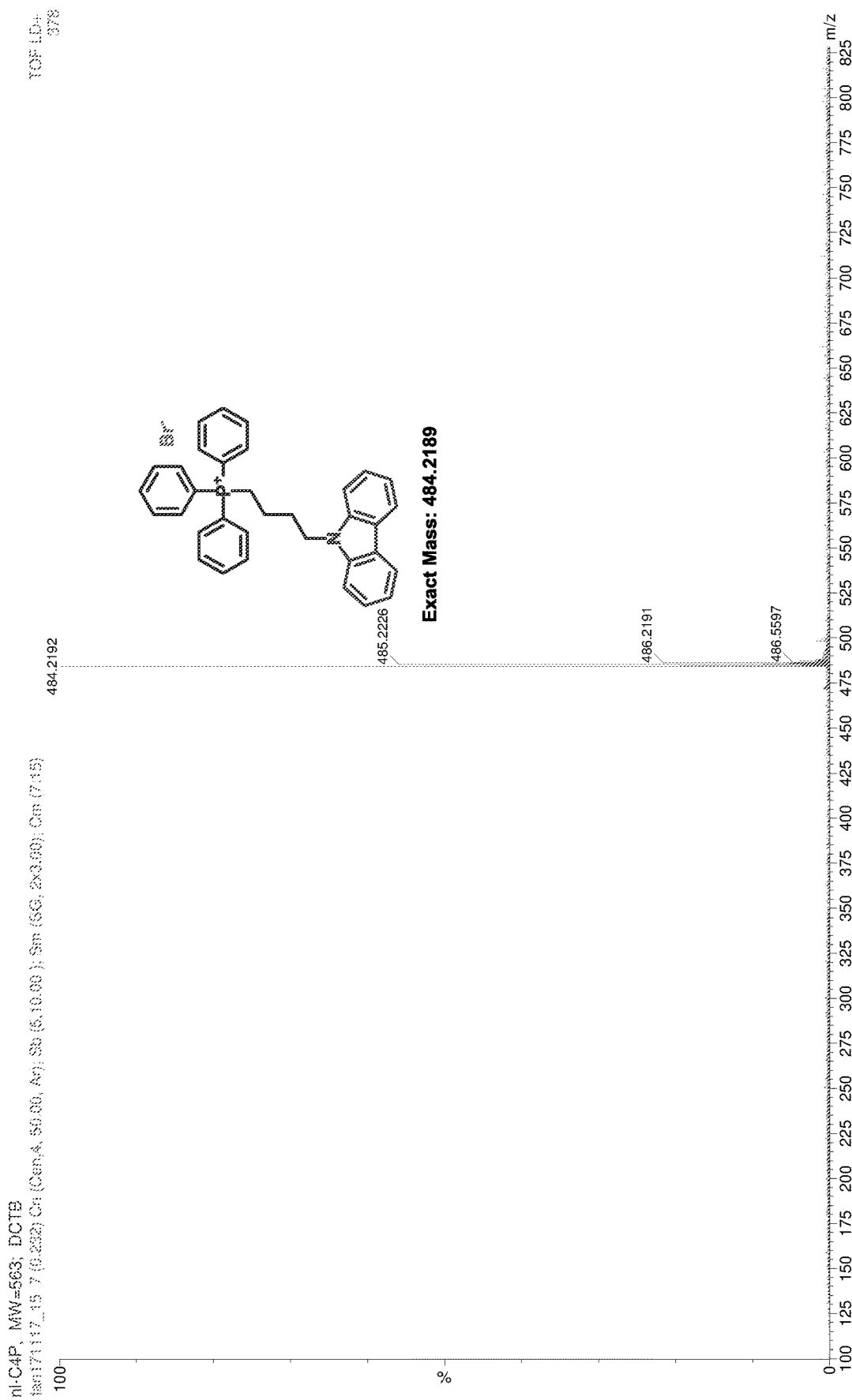
FIG. 18D depicts an HRMS spectrum of TPP-4CCz.
Figure 19:
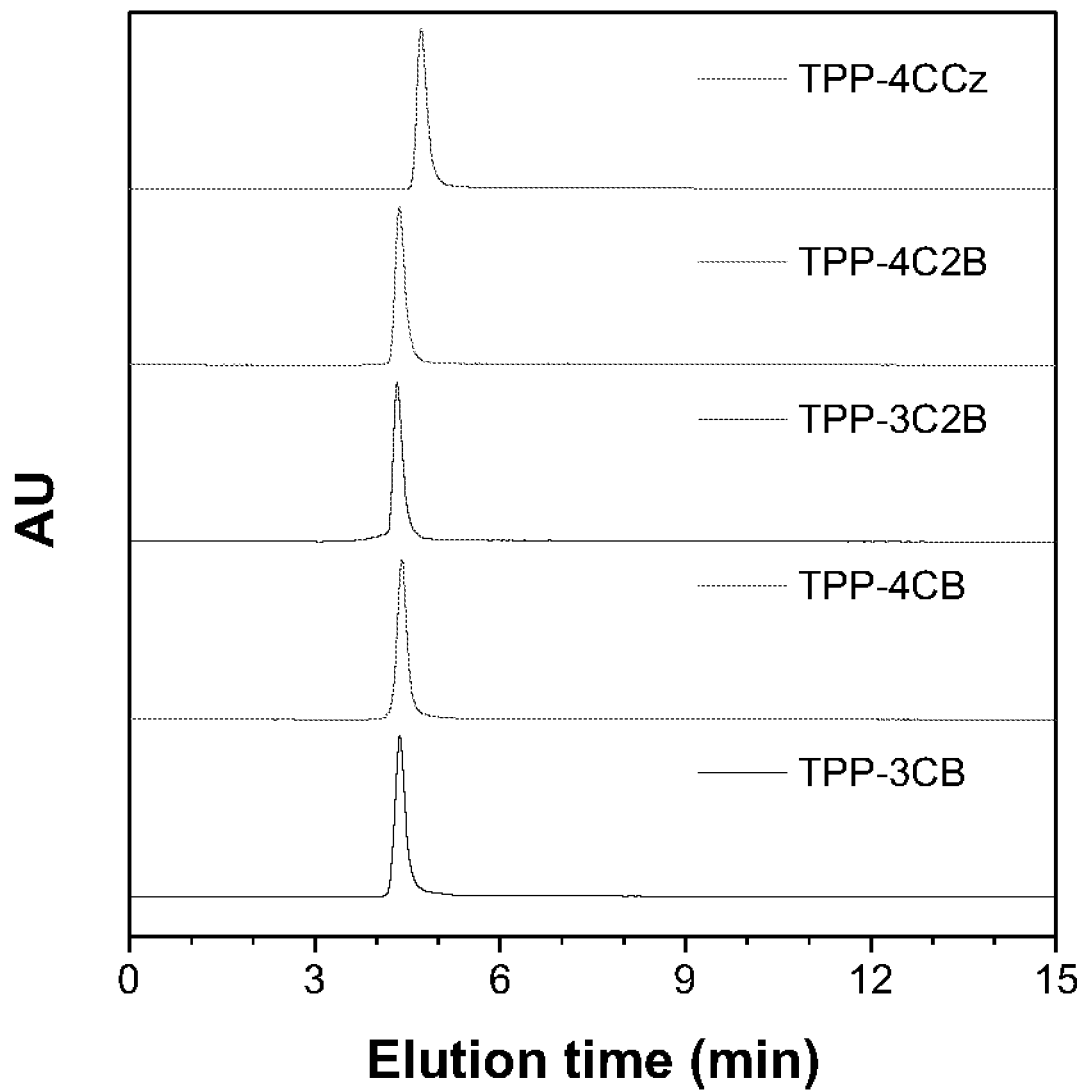
FIG. 19 depicts high-performance liquid chromatogram (HPLC) spectra of TPP-3CB, TPP-4CB, TPP-3C2B, TPP-4C2B and TPP-4CCz in acetonitrile solution (30 µM).

It has been reported that excited state charge separation and their exciplex emission upon recombination can be beneficial for OLPLs. In addition, taking cues from inorganic LPL systems, it was hypothesized that if moieties to "trap" charge carriers are introduced, it may be possible to further extend the afterglow duration. To verify our hypothesis, we developed a bientitic OLPL system using a phosphonium bromide salt as a strong electron acceptor and DMA as an electron donor. DMA was doped into TPP-3C2B by mixing DMA into a DCM solution of TPP-3C2B and allowing crystals to form. These crystals exhibited strong emission at 500 nm upon 365 nm excitation (FIG. 10). For reference, the absorption spectrum of DMA in CHCl$_3$ has two bands at 253 nm and 300 nm and has an emission band at 350 nm (FIG. 11). Since neither DMA nor TPP-3C2B have absorption bands at 365 nm, this suggests the excitation of TPP-3C2B:DMA crystals have photoinduced charge-transfer characteristics. Furthermore, the emission band of TPP-3C2B:DMA at 500 nm is ~20 nm red-shifted from TPP-3C2B, suggesting an exciplex emission (FIG. 12). After 60 seconds of UV excitation, long-lived charge-separated states could be generated, and emission could be detected for up to 5 h (FIG. 10). The crystalline nature of TPP-3C2B:DMA protects the photo-generated radicals from atmospheric oxygen and suppresses nonradiative deactivation pathways allowing for such a long afterglow. These crystals exhibit good stability being able to retain its 5 h afterglow even after being kept for more than 45 days under dark conditions. The TPP-3C2B:DMA crystals have emission quantum efficiency of 10.2%. These red-shifted bands in the emission and excitation spectra of TPP-3C2B:DMA was speculated to be due to the formation of an exciplex. The extraordinary luminescent behavior of OLPL was captured using a CMOS camera at RT. The crystals were excited by 365 nm UV light source and the afterglow emission was detectable up to 5 h after ceasing the excitation source. This is an unprecedented phenomenon in the field of organic luminescence.

The reproducibility of this OLPL system was repeated several times by simply mixing of DMA/TPP-3C2B (10:1 mol ratio) in DCM/EA (1:1 v/v) with varying maximum LPL durations. Without wishing to be bound by theory, it was hypothesized that the key factor of OLPL is the amount of DMA trapped inside the crystals, which was challenging to control. After crystallization, the obtained crystals exhibited LPL durations from 3 to 5 h (FIG. 10*b*). The lifetime value of OLPL crystals was attempted to be recorded, but the persistent nature of the emission prevented measurement of its decay curve. Instead of using a spectrophotometer to measure the lifetime, the average grayscale values of the crystals were calculated using a fluorescence microscope to represent the overall brightness of the fluorescent image. The corresponding data points have given an exponential decay from the luminescence of TPP-3C2B:DMA (FIG. 10*c*). The smart design of the phosphonium salts played an important role where the quaternary stable phosphonium core can hold or protect the excited radical for a long time. Based on the above results, the OLPL mainly originated from the photo-excited charged separation between TPP-3C2B and DMA followed by radical migration. The slow recombination of TPP-3C2B radical and DMA radical cations results the exciplex emission continues from 3 h to 5 h after ceasing the excitation source at room temperature. All the compounds were characterized by NMR, HRMS and HPLC (FIGS. 13-19).

Taking advantage of stable phosphonium core, a new carbazole linked phosphonium carbazole derivative TPP-4CCz was designed. TPP-4CCz showed four different emission bands: a fluorescence band at 425 nm, and 3 phosphorescent bands at 550 nm, 600 nm, and 655 nm (FIG. 6*a*). The Commission Internationale de l'Eclairage (CIE) 1931 coordinates of the emission are (0.338, 0.330) (FIG. 6*b*). The bands together produce white emission with a total quantum efficiency of 23.8% (FIG. 6*c*). The white emissive TPP-4CCz showed a long lifetime of 118 ms measure at 550 nm at room temperature (FIG. 6*c*). As the pure carbazole unit has weak intersystem crossing, the system demonstrates that the efficient intersystem crossing is mediated by the phosphonium bromide core helping to achieve not only blue fluorescence, but also strong phosphorescence from carbazole unit thus producing white emission. This strategy can be utilized to get several other efficient white emissive phosphorescence materials.

With a series of phosphonium bromide cores, a new methodology was developed to fabricate OLPL materials as well as efficient white emitting materials. By combining an electron donor, dimethylaniline (DMA), into (3-bromopropyl) triphenylphosphonium bromide (TPP-3C2B), which is a strong electron-accepting molecule, 5-7 h room-temperature OLPL was obtained. We proposed that the OLPL mainly originates from the photo-excited charged separation between TPP-3C2B and DMA followed by radical migration and slow recombination of TPP-3C2B radical and DMA radical cations resulting in the long persistent exciplex emission. Using a similar methodology, an efficient white light emitting phosphorescence material was developed.

EXPERIMENTAL

Example 1—Preparation of TPP-3CB and TPP-4CB

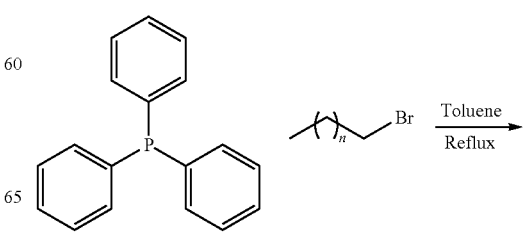

-continued

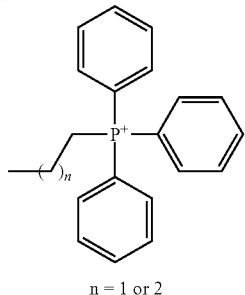

n = 1 or 2

To an oven dried round bottom flask sealed with a rubber stopper, triphenylphosphine (1.6 mmol) and bromoalkanes (1-bromopropane/1-bromobutane, 1.6 mmol) were added, followed by the addition of dry toluene (20 mL). The reaction mixture was refluxed at 95° C. for 12 h. Then, the mixture was evaporated under reduced pressure to afford the crude product which was further purified by column chromatography using ethyl acetate/hexane mixture as an eluent to give a solid product in 65% to 75% yield.

TPP-3CB: $^1$H NMR (400 MHz, CDCl$_3$) δ (ppm): 7.75-7.63 (m, 9H), 7.65-7.53 (m, 6H), 3.73-3.27 (m, 2H), 1.74-1.30 (m, 2H), 1.10 (td, J=7.3, 1.7 Hz, 3H), $^{13}$C NMR (100 MHz, CDCl$_3$) δ (ppm): 134.42, 134.39, 132.93, 132.83, 129.92, 129.80, 117.87, 117.02, 23.99, 23.50, 15.82, 15.78, 14.73, 14.56, $^{31}$P NMR (162 MHz, CDCl$_3$) δ (ppm): 23.54, HRMS, m/z: ([M]$^+$), calculated 305.1454, found, 305.1492, Elemental Analysis for C$_{21}$H$_{22}$BrP: C (65.47, 65.59), H (5.76, 6.18).

TPP-4CB: $^1$H NMR (400 MHz, CDCl$_3$) δ 8.02-7.73 (m, 9H), 7.70-7.50 (m, 6H), 3.67 (ddd, J=12.7, 10.0, 7.8 Hz, 2H), 1.72-1.23 (m, 4H), 0.85 (t, J=7.1 Hz, 3H), $^{13}$C NMR (100 MHz, CDCl$_3$) δ (ppm): 134.44, 134.41, 132.96, 132.86, 129.95, 129.82, 117.95, 117.09, 23.90, 23.86, 23.13, 22.97, 22.16, 21.66, 13.07. $^{31}$P NMR (162 MHz, CDCl$_3$) δ 24.38, HRMS, m/z: ([M]$^+$), calculated 319.1610, found, 319.1603, Elemental Analysis for C$_{22}$H$_{24}$BrP: C (66.17, 66.59), H (6.06, 6.18).

Example 2—Preparation of TPP-3C2B and TPP-4C2B

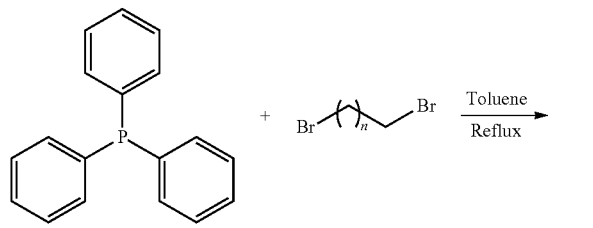

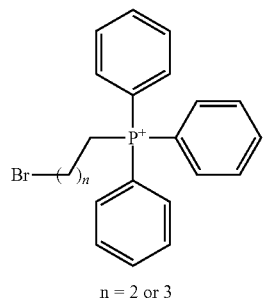

n = 2 or 3

To an oven dried round bottom flask sealed with rubber stopper, triphenylphosphine (1.6 mmol) and dibromoalkanes (1,3 dibromopropane/1,4 dibromobutane, 1.6 mmol) were added, followed by the addition of dry toluene (20 mL). The reaction mixture was refluxed at 95° C. for 12 h. Then, the mixture evaporated under reduced pressure to afford the crude product which was further purified by column chromatography using ethyl acetate/hexane mixture as an eluent to give a solid product in 55% to 60% yield.

TPP-3C2B: $^1$H NMR (400 MHz, CDCl$_3$) δ (ppm): 7.87-7.72 (m, 9H), 7.70-7.56 (m, 6H), 4.07-3.90 (m, 2H), 3.79 (td, J=6.3, 1.2 Hz, 2H), 2.24-2.04 (m, 2H), $^{13}$C NMR (100 MHz, CDCl$_3$) δ (ppm): 134.63, 134.60, 133.05, 132.95, 130.03, 129.91, 117.60, 116.74, 32.89, 32.69, 25.57, 21.22, 20.69, $^{31}$P NMR (162 MHz, CDCl$_3$) δ (ppm): 23.87, HRMS, m/z: ([M]$^+$), calculated 383.0559, found, 383.0579, Elemental Analysis for C$_{21}$H$_{21}$Br$_2$P: C (54.34, 54.59), H (4.56, 4.70).

TPP-4C2B: $^1$H NMR (400 MHz, CDCl$_3$) (ppm): 7.87-7.70 (m, 9H), 7.69-7.55 (m, 6H), 3.86-3.66 (m, 2H), 3.48 (t, J=6.1 Hz, 2H), 2.32-2.10 (m, 2H), 1.77 (dt, J=15.4, 7.8 Hz, 2H), $^{13}$C NMR (100 MHz, CDCl$^3$) δ (ppm): 134.62, 134.59, 132.95, 132.85, 129.99, 129.87, 117.44, 116.58, 32.77, 32.57, 25.46, 21.14, 20.62, $^{31}$P NMR (162 MHz, CDCl$_3$) δ (ppm): 24.15, HRMS, m/z: ([M]$^+$), calculated 397.0715, found, 397.0741, Elemental Analysis for C$_{22}$H$_{23}$Br$_2$P: C (55.26, 55.66), H (4.85, 5.03)

What is claimed:

1. A composition comprising an electron-accepting compound and an electron-donating compound, wherein the electron-accepting compound has Formula 1:

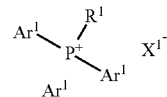

1 wherein
X$^1$ is F, Cl, Br, I, PF$_6$, BPh$_4$, BF$_4$, PhSO$_3$ or N(CN)$_2$;
Ar$^1$ for each instance is independently aryl or heteroaryl, wherein Ar$^1$ is optionally substituted with —(CR$_2$)$_n$A$^1$, wherein n for each occurrence is independently a whole number selected from 0-20; A$^1$ is —CO$_2$H, —C≡CH, —CNS, —N$_3$, —NH$_2$, —SH, Cl, Br, I, or N-maleimide; and R for each occurrence is independently hydrogen, alkyl, alkenyl, cycloalkyl, aryl, or heteroaryl; or two instances of R taken together with the carbons to which they are attached form a 3-6 membered cycloalkyl; and
R$^1$ is alkyl, alkenyl, cycloalkyl, or —(CR$_2$)$_n$A$^2$, wherein A$^2$ is F, Cl, Br, or I; or A$^2$ is a moiety of Formula 2:

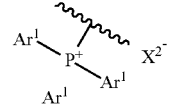

2 wherein
X$^2$ is F, Cl, Br, I, PF$_6$, BPh$_4$, BF$_4$, PhSO$_3$, or N(CN)$_2$; and
the electron-donating compound has Formula 4:

Ar$^2$(R$^3$)$_n$    4 wherein n is 1, 2, 3, or 4;

Ar² is optionally substituted aryl, optionally substituted heteroaryl, optionally substituted phenyl, optionally substituted biphenyl, optionally substituted terphenyl, optionally substituted napthyl, optionally substituted phenanthryl, optionally substituted anthracenyl, optionally substituted acenaphthyl, optionally substituted pyrenyl, optionally substituted fluorenyl, or optionally substituted tetrarylmethane; and R³ is N(R⁴)₂, wherein R⁴ for each occurrence is independently selected from the group consisting of alkyl, alkenyl, alkynyl, cycloalkyl, aryl, heteroaryl, —(CR₂)$_n$A¹, and a moiety of Formula 5:

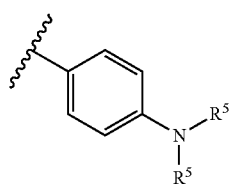

wherein R⁵ for each occurrence is independently alkyl, optionally substituted phenyl, or R⁴, wherein the composition exhibits at least one type of emission selected from the group consisting of room temperature phosphorescence and long persistence luminescence.

2. The composition of claim 1, wherein the electron-donating compound is selected from the group consisting of:

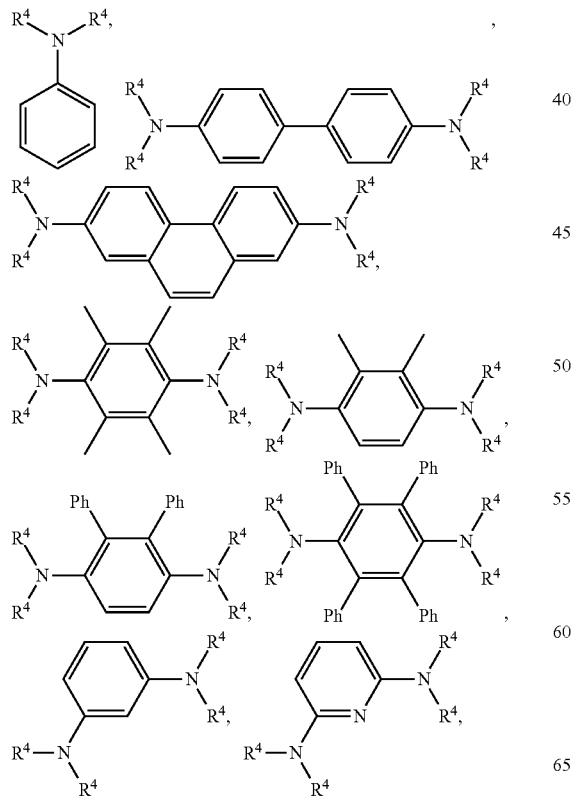

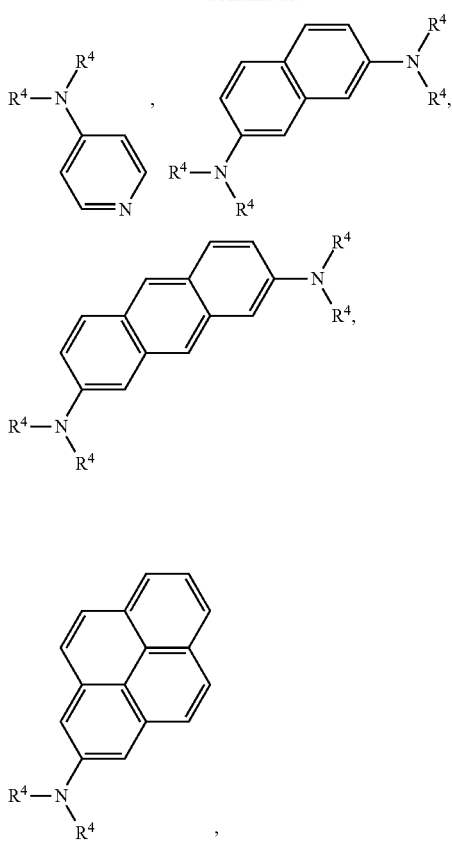

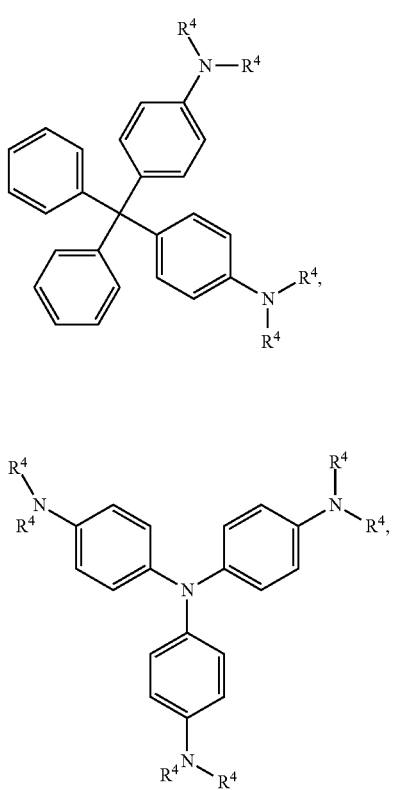

-continued

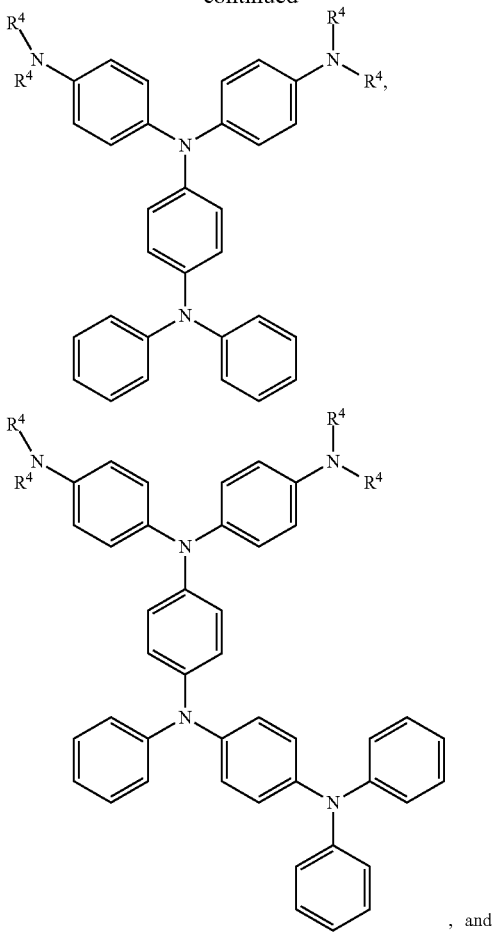

, and

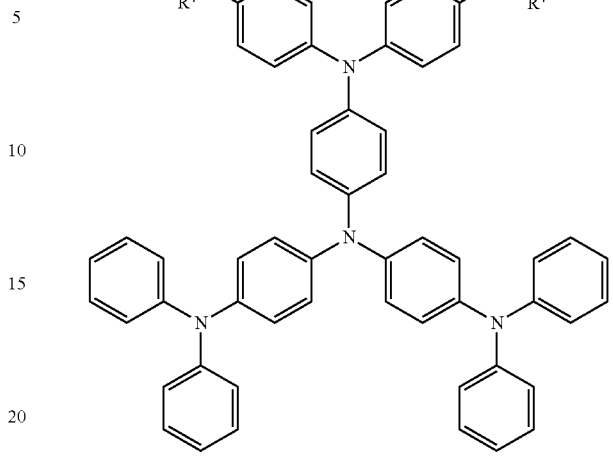

wherein $R^4$ for each occurrence is independently alkyl or $-(CR_2)_nA^1$.

3. The composition of claim 2, wherein $R^4$ is methyl.

4. The composition of claim 2, wherein the electron-donating compound is N,N-dimethylaniline.

5. The composition of claim 1, wherein the composition is substantially crystalline.

6. An article comprising a composition of claim 1, wherein the article is identification card, a driver's license, a passport, identity papers, a banknote, a check, a document, a paper, a stock certificate, a packaging component, a credit card, a bank card, a label, a seal, a postage stamp, a textile, a liquid, or a biological sample.

* * * * *